US012652470B2

(12) United States Patent
Crozier et al.

(10) Patent No.: US 12,652,470 B2
(45) Date of Patent: Jun. 9, 2026

(54) AUTOMATIC EXPOSURE WITH SIMULATED HISTOGRAM DATA

(71) Applicant: GoPro, Inc., San Mateo, CA (US)

(72) Inventors: Thomas Richard Armel Crozier, Vanves (FR); Violaine Marie Mong-Ian Sudret, Paris (FR); Alexandre Angel Michel Lille, Toulouse (FR)

(73) Assignee: GoPro, Inc., San Mateo, CA (US)

( * ) Notice: Subject to any disclaimer, the term of this patent is extended or adjusted under 35 U.S.C. 154(b) by 284 days.

(21) Appl. No.: 18/584,405

(22) Filed: Feb. 22, 2024

(65) Prior Publication Data

US 2025/0274667 A1     Aug. 28, 2025

(51) Int. Cl.
| | |
|---|---|
| *H04N 23/73* | (2023.01) |
| *G06T 7/00* | (2017.01) |
| *H04N 23/80* | (2023.01) |

(52) U.S. Cl.
CPC ........... *H04N 23/73* (2023.01); *G06T 7/0002* (2013.01); *H04N 23/80* (2023.01); *G06T 2207/30168* (2013.01)

(58) Field of Classification Search
CPC ...... H04N 23/73; H04N 23/80; G06T 7/0002; G06T 2207/30168
See application file for complete search history.

(56) References Cited

U.S. PATENT DOCUMENTS

| | | | | |
|---|---|---|---|---|
| 7,009,636 B2 * | 3/2006 | Liu | ........................ | H04N 23/68 |
| | | | | 348/297 |
| 11,238,564 B2 * | 2/2022 | McCombe | ................ | G06T 5/70 |
| 2021/0243352 A1 * | 8/2021 | Mcelvain | ............. | H04N 25/134 |
| 2021/0319537 A1 * | 10/2021 | Hiasa | ........................ | G06N 3/09 |
| 2022/0254139 A1 * | 8/2022 | Hiasa | ........................ | G06T 5/70 |

* cited by examiner

*Primary Examiner* — Sinh Tran
*Assistant Examiner* — Angel L Garces-Rivera
(74) *Attorney, Agent, or Firm* — Young Basile Hanlon & MacFarlane, P.C.

(57)     ABSTRACT

Automatic exposure with simulated histograms may include obtaining a noise-blur exposure duration value in accordance with a minimal simulated noise-blur cost value obtained in accordance with simulated noise data and simulated blur data, obtaining a saturation exposure value in accordance with a minimal simulated saturation cost value obtained in accordance with simulated black saturation data and simulated white saturation data, comparing the noise-blur exposure duration value and the saturation exposure value, and obtaining a target gain value and a target exposure duration value based on the comparison, wherein the comparing may include obtaining the target exposure duration value in accordance with a minimal simulated blur-saturation cost value obtained in accordance with the simulated blur data and the simulated black saturation data or in accordance with a minimal simulated noise-saturation cost value obtained in accordance with the simulated noise data and the simulated white saturation data.

32 Claims, 23 Drawing Sheets

700

710

ACCESS INPUT DATA

720

OBTAIN ADAPTIVE ACQUISITION CONTROL OUTPUT DATA

740

ACCESS CANDIDATE EXPOSURE DATA 750                                                                    752

OBTAIN SIMULATED QUALITY DATA

760

EVALUATE SIMULATED QUALITY DATA

730

OUTPUT

Figure 13:
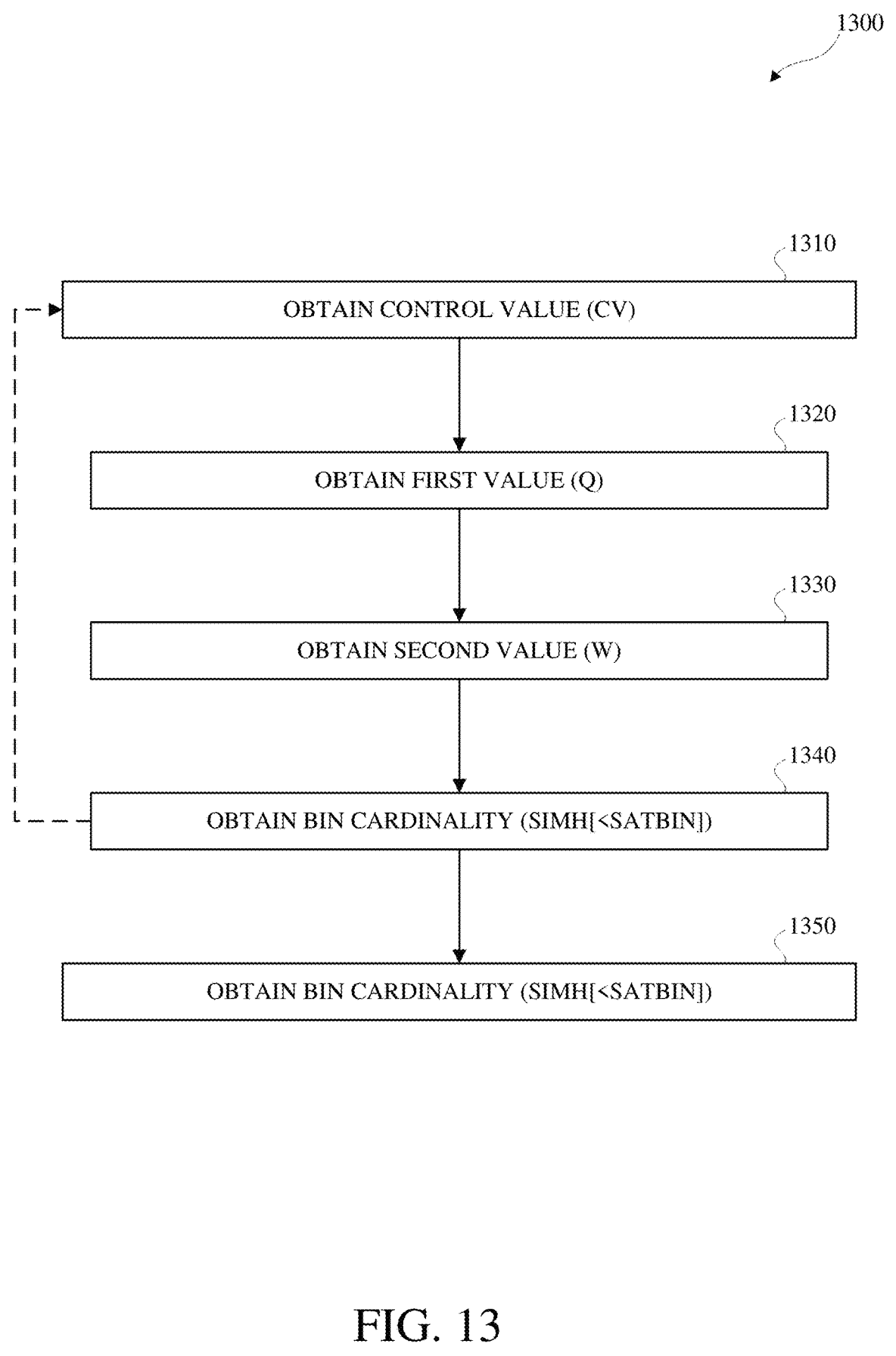

1300

1310

OBTAIN CONTROL VALUE (CV)

1320

OBTAIN FIRST VALUE (Q)

1330

OBTAIN SECOND VALUE (W)

1340

OBTAIN BIN CARDINALITY (SIMH[<SATBIN])

1350

OBTAIN BIN CARDINALITY (SIMH[<SATBIN])

1410 OBTAIN FIRST CONTROL VALUE (CV1)

1420 OBTAIN FIRST VALUE (CVER)

1425 OBTAIN SECOND VALUE (L)

1430 OBTAIN THIRD VALUE (WL)

1440 OBTAIN FOURTH VALUE (R)

1445 OBTAIN FIFTH VALUE (WR)

1450 OBTAIN BIN CARDINALITY (SIMH[CV1])

1455 OBTAIN SATURATED PIXELS VALUE (SATPIX)

1460 OBTAIN SECOND CONTROL VALUE (CV2)

1465 OBTAIN BIN CARDINALITY (SIMH[CV2])

1470 UPDATE SATURATED PIXELS VALUE

1475 OBTAIN BIN CARDINALITY (SIMH[SATBIN])

AUTOMATIC EXPOSURE WITH SIMULATED HISTOGRAM DATA

TECHNICAL FIELD

This disclosure relates to adaptive acquisition control, including exposure and tone control, for image and video acquisition and processing.

BACKGROUND

Images and video may be acquired, or captured, and processed, such as by an image capture apparatus, such as a camera. Light may be received and focused via a lens and may be converted to an electronic image signal by an image sensor. The image signal may be processed by an image signal processor to form a processed, or output, image, which may be stored and/or encoded.

SUMMARY

Disclosed herein are implementations of automatic exposure with simulated histogram data for image and video acquisition and processing.

An aspect of the disclosure is a method for automatic exposure with simulated histogram data for image and video acquisition and processing. Automatic exposure with simulated histogram data for image and video acquisition and processing includes accessing current input image data including a current input image, obtaining adaptive acquisition control output data, and outputting the adaptive acquisition control output data for subsequent image acquisition. Obtaining the adaptive acquisition control output data may include obtaining a noise-blur exposure duration value in accordance with a minimal simulated noise-blur cost value from simulated noise-blur cost data obtained in accordance with simulated noise data and simulated blur data obtained in accordance with the current input image data and candidate exposure data. Obtaining the adaptive acquisition control output data may include obtaining a saturation exposure value in accordance with a minimal simulated saturation cost value from simulated saturation cost data obtained in accordance with simulated black saturation data and simulated white saturation data obtained in accordance with the current input image data and the candidate exposure data. Obtaining the adaptive acquisition control output data may include, in response to a determination that the noise-blur exposure duration value is less than a result of dividing the saturation exposure value by a maximum gain value, obtaining the maximum gain value as a target gain value and obtaining a target exposure duration value in accordance with a minimal simulated blur-saturation cost value from simulated blur-saturation cost data obtained in accordance with the simulated blur data and the simulated black saturation data. Obtaining the adaptive acquisition control output data may include, in response to a determination that the noise-blur exposure duration value is greater than or equal to the result of dividing the saturation exposure value by the maximum gain value and a determination that the noise-blur exposure duration value is less than or equal to a result of dividing the saturation exposure value by a minimum gain value, obtaining the noise-blur exposure duration value as the target exposure duration value and obtaining, as the target gain value, a result of dividing the saturation exposure value by the noise-blur exposure duration value. Obtaining the adaptive acquisition control output data may include, in response to a determination that the noise-blur exposure duration value is greater than the result of dividing the saturation exposure value by the minimum gain value, obtaining the minimum gain value as the target gain value and obtaining the target exposure duration value in accordance with a minimal simulated noise-saturation cost value from simulated noise-saturation cost data obtained in accordance with the simulated noise data and the simulated white saturation data.

Another aspect of the disclosure is an image capture apparatus that implements automatic exposure with simulated histogram data for image and video acquisition and processing. The image capture apparatus includes an image sensor and an image processing pipeline. The image processing pipeline may be configured to access current input image data that includes a current input image, obtain adaptive acquisition control output data, and output the adaptive acquisition control output data for subsequent image acquisition. To obtain the adaptive acquisition control output data the image processing pipeline may be configured to may obtain a noise-blur exposure duration value in accordance with a minimal simulated noise-blur cost value from simulated noise-blur cost data obtained in accordance with simulated noise data and simulated blur data obtained in accordance with the current input image data and candidate exposure data. To obtain the adaptive acquisition control output data the image processing pipeline may be configured to obtain a saturation exposure value in accordance with a minimal simulated saturation cost value from simulated saturation cost data obtained in accordance with simulated black saturation data and simulated white saturation data obtained in accordance with the current input image data and the candidate exposure data. To obtain the adaptive acquisition control output data the image processing pipeline may be configured to, in response to a determination that the noise-blur exposure duration value is less than a result of division of the saturation exposure value by a maximum gain value, obtain the maximum gain value as a target gain value and obtain a target exposure duration value in accordance with a minimal simulated blur-saturation cost value from simulated blur-saturation cost data obtained in accordance with the simulated blur data and the simulated black saturation data. To obtain the adaptive acquisition control output data the image processing pipeline may be configured to, in response to a determination that the noise-blur exposure duration value is greater than or equal to the result of division of the saturation exposure value by the maximum gain value and a determination that the noise-blur exposure duration value is less than or equal to a result of division of the saturation exposure value by a minimum gain value, obtain the noise-blur exposure duration value as the target exposure duration value and obtain, as the target gain value, a result of division of the saturation exposure value by the noise-blur exposure duration value. To obtain the adaptive acquisition control output data the image processing pipeline may be configured to, in response to a determination that the noise-blur exposure duration value is greater than the result of division of the saturation exposure value by the minimum gain value, obtain the minimum gain value as the target gain value and obtain the target exposure duration value in accordance with a minimal simulated noise-saturation cost value from simulated noise-saturation cost data obtained in accordance with the simulated noise data and the simulated white saturation data.

Another aspect is a non-transitory computer-readable storage medium having stored thereon instructions for automatic exposure with simulated histogram data for image and video acquisition and processing that are executed by a processor. Automatic exposure with simulated histogram data for image and video acquisition and processing includes accessing current input image data including a current input image, obtaining adaptive acquisition control output data, and outputting the adaptive acquisition control output data for subsequent image acquisition. Obtaining the adaptive acquisition control output data may include obtaining a noise-blur exposure duration value in accordance with a minimal simulated noise-blur cost value from simulated noise-blur cost data obtained in accordance with simulated noise data and simulated blur data obtained in accordance with the current input image data and candidate exposure data. Obtaining the adaptive acquisition control output data may include obtaining a saturation exposure value in accordance with a minimal simulated saturation cost value from simulated saturation cost data obtained in accordance with simulated black saturation data and simulated white saturation data obtained in accordance with the current input image data and the candidate exposure data. Obtaining the adaptive acquisition control output data may include, in response to a determination that the noise-blur exposure duration value is less than a result of dividing the saturation exposure value by a maximum gain value, obtaining the maximum gain value as a target gain value and obtaining a target exposure duration value in accordance with a minimal simulated blur-saturation cost value from simulated blur-saturation cost data obtained in accordance with the simulated blur data and the simulated black saturation data. Obtaining the adaptive acquisition control output data may include, in response to a determination that the noise-blur exposure duration value is greater than or equal to the result of dividing the saturation exposure value by the maximum gain value and a determination that the noise-blur exposure duration value is less than or equal to a result of dividing the saturation exposure value by a minimum gain value, obtaining the noise-blur exposure duration value as the target exposure duration value and obtaining, as the target gain value, a result of dividing the saturation exposure value by the noise-blur exposure duration value. Obtaining the adaptive acquisition control output data may include, in response to a determination that the noise-blur exposure duration value is greater than the result of dividing the saturation exposure value by the minimum gain value, obtaining the minimum gain value as the target gain value and obtaining the target exposure duration value in accordance with a minimal simulated noise-saturation cost value from simulated noise-saturation cost data obtained in accordance with the simulated noise data and the simulated white saturation data.

An aspect of the disclosure is a method for automatic exposure with simulated histogram data for image and video acquisition and processing. Automatic exposure with simulated histogram data for image and video acquisition and processing includes accessing current input image data including a current input image, obtaining adaptive acquisition control output data, and outputting the adaptive acquisition control output data for subsequent image acquisition. Obtaining the adaptive acquisition control output data may include obtaining a noise-blur exposure duration value in accordance with a minimal simulated noise-blur cost value from simulated noise-blur cost data obtained in accordance with simulated noise data and simulated blur data obtained in accordance with the current input image data and candidate exposure data. Obtaining the adaptive acquisition control output data may include obtaining a saturation exposure value in accordance with a minimal simulated saturation cost value from simulated saturation cost data obtained in accordance with simulated black saturation data and simulated white saturation data obtained in accordance with the current input image data and the candidate exposure data. Obtaining the adaptive acquisition control output data may include determining whether the noise-blur exposure duration value is less than a result of dividing the saturation exposure value by a maximum gain value. Obtaining the adaptive acquisition control output data may include determining that the noise-blur exposure duration value is less than a result of dividing the saturation exposure value by a maximum gain value. Obtaining the adaptive acquisition control output data may include, in response to a determination that the noise-blur exposure duration value is less than the result of dividing the saturation exposure value by the maximum gain value, obtaining the maximum gain value as a target gain value and obtaining a target exposure duration value in accordance with a minimal simulated blur-saturation cost value from simulated blur-saturation cost data obtained in accordance with the simulated blur data and the simulated black saturation data.

Another aspect of the disclosure is an image capture apparatus that implements automatic exposure with simulated histogram data for image and video acquisition and processing. The image capture apparatus includes an image sensor and an image processing pipeline. The image processing pipeline may be configured to access current input image data that includes a current input image, obtain adaptive acquisition control output data, and output the adaptive acquisition control output data for subsequent image acquisition. To obtain the adaptive acquisition control output data the image processing pipeline may be configured to may obtain a noise-blur exposure duration value in accordance with a minimal simulated noise-blur cost value from simulated noise-blur cost data obtained in accordance with simulated noise data and simulated blur data obtained in accordance with the current input image data and candidate exposure data. To obtain the adaptive acquisition control output data the image processing pipeline may be configured to obtain a saturation exposure value in accordance with a minimal simulated saturation cost value from simulated saturation cost data obtained in accordance with simulated black saturation data and simulated white saturation data obtained in accordance with the current input image data and the candidate exposure data. To obtain the adaptive acquisition control output data the image processing pipeline may be configured to determine whether the noise-blur exposure duration value is less than a result of dividing the saturation exposure value by a maximum gain value. To obtain the adaptive acquisition control output data the image processing pipeline may be configured to determine that the noise-blur exposure duration value is less than a result of dividing the saturation exposure value by a maximum gain value. To obtain the adaptive acquisition control output data the image processing pipeline may be configured to, in response to the determination that the noise-blur exposure duration value is less than the result of division of the saturation exposure value by the maximum gain value, obtain the maximum gain value as a target gain value and obtain a target exposure duration value in accordance with a minimal simulated blur-saturation cost value from simulated blur-saturation cost data obtained in accordance with the simulated blur data and the simulated black saturation data.

Another aspect is a non-transitory computer-readable storage medium having stored thereon instructions for automatic exposure with simulated histogram data for image and video acquisition and processing that are executed by a processor. Automatic exposure with simulated histogram data for image and video acquisition and processing includes accessing current input image data including a current input image, obtaining adaptive acquisition control output data, and outputting the adaptive acquisition control output data for subsequent image acquisition. Obtaining the adaptive acquisition control output data may include obtaining a noise-blur exposure duration value in accordance with a minimal simulated noise-blur cost value from simulated noise-blur cost data obtained in accordance with simulated noise data and simulated blur data obtained in accordance with the current input image data and candidate exposure data. Obtaining the adaptive acquisition control output data may include obtaining a saturation exposure value in accordance with a minimal simulated saturation cost value from simulated saturation cost data obtained in accordance with simulated black saturation data and simulated white saturation data obtained in accordance with the current input image data and the candidate exposure data. Obtaining the adaptive acquisition control output data may include determining whether the noise-blur exposure duration value is less than a result of dividing the saturation exposure value by a maximum gain value. Obtaining the adaptive acquisition control output data may include determining that the noise-blur exposure duration value is less than a result of dividing the saturation exposure value by a maximum gain value. Obtaining the adaptive acquisition control output data may include, in response to a determination that the noise-blur exposure duration value is less than the result of dividing the saturation exposure value by the maximum gain value, obtaining the maximum gain value as a target gain value and obtaining a target exposure duration value in accordance with a minimal simulated blur-saturation cost value from simulated blur-saturation cost data obtained in accordance with the simulated blur data and the simulated black saturation data.

An aspect of the disclosure is a method for automatic exposure with simulated histogram data for image and video acquisition and processing. Automatic exposure with simulated histogram data for image and video acquisition and processing includes accessing current input image data including a current input image, obtaining adaptive acquisition control output data, and outputting the adaptive acquisition control output data for subsequent image acquisition. Obtaining the adaptive acquisition control output data may include obtaining a noise-blur exposure duration value in accordance with a minimal simulated noise-blur cost value from simulated noise-blur cost data obtained in accordance with simulated noise data and simulated blur data obtained in accordance with the current input image data and candidate exposure data. Obtaining the adaptive acquisition control output data may include obtaining a saturation exposure value in accordance with a minimal simulated saturation cost value from simulated saturation cost data obtained in accordance with simulated black saturation data and simulated white saturation data obtained in accordance with the current input image data and the candidate exposure data. Obtaining the adaptive acquisition control output data may include determining whether the noise-blur exposure duration value is greater than or equal to the result of dividing the saturation exposure value by the maximum gain value. Obtaining the adaptive acquisition control output data may include determining whether the noise-blur exposure duration value is less than or equal to a result of dividing the saturation exposure value by a minimum gain value. Obtaining the adaptive acquisition control output data may include determining that the noise-blur exposure duration value is greater than or equal to the result of dividing the saturation exposure value by the maximum gain value. Obtaining the adaptive acquisition control output data may include determining that the noise-blur exposure duration value is less than or equal to a result of dividing the saturation exposure value by a minimum gain value. Obtaining the adaptive acquisition control output data may include, in response to the determination that the noise-blur exposure duration value is greater than or equal to the result of dividing the saturation exposure value by the maximum gain value and the determination that the noise-blur exposure duration value is less than or equal to the result of dividing the saturation exposure value by the minimum gain value, obtaining the noise-blur exposure duration value as the target exposure duration value and obtaining, as the target gain value, a result of dividing the saturation exposure value by the noise-blur exposure duration value.

Another aspect of the disclosure is an image capture apparatus that implements automatic exposure with simulated histogram data for image and video acquisition and processing. The image capture apparatus includes an image sensor and an image processing pipeline. The image processing pipeline may be configured to access current input image data that includes a current input image, obtain adaptive acquisition control output data, and output the adaptive acquisition control output data for subsequent image acquisition. To obtain the adaptive acquisition control output data the image processing pipeline may be configured to may obtain a noise-blur exposure duration value in accordance with a minimal simulated noise-blur cost value from simulated noise-blur cost data obtained in accordance with simulated noise data and simulated blur data obtained in accordance with the current input image data and candidate exposure data. To obtain the adaptive acquisition control output data the image processing pipeline may be configured to obtain a saturation exposure value in accordance with a minimal simulated saturation cost value from simulated saturation cost data obtained in accordance with simulated black saturation data and simulated white saturation data obtained in accordance with the current input image data and the candidate exposure data. To obtain the adaptive acquisition control output data the image processing pipeline may be configured to determine whether the noise-blur exposure duration value is greater than or equal to the result of division of the saturation exposure value by the maximum gain value. To obtain the adaptive acquisition control output data the image processing pipeline may be configured to determine whether the noise-blur exposure duration value is less than or equal to a result of division of the saturation exposure value by a minimum gain value. To obtain the adaptive acquisition control output data the image processing pipeline may be configured to determine that the noise-blur exposure duration value is greater than or equal to the result of division of the saturation exposure value by the maximum gain value. To obtain the adaptive acquisition control output data the image processing pipeline may be configured to determine that the noise-blur exposure duration value is less than or equal to a result of division of the saturation exposure value by a minimum gain value. To obtain the adaptive acquisition control output data the image processing pipeline may be configured to, in response to a determination that the noise-blur exposure duration value is greater than or equal to the result of division of the saturation exposure value by the maximum gain value and a determination that the noise-blur exposure duration value is less than or equal to a result of division of the saturation exposure value by a minimum gain value, obtain the noise-blur exposure duration value as the target exposure duration value and obtain, as the target gain value, a result of division of the saturation exposure value by the noise-blur exposure duration value.

Another aspect is a non-transitory computer-readable storage medium having stored thereon instructions for automatic exposure with simulated histogram data for image and video acquisition and processing that are executed by a processor. Automatic exposure with simulated histogram data for image and video acquisition and processing includes accessing current input image data including a current input image, obtaining adaptive acquisition control output data, and outputting the adaptive acquisition control output data for subsequent image acquisition. Obtaining the adaptive acquisition control output data may include obtaining a noise-blur exposure duration value in accordance with a minimal simulated noise-blur cost value from simulated noise-blur cost data obtained in accordance with simulated noise data and simulated blur data obtained in accordance with the current input image data and candidate exposure data. Obtaining the adaptive acquisition control output data may include obtaining a saturation exposure value in accordance with a minimal simulated saturation cost value from simulated saturation cost data obtained in accordance with simulated black saturation data and simulated white saturation data obtained in accordance with the current input image data and the candidate exposure data. Obtaining the adaptive acquisition control output data may include determining whether the noise-blur exposure duration value is greater than or equal to the result of dividing the saturation exposure value by the maximum gain value. Obtaining the adaptive acquisition control output data may include determining whether the noise-blur exposure duration value is less than or equal to a result of dividing the saturation exposure value by a minimum gain value. Obtaining the adaptive acquisition control output data may include determining that the noise-blur exposure duration value is greater than or equal to the result of dividing the saturation exposure value by the maximum gain value. Obtaining the adaptive acquisition control output data may include determining that the noise-blur exposure duration value is less than or equal to a result of dividing the saturation exposure value by a minimum gain value. Obtaining the adaptive acquisition control output data may include, in response to the determination that the noise-blur exposure duration value is greater than or equal to the result of dividing the saturation exposure value by the maximum gain value and the determination that the noise-blur exposure duration value is less than or equal to the result of dividing the saturation exposure value by the minimum gain value, obtaining the noise-blur exposure duration value as the target exposure duration value and obtaining, as the target gain value, a result of dividing the saturation exposure value by the noise-blur exposure duration value.

An aspect of the disclosure is a method for automatic exposure with simulated histogram data for image and video acquisition and processing. Automatic exposure with simulated histogram data for image and video acquisition and processing includes accessing current input image data including a current input image, obtaining adaptive acquisition control output data, and outputting the adaptive acquisition control output data for subsequent image acquisition. Obtaining the adaptive acquisition control output data may include obtaining a noise-blur exposure duration value in accordance with a minimal simulated noise-blur cost value from simulated noise-blur cost data obtained in accordance with simulated noise data and simulated blur data obtained in accordance with the current input image data and candidate exposure data. Obtaining the adaptive acquisition control output data may include obtaining a saturation exposure value in accordance with a minimal simulated saturation cost value from simulated saturation cost data obtained in accordance with simulated black saturation data and simulated white saturation data obtained in accordance with the current input image data and the candidate exposure data. Obtaining the adaptive acquisition control output data may include determining whether the noise-blur exposure duration value is greater than a result of dividing the saturation exposure value by a minimum gain value. Obtaining the adaptive acquisition control output data may include determining that the noise-blur exposure duration value is greater than a result of dividing the saturation exposure value by a minimum gain value. Obtaining the adaptive acquisition control output data may include, in response to a determination that the noise-blur exposure duration value is greater than a result of dividing the saturation exposure value by the minimum gain value, obtaining the minimum gain value as the target gain value and obtaining the target exposure duration value in accordance with a minimal simulated noise-saturation cost value from simulated noise-saturation cost data obtained in accordance with the simulated noise data and the simulated white saturation data.

Another aspect of the disclosure is an image capture apparatus that implements automatic exposure with simulated histogram data for image and video acquisition and processing. The image capture apparatus includes an image sensor and an image processing pipeline. The image processing pipeline may be configured to access current input image data that includes a current input image, obtain adaptive acquisition control output data, and output the adaptive acquisition control output data for subsequent image acquisition. To obtain the adaptive acquisition control output data the image processing pipeline may be configured to may obtain a noise-blur exposure duration value in accordance with a minimal simulated noise-blur cost value from simulated noise-blur cost data obtained in accordance with simulated noise data and simulated blur data obtained in accordance with the current input image data and candidate exposure data. To obtain the adaptive acquisition control output data the image processing pipeline may be configured to obtain a saturation exposure value in accordance with a minimal simulated saturation cost value from simulated saturation cost data obtained in accordance with simulated black saturation data and simulated white saturation data obtained in accordance with the current input image data and the candidate exposure data. To obtain the adaptive acquisition control output data the image processing pipeline may be configured to determine whether the noise-blur exposure duration value is greater than a result of dividing the saturation exposure value by a minimum gain value To obtain the adaptive acquisition control output data the image processing pipeline may be configured to determine that the noise-blur exposure duration value is greater than a result of dividing the saturation exposure value by a minimum gain value. To obtain the adaptive acquisition control output data the image processing pipeline may be configured to, in response to a determination that the noise-blur exposure duration value is greater than the result of division of the saturation exposure value by the minimum gain value, obtain the minimum gain value as the target gain value and obtain the target exposure duration value in accordance with a minimal simulated noise-saturation cost value from simulated noise-saturation cost data obtained in accordance with the simulated noise data and the simulated white saturation data.

Another aspect is a non-transitory computer-readable storage medium having stored thereon instructions for automatic exposure with simulated histogram data for image and video acquisition and processing that are executed by a processor. Automatic exposure with simulated histogram data for image and video acquisition and processing includes accessing current input image data including a current input image, obtaining adaptive acquisition control output data, and outputting the adaptive acquisition control output data for subsequent image acquisition. Obtaining the adaptive acquisition control output data may include obtaining a noise-blur exposure duration value in accordance with a minimal simulated noise-blur cost value from simulated noise-blur cost data obtained in accordance with simulated noise data and simulated blur data obtained in accordance with the current input image data and candidate exposure data. Obtaining the adaptive acquisition control output data may include obtaining a saturation exposure value in accordance with a minimal simulated saturation cost value from simulated saturation cost data obtained in accordance with simulated black saturation data and simulated white saturation data obtained in accordance with the current input image data and the candidate exposure data. Obtaining the adaptive acquisition control output data may include determining whether the noise-blur exposure duration value is greater than a result of dividing the saturation exposure value by a minimum gain value. Obtaining the adaptive acquisition control output data may include determining that the noise-blur exposure duration value is greater than a result of dividing the saturation exposure value by a minimum gain value. Obtaining the adaptive acquisition control output data may include, in response to a determination that the noise-blur exposure duration value is greater than a result of dividing the saturation exposure value by the minimum gain value, obtaining the minimum gain value as the target gain value and obtaining the target exposure duration value in accordance with a minimal simulated noise-saturation cost value from simulated noise-saturation cost data obtained in accordance with the simulated noise data and the simulated white saturation data.

In the aspects described herein, obtaining the adaptive acquisition control output data may include obtaining the adaptive acquisition control output data by an exposure control component of an image capture apparatus and the image capture apparatus captured the current input image in accordance with current adaptive acquisition control data, wherein the current adaptive acquisition control data may include current exposure data that may include a current exposure value that indicates a current exposure duration value and a current gain value.

In the aspects described herein, obtaining the adaptive acquisition control output data may include accessing the candidate exposure data, wherein the candidate exposure data indicates a defined cardinality of candidate exposure duration values, including at least one candidate exposure duration value that differs from the current exposure duration value.

In the aspects described herein, accessing the candidate exposure data may include obtaining the candidate exposure duration values in a range from a defined minimum exposure duration value to a maximum exposure duration value in accordance with a distribution type.

In the aspects described herein, the distribution type may be linear distribution or logarithmic distribution.

In the aspects described herein, obtaining the candidate exposure duration values may include obtaining the candidate exposure duration values in accordance with a defined flicker frequency.

In the aspects described herein, accessing the current input image may include accessing current input image data including the current input image, wherein the current input image data may include current histogram data corresponding to the current input image.

In the aspects described herein, obtaining the adaptive acquisition control output data may include obtaining, on a per-candidate basis with respect to the candidate exposure duration values, simulated quality data in accordance with the current input image data and the candidate exposure data. Obtaining the simulated quality data may include accessing current candidate exposure data from the candidate exposure data, wherein the current candidate exposure data indicates a current candidate exposure duration value from the candidate exposure duration values.

In the aspects described herein, obtaining the simulated quality data may include obtaining simulated histogram data in accordance with the current input image data and the current candidate exposure data.

In the aspects described herein, obtaining the simulated histogram data may include obtaining, as an exposure ratio value, a result of dividing the current candidate exposure duration value by the current exposure duration value, in response to a determination that the current candidate exposure duration value is greater than the current exposure duration value, obtaining the simulated histogram data by performing histogram dilation in accordance with the current histogram data and the exposure ratio value, and, in response to a determination that the current candidate exposure duration value is less than or equal to the current exposure duration value, obtaining the simulated histogram data by performing histogram compression in accordance with the current histogram data and the exposure ratio value.

In the aspects described herein, histogram dilation may include, for a control value in a range from zero to one less than a maximum bin index value from the current histogram data, obtaining, as a first value, an integer portion of a result of dividing the control value by the exposure ratio value, obtaining, as a second value, a minimal value among one and a result of multiplying a sum of the first value and one by a result of subtracting the control value from the exposure ratio value, obtaining, as a bin cardinality value for a simulated bin of the simulated histogram data at an index value matching the control value, an integer portion of a result of dividing, by the exposure ratio value, a result of multiplying the second value, a sum of a bin cardinality value from a bin from the current histogram data having an index value that matches the first value and a result of subtracting the second value from one, and a bin cardinality value from a bin from the current histogram data having an index value that matches a result of subtracting one from the first value, and obtaining, as a bin cardinality value for a simulated bin of the simulated histogram data at an index value that matches the maximum index value, a result of subtracting a sum of the bin cardinality values from the simulated histogram data from a sum of the bin cardinality values from the current histogram data.

In the aspects described herein, histogram compression may include, for a first control value in a range from zero to an integer portion of a result of dividing a maximum bin index value from the current histogram data by the exposure ratio value, obtaining, as a first value, a result of multiplying the first control value by the exposure ratio value, obtaining, as a second value, a minimal integer value greater than or equal to the first value, in response to a determination that the first value matches the second value, obtaining, as a third value, zero, in response to a determination that the first value differs from the second value, obtaining, as the third value, a result of adding the second value to a result of subtracting the first value from one, obtaining, as a fourth value, a result of subtracting one from an integer portion of a result of multiplying the exposure ratio value by a sum of one and the first control value, obtaining, as a fifth value, a result of multiplying the sum of one and the first control value by a result of subtracting, from the exposure ratio value, a sum of the fourth value and one, obtaining, as a bin cardinality value for a simulated bin of the simulated histogram data at an index value that matches the first control value, a result of multiplying the third value, a sum of a bin cardinality value for a bin from the current histogram data at an index value that matches one less than the second value, a sum of bin cardinality values from bins from the current histogram data at bin index values that are greater than or equal to the second value and are less than or equal to the fourth value, and the fifth value, and a bin cardinality value for a bin from the current histogram data at an index value that matches a sum of the fourth value and one, obtaining, as a saturated pixels value, a bin cardinality value for a bin from the current histogram data at an index value that matches the maximum bin index value, for a second control value in a range from a sum of one and the integer portion of the result of dividing the maximum bin index value by the exposure ratio value to one less than the maximum bin index value, obtaining, as a bin cardinality value for a simulated bin of the simulated histogram data at an index value that matches the second control value, an integer portion of a result of multiplying a defined desaturation value by the saturated pixels value, obtaining, as the saturated pixels value, a result of subtracting, from the saturated pixels value, the bin cardinality value for the simulated bin of the simulated histogram data at the index value that matches the second control value, and obtaining, as a bin cardinality value for a simulated bin of the simulated histogram data at an index value that matches the maximum bin index value, the saturated pixels value.

In the aspects described herein, obtaining the simulated quality data may include obtaining the simulated noise data. Obtaining the simulated noise data may include obtaining a simulated noise value in accordance with the simulated histogram data, obtaining a simulated noise cost value in accordance with the simulated noise value and a defined noise cost function, and including the simulated noise cost value in the simulated noise data.

In the aspects described herein, obtaining the simulated noise value may include obtaining, as the simulated noise value, a signal to noise ratio value with respect to bins from the simulated histogram data that represent values that are less than a defined dark threshold.

In the aspects described herein, the defined noise cost function may be a piecewise linear function.

In the aspects described herein, obtaining the simulated quality data may include obtaining the simulated blur data. Obtaining the simulated blur data may include obtaining a simulated motion blur length value in accordance with motion data obtained in accordance with capturing the current input image, obtaining a simulated blur cost value in accordance with the simulated motion blur length value and a defined blur cost function, and including the simulated blur cost value in the simulated blur data.

In the aspects described herein, obtaining the simulated motion blur length value may include obtaining a motion blur speed value indicating, as a percentage of a diagonal size of the current input image, motion of the image capture apparatus with respect to a temporal span that is a reciprocal of a current frame rate, corresponding to capturing the current input image, and obtaining, as a simulated motion blur length value, a result of multiplying the motion blur speed value by the current candidate exposure duration value.

In the aspects described herein, obtaining the simulated blur cost value may include obtaining the simulated blur cost value in accordance with the simulated motion blur length value and the defined blur cost function.

In the aspects described herein, obtaining the noise-blur exposure duration value may include obtaining the simulated noise-blur cost data, on a per-candidate basis with respect to the candidate exposure duration values, wherein, for a respective candidate exposure duration value from the candidate exposure duration values. Obtaining the simulated noise-blur cost data may include obtaining, as a simulated noise-blur cost value, a Euclidian distance between a respective simulated noise cost value for the respective candidate exposure duration value from the simulated noise data and a corresponding simulated blur cost value from the simulated blur data, and including the simulated noise-blur cost value in the simulated noise-blur cost data.

In the aspects described herein, obtaining the simulated quality data may include obtaining the simulated black saturation data. Obtaining the simulated black saturation data may include obtaining a simulated black saturation value in accordance with the simulated histogram data, wherein the candidate exposure data may include candidate exposure values, wherein the current candidate exposure data indicates a current candidate exposure value from the candidate exposure values, wherein the current candidate exposure value indicates the current candidate exposure duration value, obtaining a simulated black saturation cost value in accordance with the simulated black saturation value and a defined black saturation cost function, and including the simulated black saturation cost value in the simulated black saturation data.

In the aspects described herein, obtaining the simulated black saturation value may include obtaining, as the simulated black saturation value, a bin cardinality of a minimum index bin from the simulated histogram data.

In the aspects described herein, obtaining the simulated quality data may include obtaining the simulated white saturation data. Obtaining the simulated white saturation data may include obtaining a simulated white saturation value in accordance with the simulated histogram data, obtaining a simulated white saturation cost value in accordance with the simulated white saturation value and a defined white saturation cost function, and including the simulated white saturation cost value in the simulated white saturation data.

In the aspects described herein, obtaining the simulated white saturation value may include obtaining, as the simulated white saturation value, a cumulative bin cardinality of at least one bin from the simulated histogram data corresponding to pixel values greater than a result of dividing a maximum bin index of the simulated histogram data by a white balance scale value.

In the aspects described herein, obtaining the saturation exposure value may include obtaining the simulated saturation cost data, on a per-candidate basis with respect to the candidate exposure duration values. For a respective candidate exposure value from the candidate exposure values, obtaining the simulated saturation cost data may include obtaining, as a simulated saturation cost value, a Euclidian distance between a respective simulated black saturation cost value for the respective candidate exposure value from the simulated black saturation data and a corresponding simulated white saturation cost value from the simulated white saturation data, and including the simulated saturation cost value in the simulated saturation cost data.

In the aspects described herein, obtaining the target exposure duration value may include obtaining the simulated blur-saturation cost data, on a per-candidate exposure duration value basis with respect to the candidate exposure duration values. for a respective candidate exposure duration value from the candidate exposure duration values, obtaining the simulated blur-saturation cost data may include obtaining, as a simulated blur-saturation cost value, a Euclidian distance between a respective simulated blur cost value for the respective candidate exposure value from the simulated blur data and a corresponding simulated black saturation cost value from the simulated black saturation data, and including the simulated blur-saturation cost value in the simulated blur-saturation cost data.

In the aspects described herein, obtaining the target exposure duration value may include obtaining the simulated noise-saturation cost data, on a per-candidate exposure duration value basis with respect to the candidate exposure duration values. For a respective candidate exposure duration value from the candidate exposure duration values, obtaining the simulated noise-saturation cost data may include obtaining, as a simulated noise-saturation cost value, a Euclidian distance between a respective simulated noise cost value for the respective candidate exposure value from the simulated noise data and a corresponding simulated white saturation cost value from the simulated white saturation data, and including the simulated noise-saturation cost value in the simulated noise-saturation cost data.

In the aspects described herein, obtaining the adaptive acquisition control output data may include obtaining a smoothed target exposure duration value by smoothing the target exposure duration value, using the smoothed target exposure duration value as the target exposure duration value, obtaining a smoothed target exposure value by smoothing the target exposure value, and using the smoothed target exposure value as the target exposure value.

The aspects described herein may include performing any combination of obtaining the adaptive acquisition control output data by an exposure control component of an image capture apparatus, the image capture apparatus captured the current input image in accordance with current adaptive acquisition control data, wherein the current adaptive acquisition control data may include current exposure data that may include a current exposure value that indicates a current exposure duration value and a current gain value, accessing the candidate exposure data, wherein the candidate exposure data indicates a defined cardinality of candidate exposure duration values, including at least one candidate exposure duration value that differs from the current exposure duration value, obtaining the candidate exposure duration values in a range from a defined minimum exposure duration value to a maximum exposure duration value in accordance with a distribution type, using, as the distribution type, a linear distribution or a logarithmic distribution, obtaining the candidate exposure duration values in accordance with a defined flicker frequency, accessing current input image data including the current input image, wherein the current input image data may include current histogram data corresponding to the current input image, obtaining, on a per-candidate basis with respect to the candidate exposure duration values, simulated quality data in accordance with the current input image data and the candidate exposure data, accessing current candidate exposure data from the candidate exposure data, wherein the current candidate exposure data indicates a current candidate exposure duration value from the candidate exposure duration values, obtaining simulated histogram data in accordance with the current input image data and the current candidate exposure data, obtaining, as an exposure ratio value, a result of dividing the current candidate exposure duration value by the current exposure duration value, in response to a determination that the current candidate exposure duration value is greater than the current exposure duration value, obtaining the simulated histogram data by performing histogram dilation in accordance with the current histogram data and the exposure ratio value, in response to a determination that the current candidate exposure duration value is less than or equal to the current exposure duration value, obtaining the simulated histogram data by performing histogram compression in accordance with the current histogram data and the exposure ratio value, for a control value in a range from zero to one less than a maximum bin index value from the current histogram data obtaining, as a first value, an integer portion of a result of dividing the control value by the exposure ratio value, for a control value in a range from zero to one less than a maximum bin index value from the current histogram data obtaining, as a second value, a minimal value among one and a result of multiplying a sum of the first value and one by a result of subtracting the control value from the exposure ratio value, obtaining, as a bin cardinality value for a simulated bin of the simulated histogram data at an index value matching the control value, an integer portion of a result of dividing, by the exposure ratio value, a result of multiplying the second value, a sum of a bin cardinality value from a bin from the current histogram data having an index value that matches the first value and a result of subtracting the second value from one, and a bin cardinality value from a bin from the current histogram data having an index value that matches a result of subtracting one from the first value, obtaining, as a bin cardinality value for a simulated bin of the simulated histogram data at an index value that matches the maximum index value, a result of subtracting a sum of the bin cardinality values from the simulated histogram data from a sum of the bin cardinality values from the current histogram data, for a first control value in a range from zero to an integer portion of a result of dividing a maximum bin index value from the current histogram data by the exposure ratio value obtaining, as a first value, a result of multiplying the first control value by the exposure ratio value, obtaining, as a second value, a minimal integer value greater than or equal to the first value, in response to a determination that the first value matches the second value, obtaining, as a third value, zero, in response to a determination that the first value differs from the second value, obtaining, as the third value, a result of adding the second value to a result of subtracting the first value from one, obtaining, as a fourth value, a result of subtracting one from an integer portion of a result of multiplying the exposure ratio value by a sum of one and the first control value, obtaining, as a fifth value, a result of multiplying the sum of one and the first control value by a result of subtracting, from the exposure ratio value, a sum of the fourth value and one, obtaining, as a bin cardinality value for a simulated bin of the simulated histogram data at an index value that matches the first control value, a result of multiplying the third value, a sum of a bin cardinality value for a bin from the current histogram data at an index value that matches one less than the second value, a sum of bin cardinality values from bins from the current histogram data at bin index values that are greater than or equal to the second value and are less than or equal to the fourth value, and the fifth value, and a bin cardinality value for a bin from the current histogram data at an index value that matches a sum of the fourth value and one, obtaining, as a saturated pixels value, a bin cardinality value for a bin from the current histogram data at an index value that matches the maximum bin index value, for a second control value in a range from a sum of one and the integer portion of the result of dividing the maximum bin index value by the exposure ratio value to one less than the maximum bin index value, obtaining, as a bin cardinality value for a simulated bin of the simulated histogram data at an index value that matches the second control value, an integer portion of a result of multiplying a defined desaturation value by the saturated pixels value, obtaining, as the saturated pixels value, a result of subtracting, from the saturated pixels value, the bin cardinality value for the simulated bin of the simulated histogram data at the index value that matches the second control value, obtaining, as a bin cardinality value for a simulated bin of the simulated histogram data at an index value that matches the maximum bin index value, the saturated pixels value, obtaining the simulated noise data, obtaining a simulated noise value in accordance with the simulated histogram data, obtaining a simulated noise cost value in accordance with the simulated noise value and a defined noise cost function, including the simulated noise cost value in the simulated noise data, obtaining, as the simulated noise value, a signal to noise ratio value with respect to bins from the simulated histogram data that represent values that are less than a defined dark threshold, using, as the defined noise cost function, a piecewise linear function, obtaining the simulated blur data, obtaining a simulated motion blur length value in accordance with motion data obtained in accordance with capturing the current input image, obtaining a simulated blur cost value in accordance with the simulated motion blur length value and a defined blur cost function, including the simulated blur cost value in the simulated blur data, obtaining a motion blur speed value indicating, as a percentage of a diagonal size of the current input image, motion of the image capture apparatus with respect to a temporal span that is a reciprocal of a current frame rate, corresponding to capturing the current input image, obtaining, as a simulated motion blur length value, a result of multiplying the motion blur speed value by the current candidate exposure duration value, obtaining the simulated blur cost value in accordance with the simulated motion blur length value and the defined blur cost function, obtaining the simulated noise-blur cost data, on a per-candidate basis with respect to the candidate exposure duration values, wherein, for a respective candidate exposure duration value from the candidate exposure duration values, obtaining, as a simulated noise-blur cost value, a Euclidian distance between a respective simulated noise cost value for the respective candidate exposure duration value from the simulated noise data and a corresponding simulated blur cost value from the simulated blur data, including the simulated noise-blur cost value in the simulated noise-blur cost data, obtaining the simulated black saturation data, obtaining a simulated black saturation value in accordance with the simulated histogram data, wherein the candidate exposure data may include candidate exposure values, wherein the current candidate exposure data indicates a current candidate exposure value from the candidate exposure values, wherein the current candidate exposure value indicates the current candidate exposure duration value, obtaining a simulated black saturation cost value in accordance with the simulated black saturation value and a defined black saturation cost function, including the simulated black saturation cost value in the simulated black saturation data, obtaining, as the simulated black saturation value, a bin cardinality of a minimum index bin from the simulated histogram data, obtaining the simulated white saturation data, obtaining a simulated white saturation value in accordance with the simulated histogram data, obtaining a simulated white saturation cost value in accordance with the simulated white saturation value and a defined white saturation cost function, including the simulated white saturation cost value in the simulated white saturation data, obtaining, as the simulated white saturation value, a cumulative bin cardinality of at least one bin from the simulated histogram data corresponding to pixel values greater than a result of dividing a maximum bin index of the simulated histogram data by a white balance scale value, obtaining the simulated saturation cost data, on a per-candidate basis with respect to the candidate exposure duration values, wherein, for a respective candidate exposure value from the candidate exposure values, obtaining, as a simulated saturation cost value, a Euclidian distance between a respective simulated black saturation cost value for the respective candidate exposure value from the simulated black saturation data and a corresponding simulated white saturation cost value from the simulated white saturation data, including the simulated saturation cost value in the simulated saturation cost data, obtaining the simulated blur-saturation cost data, on a per-candidate exposure duration value basis with respect to the candidate exposure duration values, wherein, for a respective candidate exposure duration value from the candidate exposure duration values, obtaining, as a simulated blur-saturation cost value, a Euclidian distance between a respective simulated blur cost value for the respective candidate exposure value from the simulated blur data and a corresponding simulated black saturation cost value from the simulated black saturation data, including the simulated blur-saturation cost value in the simulated blur-saturation cost data, obtaining the simulated noise-saturation cost data, on a per-candidate exposure duration value basis with respect to the candidate exposure duration values, wherein, for a respective candidate exposure duration value from the candidate exposure duration values, obtaining, as a simulated noise-saturation cost value, a Euclidian distance between a respective simulated noise cost value for the respective candidate exposure value from the simulated noise data and a corresponding simulated white saturation cost value from the simulated white saturation data, including the simulated noise-saturation cost value in the simulated noise-saturation cost data, obtaining a smoothed target exposure duration value by smoothing the target exposure duration value, using the smoothed target exposure duration value as the target exposure duration value, obtaining a smoothed target exposure value by smoothing the target exposure value, and using the smoothed target exposure value as the target exposure value.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 13 is a flow diagram of an example of a histogram dilation.

DETAILED DESCRIPTION

Figure 1A:
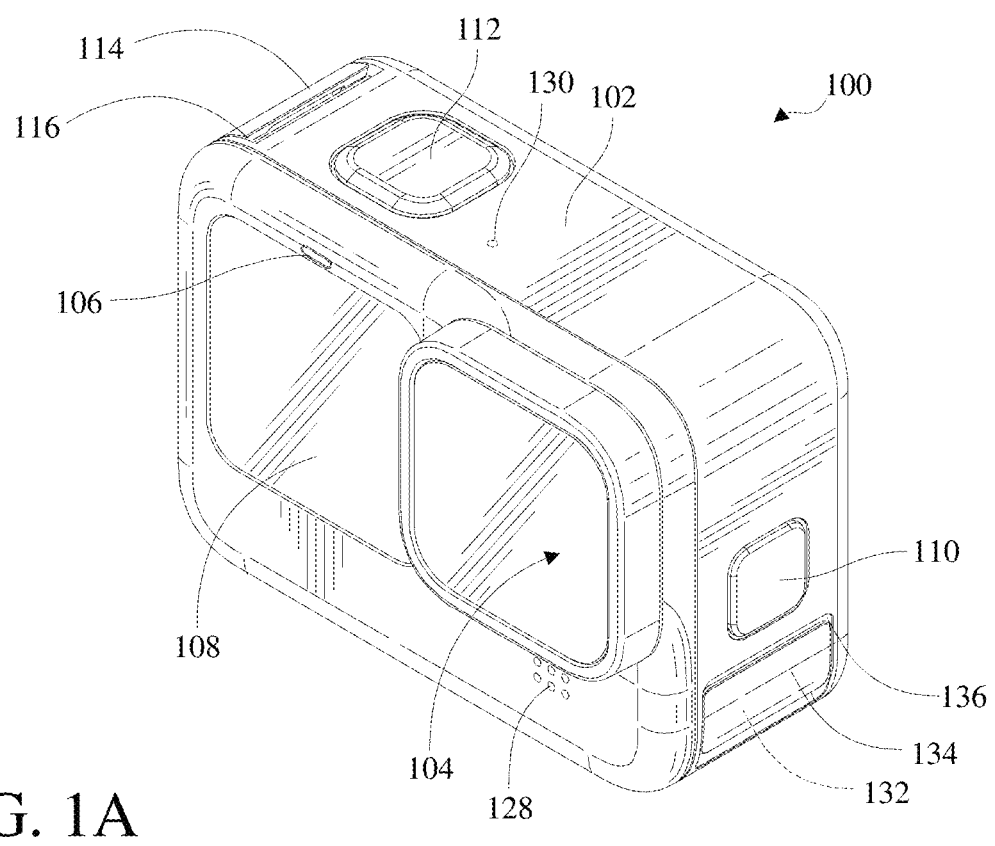
FIGS. 1A-1B are isometric views of an example of an image capture apparatus.

In an image capture apparatus, the quantity of light captured in an image, or frame, correlates to the amount of information captured in the image, or frame, and to image quality. Image quality, such as may be indicated by a signal-to-noise ratio (SNR) measured, calculated, or determined therefor, increases in correlation to the amount of light captured, subject to limitations or conditions, such as saturation and motion blur. The amount of light captured may be controlled, for a respective scene, by controlling the aperture, lens pupil diameter, exposure duration, or a combination thereof. Some image capture apparatuses apply gain to increase, or amplify, the captured image signal. The signal-to-noise ratio of a captured image corresponds with the gain and the gray level, brightness, or luminance, per pixel. An increase in gain for a respective gray level corresponds with a lower signal-to-noise ratio, whereas an increase in the gray level for a respective gain corresponds with a higher signal-to-noise ratio.

Image acquisition conditions, such as lighting conditions, image capture apparatus motion, image capture apparatuses constraints, such as hardware constraints, software constraints, or both, or combinations thereof, may limit the amount of information captured in the image or otherwise limit image quality. For example, in some image capture apparatuses, the aperture, lens pupil diameter, or both, may be fixed and hardware constraints, such as ruggedness constraints, may limit or prevent the use of autofocus, which may correspond with the use of a relatively large depth of field, which may correlate to the amount of light captured by the sensor, as lens pupil diameter influences depth of field. In another example, limitations on maximum pixel values may lead to pixel saturation, limiting the amount of information captured in the image. In another example, the exposure duration may be limited by the framerate, which may be expressed as frames per second (fps), such that determining a maximum exposure duration (expDurMax) may be expressed as expDurMax=1/fps, and the combination of exposure duration and image capture apparatus motion may correlate to motion blur, which may limit, such as reduce the strength of, the performance of electronic image stabilization (EIS). For example, relatively high exposure duration and image capture apparatus motion corresponds with relatively high motion blur.

The amount of information captured in a frame, image quality, or both, may be optimized by balancing with respect to signal-to-noise ratio, pixel saturation, and motion blur. For example, an image capture apparatus may include an adaptive acquisition control component that may include an auto-exposure component that automatically determines one or more adaptive acquisition control parameters, such as an exposure duration value, a sensor gain value, an aperture value, or a combination thereof, for controlling an image sensor of the image capture apparatus to capture one or more images, or frames, to optimize the amount of information, quality, or both, per frame as captured. In another example, the adaptive acquisition control component may include a tone control component, such as a global tone mapping component, which processes captured images, or frames, to maximize perceived quality of resulting processed, or partially processed, images, or frames, output by the image capture apparatus, such as for presentation to a user.

Limitations of image capture apparatuses may result in sub-optimal captured image quality, such as noisy or blurry images, uncaptured information, such as with respect to saturated pixels, or a combination thereof. For example, in some image capture apparatus, an auto-exposure component may identify an exposure duration value, a sensor gain value, or both, that are relatively high, which may result in captured images having saturated portions, or that are relatively low, which may result in an overly dark image. In another example, in relatively bright lighting conditions, a relatively high exposure duration may result in overly bright and saturated image portions, which may include values for some pixels clipped at the maximum value of the sensor such that image detail is unavailable.

Limitations of image capture apparatuses may result in sub-optimal output image quality, such as overly bright or overly dark images, or frames. For example, a tone control component may have limited adaptability to rapid changes in scene composition. In another example, a tone control component may be limited, constrained, or both, such that processed images are too dark in some areas, such as shadow areas. In another example, another image processing component of the image capture apparatus, such as an auto-exposure compensation component or a local tone mapping component, may be constrained by or may be inconsistent, or conflicting, with the tone control component, which may result in a tone curve determined for processing an image to reach a target histogram that is far from the current one (after auto-exposure compensation), resulting reduced image quality, such as including over-boosted shadows.

Automatic exposure with simulated histogram data for image and video acquisition and processing, as described herein, improves the efficiency, accuracy, or both, of image capture, video capture, or both, by obtaining adaptive acquisition control parameters for subsequent image, or video, capture based on previously captured image, or video frame, data, and by balancing noise and motion blur, balancing black and white saturation, balancing motion blur and black saturation, and balancing noise and white saturation.

Figure 1B:
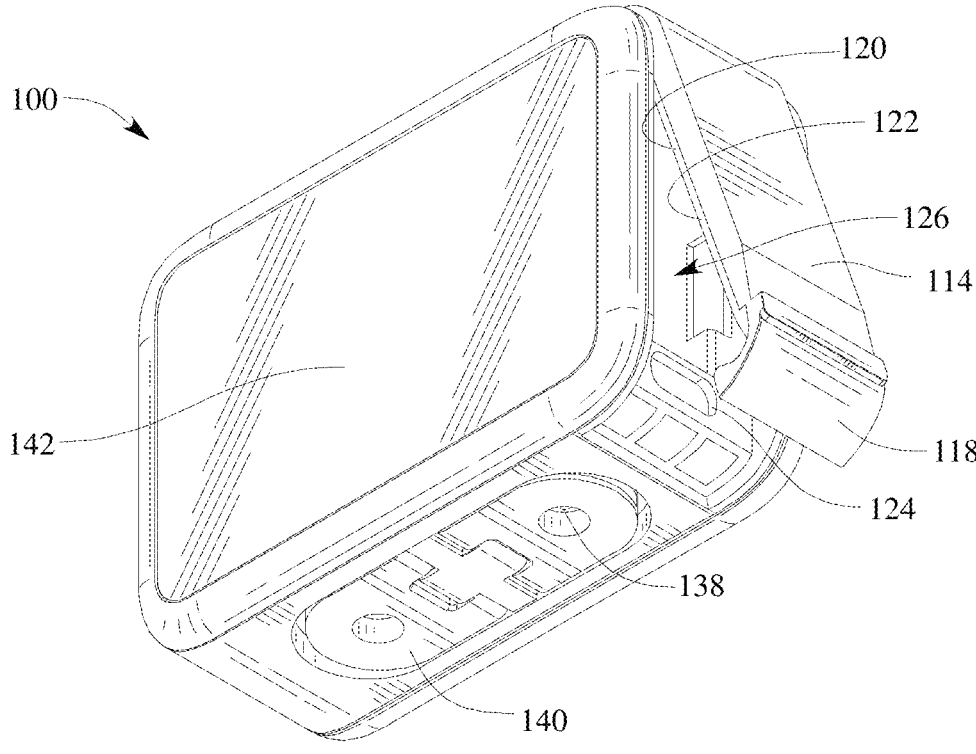
Figure 5:
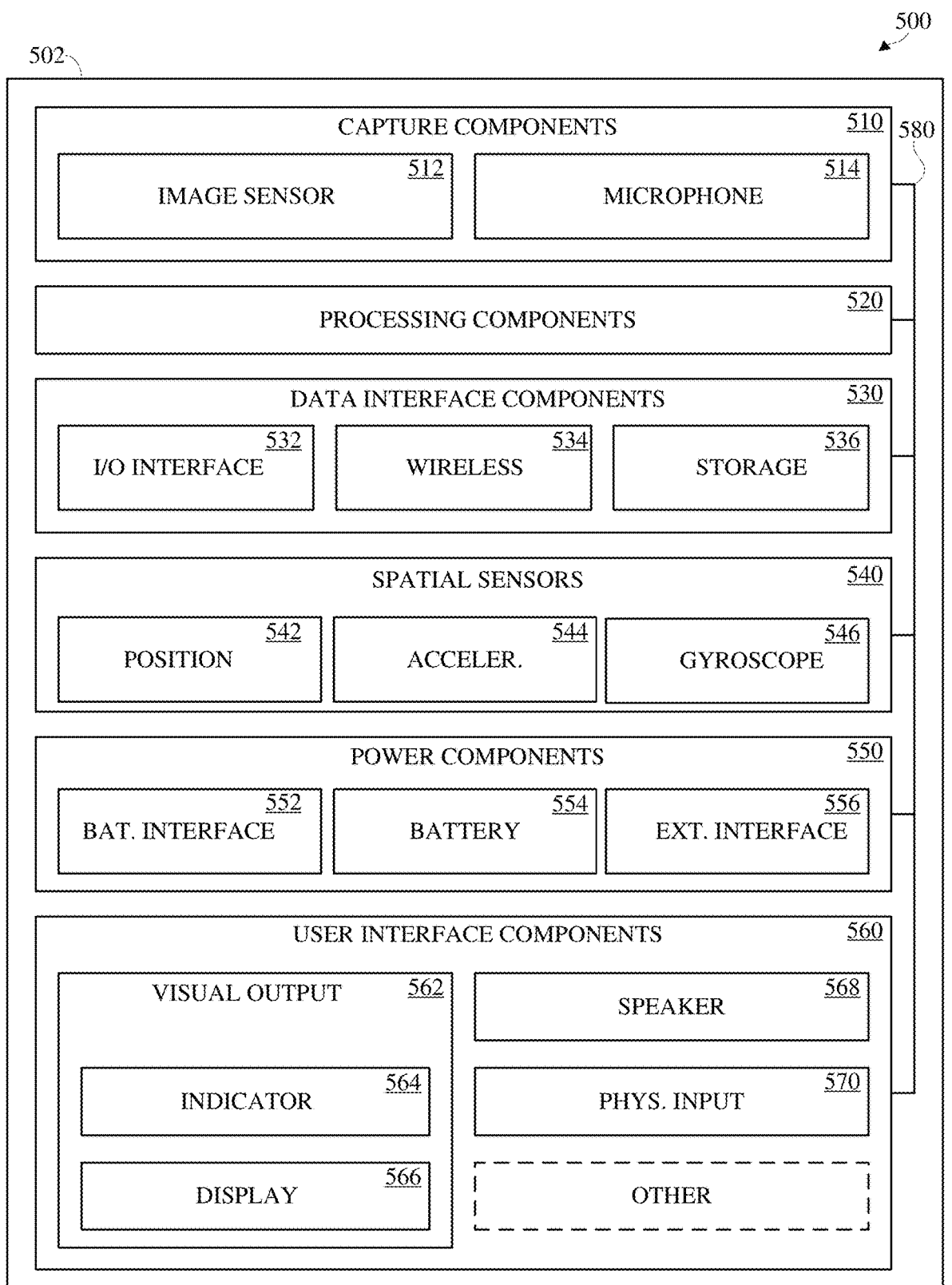
FIG. 5 is a block diagram of electronic components of an image capture apparatus.

FIGS. 1A-1B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-1B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-1B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
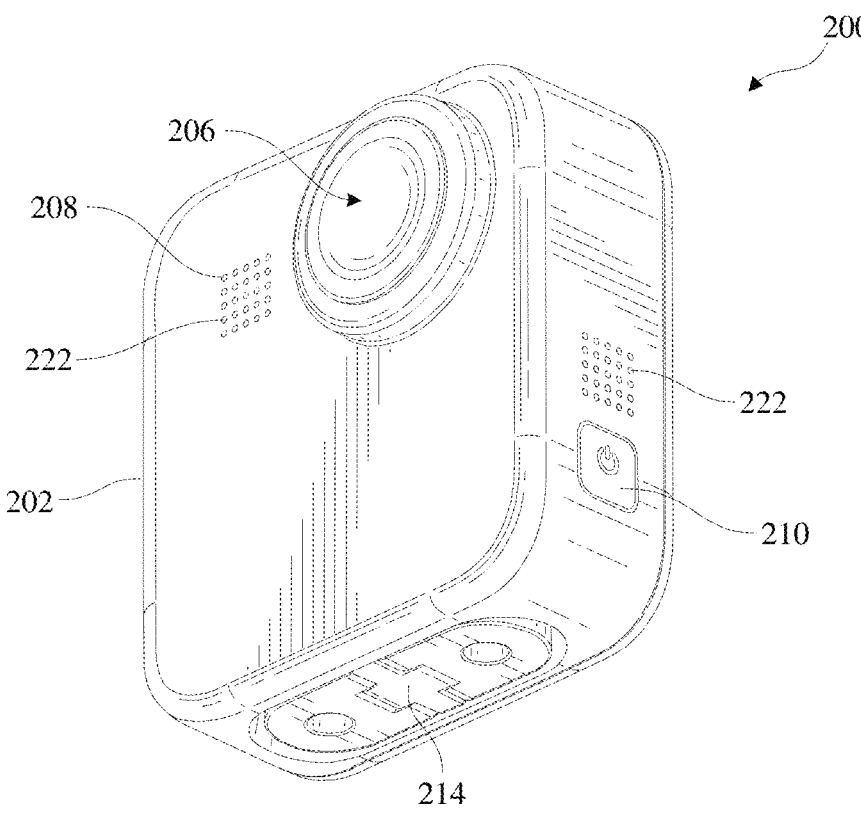
FIGS. 2A-2B are isometric views of another example of an image capture apparatus.
Figure 2B:
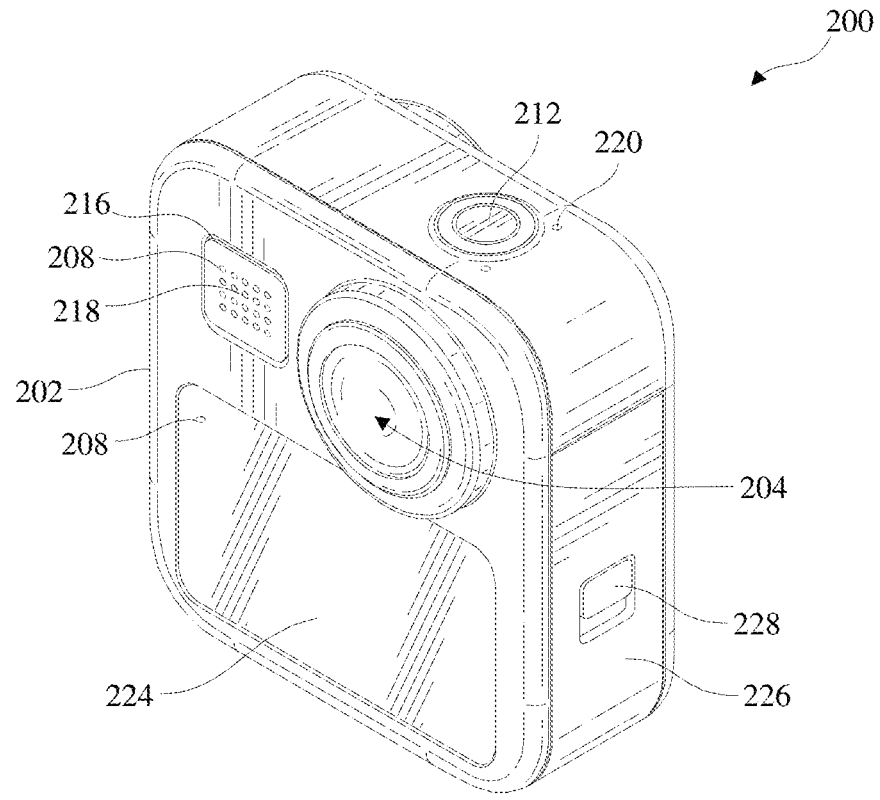

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indicators structured on respective surfaces of the body 202.

As shown in FIGS. 2A-2B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
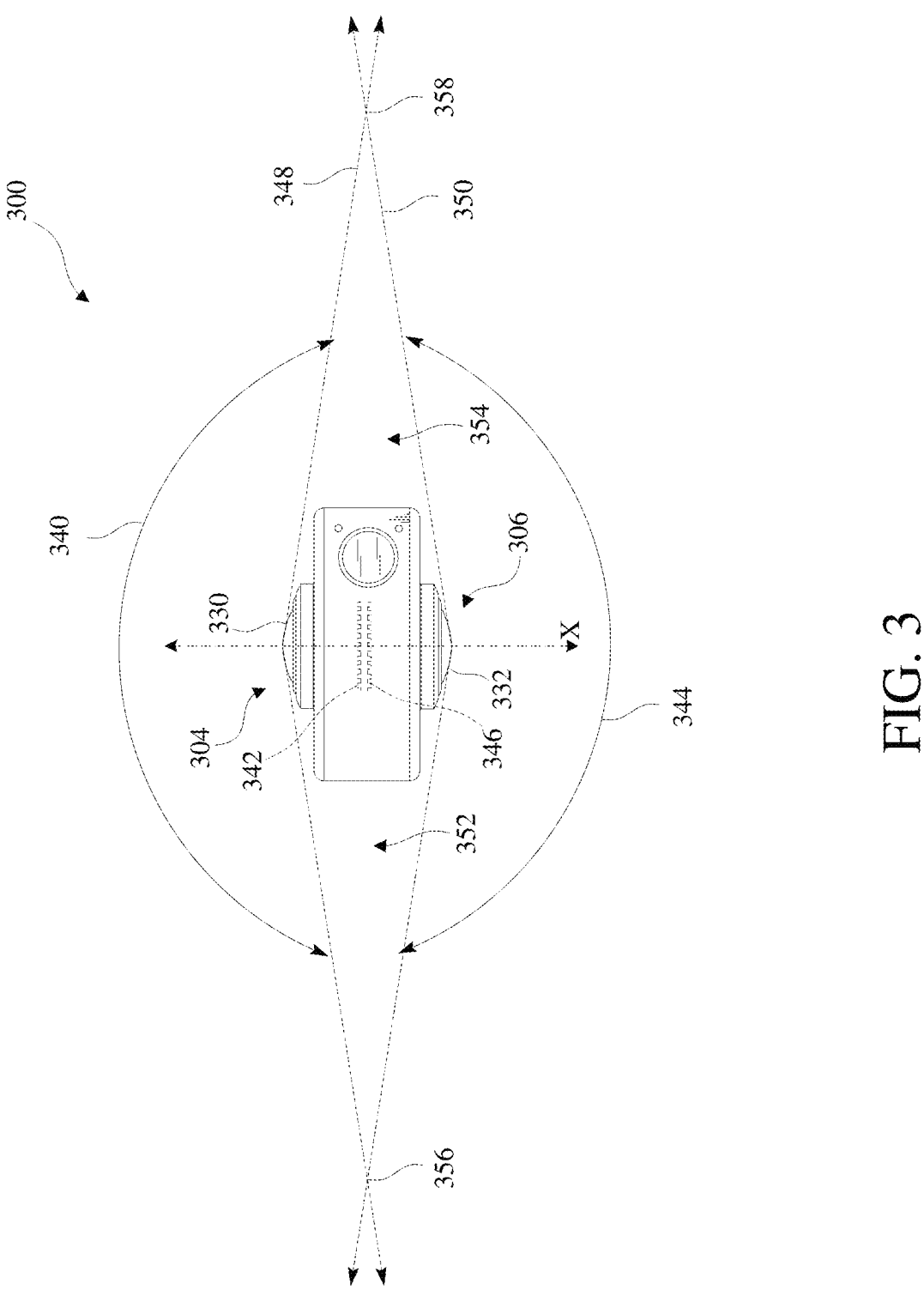
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured (e.g., measured or detected photons) concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
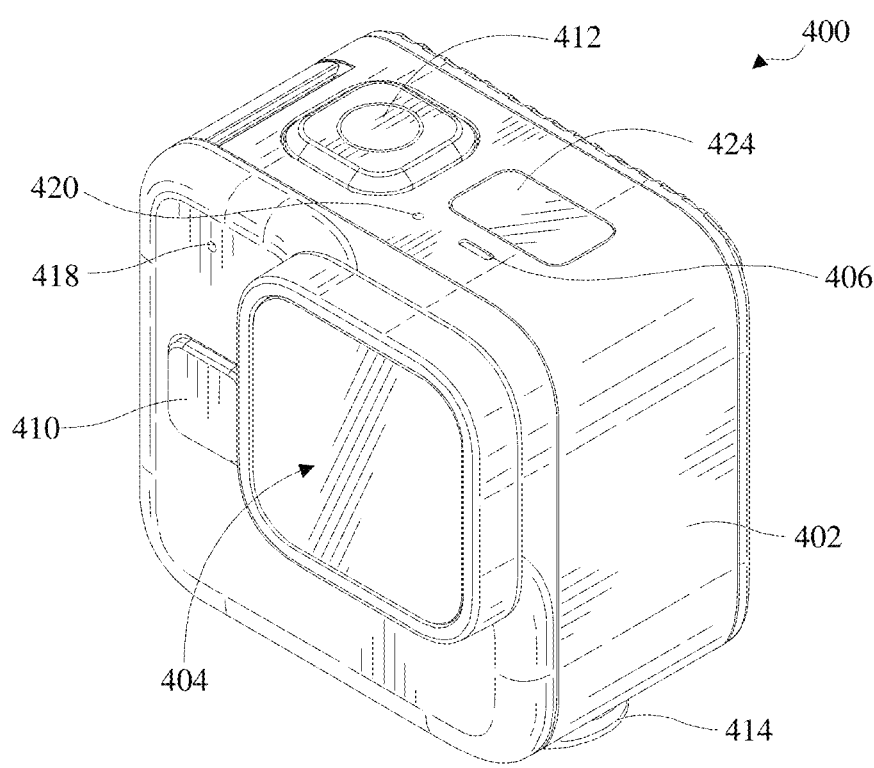
FIGS. 4A-4B are isometric views of another example of an image capture apparatus.
Figure 4B:
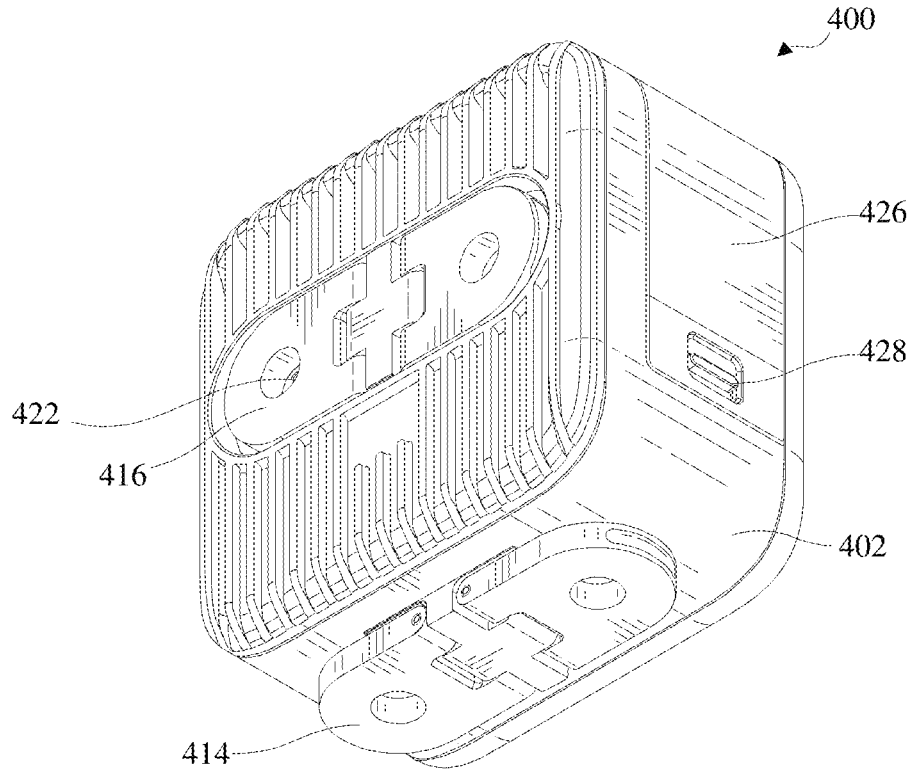

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIGS. 4A, the image capture apparatus 400 may include other indictors structured on respective surfaces of the body 402.

As shown in FIGS. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-1B, the image capture apparatus 200 shown in FIGS. 2A-2B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 captures light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures light as image data and conveys the image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with image acquisition by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may capture, detect, receive, or otherwise process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

Figure 6:
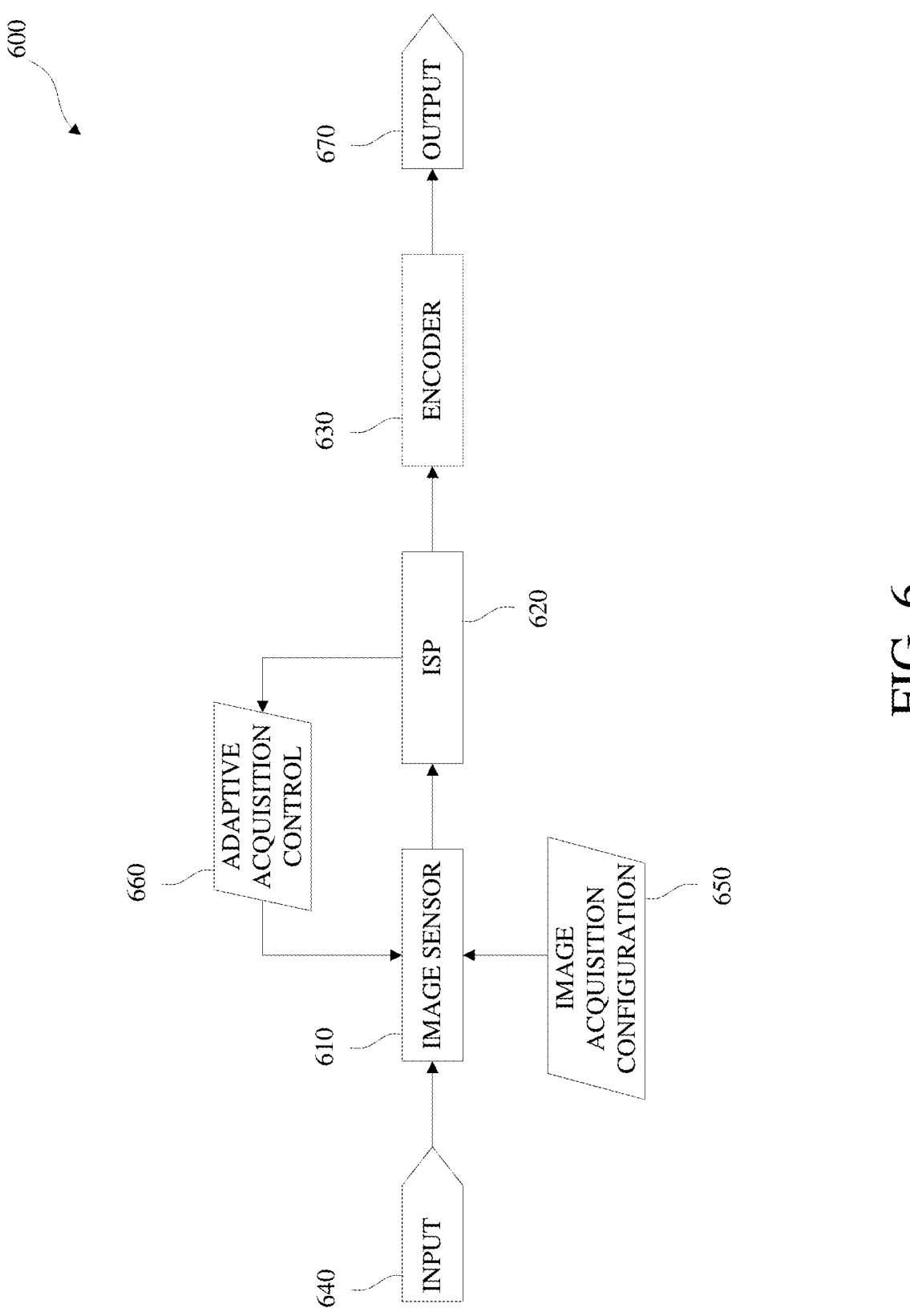
FIG. 6 is a flow diagram of an example of an image processing pipeline.

FIG. 6 is a block diagram of an example of an image processing pipeline 600. The image processing pipeline 600, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or another image capture apparatus. In some implementations, the image processing pipeline 600 may be implemented in a digital signal processor (DSP), an application-specific integrated circuit (ASIC), or a combination of a digital signal processor and an application-specific integrated circuit. One or more components of the pipeline 600 may be implemented in hardware, software, or a combination of hardware and software.

As shown in FIG. 6, the image processing pipeline 600 includes an image sensor 610, an image signal processor (ISP) 620, and an encoder 630. The encoder 630 is shown with a broken line border to indicate that the encoder may be omitted, or absent, from the image processing pipeline 600. In some implementations, the encoder 630 may be included in another device. In implementations that include the encoder 630, the image processing pipeline 600 may be an image processing and coding pipeline. The image processing pipeline 600 may include components other than the components shown in FIG. 6.

The image sensor 610 receives input 640, such as photons incident on the image sensor 610. The image sensor 610 captures image data (source image data). Capturing source image data includes measuring or sensing the input 640, which may include counting, or otherwise measuring, photons incident on the image sensor 610, such as for a defined temporal duration or period (exposure). Capturing source image data includes converting the analog input 640 to a digital source image signal in a defined format, which may be referred to herein as "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern.

Although one image sensor 610 is shown in FIG. 6, the image processing pipeline 600 may include two or more image sensors. In some implementations, an image, or frame, such as an image, or frame, included in the source image signal, may be one of a sequence or series of images or frames of a video, such as a sequence, or series, of frames captured at a rate, or frame rate, which may be a number or cardinality of frames captured per defined temporal period, such as twenty-four, thirty, sixty, or one-hundred twenty frames per second.

The image sensor 610 obtains image acquisition configuration data 650. The image acquisition configuration data 650 may include image cropping parameters, binning/skipping parameters, pixel rate parameters, bitrate parameters, resolution parameters, framerate parameters, or other image acquisition configuration data or combinations of image acquisition configuration data. Obtaining the image acquisition configuration data 650 may include receiving the image acquisition configuration data 650 from a source other than a component of the image processing pipeline 600. For example, the image acquisition configuration data 650, or a portion thereof, may be received from another component, such as a user interface component, of the image capture apparatus implementing the image processing pipeline 600, such as one or more of the user interface components 560 shown in FIG. 5. The image sensor 610 obtains, outputs, or both, the source image data in accordance with the image acquisition configuration data 650. For example, the image sensor 610 may obtain the image acquisition configuration data 650 prior to capturing the source image.

The image sensor 610 receives, or otherwise obtains or accesses, adaptive acquisition control data 660, such as auto exposure (AE) data, auto white balance (AWB) data, global tone mapping (GTM) data, Auto Color Lens Shading (ACLS) data, color correction data, or other adaptive acquisition control data or combination of adaptive acquisition control data. For example, the image sensor 610 receives the adaptive acquisition control data 660 from the image signal processor 620. The image sensor 610 obtains, outputs, or both, the source image data in accordance with the adaptive acquisition control data 660.

The image sensor 610 controls, such as configures, sets, or modifies, one or more image acquisition parameters or settings, or otherwise controls the operation of the image signal processor 620, in accordance with the image acquisition configuration data 650 and the adaptive acquisition control data 660. For example, the image sensor 610 may capture a first source image using, or in accordance with, the image acquisition configuration data 650, and in the absence of adaptive acquisition control data 660 or using defined values for the adaptive acquisition control data 660, output the first source image to the image signal processor 620, obtain adaptive acquisition control data 660 generated using the first source image data from the image signal processor 620, and capture a second source image using, or in accordance with, the image acquisition configuration data 650 and the adaptive acquisition control data 660 generated using the first source image. In an example, the adaptive acquisition control data 660 may include an exposure duration value and the image sensor 610 may capture an image in accordance with the exposure duration value.

The image sensor 610 outputs source image data, which may include the source image signal, image acquisition data, or a combination thereof, to the image signal processor 620.

The image signal processor 620 receives, or otherwise accesses or obtains, the source image data from the image sensor 610. The image signal processor 620 processes the source image data to obtain input image data. In some implementations, the image signal processor 620 converts the raw image signal (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

Processing the source image data includes generating the adaptive acquisition control data 660. The adaptive acquisition control data 660 includes data for controlling the detection or acquisition of a one or more images by the image sensor 610.

The image signal processor 620 includes components not expressly shown in FIG. 6 for obtaining and processing the source image data. For example, the image signal processor 620 may include one or more sensor input (SEN) components (not shown), one or more sensor readout (SRO) components (not shown), one or more image data compression components, one or more image data decompression components, one or more internal memory, or data storage, components, one or more Bayer-to-Bayer (B2B) components, one or more local motion estimation (LME) components, one or more local motion compensation (LMC) components, one or more global motion compensation (GMC) components, one or more Bayer-to-RGB (B2R) components, one or more image processing units (IPU), one or more high dynamic range (HDR) components, one or more three-dimensional noise reduction (3DNR) components, one or more sharpening components, one or more raw-to-YUV (R2Y) components, one or more Chroma Noise Reduction (CNR) components, one or more local tone mapping (LTM) components, one or more YUV-to-YUV (Y2Y) components, one or more warp and blend components, one or more stitching cost components, one or more scaler components, or a configuration controller. The image signal processor 620, or respective components thereof, may be implemented in hardware, software, or a combination of hardware and software. Although one image signal processor 620 is shown in FIG. 6, the image processing pipeline 600 may include multiple image signal processors. In implementations that include multiple image signal processors, the functionality of the image signal processor 620 may be divided or distributed among the image signal processors.

In some implementations, the image signal processor 620 may implement or include multiple parallel, or partially parallel paths for image processing. For example, for high dynamic range image processing based on two source images, the image signal processor 620 may implement a first image processing path for a first source image and a second image processing path for a second source image, wherein the image processing paths may include components that are shared among the paths, such as memory components, and may include components that are separately included in each path, such as a first sensor readout component in the first image processing path and a second sensor readout component in the second image processing path, such that image processing by the respective paths may be performed in parallel, or partially in parallel.

The image signal processor 620, or one or more components thereof, such as the sensor input components, may perform black-point removal for the image data. In some implementations, the image sensor 610 may compress the source image data, or a portion thereof, and the image signal processor 620, or one or more components thereof, such as one or more of the sensor input components or one or more of the image data decompression components, may decompress the compressed source image data to obtain the source image data.

The image signal processor 620, or one or more components thereof, such as the sensor readout components, may perform dead pixel correction for the image data. The sensor readout component may perform scaling for the image data. The sensor readout component may obtain, such as generate or determine, adaptive acquisition control data, such as auto exposure data, auto white balance data, global tone mapping data, Auto Color Lens Shading data, or other adaptive acquisition control data, based on the source image data.

The image signal processor 620, or one or more components thereof, such as the image data compression components, may obtain the image data, or a portion thereof, such as from another component of the image signal processor 620, compress the image data, and output the compressed image data, such as to another component of the image signal processor 620, such as to a memory component of the image signal processor 620.

The image signal processor 620, or one or more components thereof, such as the image data decompression, or uncompression, components (UCX), may read, receive, or otherwise access, compressed image data and may decompress, or uncompress, the compressed image data to obtain image data. In some implementations, other components of the image signal processor 620 may request, such as send a request message or signal, the image data from an uncompression component, and, in response to the request, the uncompression component may obtain corresponding compressed image data, uncompress the compressed image data to obtain the requested image data, and output, such as send or otherwise make available, the requested image data to the component that requested the image data. The image signal processor 620 may include multiple uncompression components, which may be respectively optimized for uncompression with respect to one or more defined image data formats.

The image signal processor 620, or one or more components thereof, such as the internal memory, or data storage, components. The memory components store image data, such as compressed image data internally within the image signal processor 620 and are accessible to the image signal processor 620, or to components of the image signal processor 620. In some implementations, a memory component may be accessible, such as write accessible, to a defined component of the image signal processor 620, such as an image data compression component, and the memory component may be accessible, such as read accessible, to another defined component of the image signal processor 620, such as an uncompression component of the image signal processor 620.

The image signal processor 620, or one or more components thereof, such as the Bayer-to-Bayer components, which may process image data, such as to transform or convert the image data from a first Bayer format, such as a signed 15-bit Bayer format data, to second Bayer format, such as an unsigned 14-bit Bayer format. The Bayer-to-Bayer components may obtain, such as generate or determine, high dynamic range Tone Control data based on the current image data.

Although not expressly shown in FIG. 6, in some implementations, a respective Bayer-to-Bayer component may include one or more sub-components. For example, the Bayer-to-Bayer component may include one or more gain components. In another example, the Bayer-to-Bayer component may include one or more offset map components, which may respectively apply respective offset maps to the image data. The respective offset maps may have a configurable size, which may have a maximum size, such as 129×129. The respective offset maps may have a non-uniform grid. Applying the offset map may include saturation management, which may preserve saturated areas on respective images based on R, G, and B values. The values of the offset map may be modified per-frame and double buffering may be used for the map values. A respective offset map component may, such as prior to Bayer noise removal (denoising), compensate for non-uniform black point removal, such as due to non-uniform thermal heating of the sensor or image capture device. A respective offset map component may, such as subsequent to Bayer noise removal, compensate for flare, such as flare on hemispherical lenses, and/or may perform local contrast enhancement, such as dehazing or local tone mapping.

In another example, the Bayer-to-Bayer component may include a Bayer Noise Reduction (Bayer NR) component, which may convert image data, such as from a first format, such as a signed 15-bit Bayer format, to a second format, such as an unsigned 14-bit Bayer format. In another example, the Bayer-to-Bayer component may include one or more lens shading (FSHD) component, which may, respectively, perform lens shading correction, such as luminance lens shading correction, color lens shading correction, or both. In some implementations, a respective lens shading component may perform exposure compensation between two or more sensors of a multi-sensor image capture apparatus, such as between two hemispherical lenses. In some implementations, a respective lens shading component may apply map-based gains, radial model gain, or a combination, such as a multiplicative combination, thereof. In some implementations, a respective lens shading component may perform saturation management, which may preserve saturated areas on respective images. Map and lookup table values for a respective lens shading component may be configured or modified on a per-frame basis and double buffering may be used.

In another example, the Bayer-to-Bayer component may include a PZSFT component. In another example, the Bayer-to-Bayer component may include a half-RGB ($\frac{1}{2}$ RGB) component. In another example, the Bayer-to-Bayer component may include a color correction (CC) component, which may obtain subsampled data for local tone mapping, which may be used, for example, for applying an unsharp mask. In another example, the Bayer-to-Bayer component may include a Tone Control (TC) component, which may obtain subsampled data for local tone mapping, which may be used, for example, for applying an unsharp mask. In another example, the Bayer-to-Bayer component may include a Gamma (GM) component, which may apply a lookup-table independently per channel for color rendering (gamma curve application). Using a lookup-table, which may be an array, may reduce resource utilization, such as processor utilization, using an array indexing operation rather than more complex computation. The gamma component may obtain subsampled data for local tone mapping, which may be used, for example, for applying an unsharp mask.

In another example, the Bayer-to-Bayer component may include an RGB binning (RGB BIN) component, which may include a configurable binning factor, such as a binning factor configurable in the range from four to sixteen, such as four, eight, or sixteen. One or more sub-components of the Bayer-to-Bayer component, such as the RGB Binning component and the half-RGB component, may operate in parallel. The RGB binning component may output image data, such as to an external memory, which may include compressing the image data. The output of the RGB binning component may be a binned image, which may include low-resolution image data or low-resolution image map data. The output of the RGB binning component may be used to extract statistics for combing images, such as combining hemispherical images. The output of the RGB binning component may be used to estimate flare on one or more lenses, such as hemispherical lenses. The RGB binning component may obtain G channel values for the binned image by averaging Gr channel values and Gb channel values. The RGB binning component may obtain one or more portions of or values for the binned image by averaging pixel values in spatial areas identified based on the binning factor. In another example, the Bayer-to-Bayer component may include, such as for spherical image processing, an RGB-to-YUV component, which may obtain tone mapping statistics, such as histogram data and thumbnail data, using a weight map, which may weight respective regions of interest prior to statistics aggregation.

The image signal processor 620, or one or more components thereof, such as the local motion estimation components, which may generate local motion estimation data for use in image signal processing and encoding, such as in correcting distortion, stitching, and/or motion compensation. For example, the local motion estimation components may partition an image into blocks, arbitrarily shaped patches, individual pixels, or a combination thereof. The local motion estimation components may compare pixel values between frames, such as successive images, to determine displacement, or movement, between frames, which may be expressed as motion vectors (local motion vectors).

The image signal processor 620, or one or more components thereof, such as the local motion compensation components, which may obtain local motion data, such as local motion vectors, and may spatially apply the local motion data to an image to obtain a local motion compensated image or frame and may output the local motion compensated image or frame to one or more other components of the image signal processor 620.

The image signal processor 620, or one or more components thereof, such as the global motion compensation components, may receive, or otherwise access, global motion data, such as global motion data from a gyroscopic unit of the image capture apparatus, such as the gyroscope 546 shown in FIG. 5, corresponding to the current frame. The global motion compensation component may apply the global motion data to a current image to obtain a global motion compensated image, which the global motion compensation component may output, or otherwise make available, to one or more other components of the image signal processor 620.

The image signal processor 620, or one or more components thereof, such as the Bayer-to-RGB components, which convert the image data from Bayer format to an RGB format. The Bayer-to-RGB components may implement white balancing and demosaicing. The Bayer-to-RGB components respectively output, or otherwise make available, RGB format image data to one or more other components of the image signal processor 620.

The image signal processor 620, or one or more components thereof, such as the image processing units, which perform warping, image registration, electronic image stabilization, motion detection, object detection, or the like. The image processing units respectively output, or otherwise make available, processed, or partially processed, image data to one or more other components of the image signal processor 620.

The image signal processor 620, or one or more components thereof, such as the high dynamic range components, may, respectively, generate high dynamic range images based on the current input image, the corresponding local motion compensated frame, the corresponding global motion compensated frame, or a combination thereof. The high dynamic range components respectively output, or otherwise make available, high dynamic range images to one or more other components of the image signal processor 620.

The high dynamic range components of the image signal processor 620 may, respectively, include one or more high dynamic range core components, one or more tone control (TC) components, or one or more high dynamic range core components and one or more tone control components. For example, the image signal processor 620 may include a high dynamic range component that includes a high dynamic range core component and a tone control component. The high dynamic range core component may obtain, or generate, combined image data, such as a high dynamic range image, by merging, fusing, or combining the image data, such as unsigned 14-bit RGB format image data, for multiple, such as two, images (HDR fusion) to obtain, and output, the high dynamic range image, such as in an unsigned 23-bit RGB format (full dynamic data). The high dynamic range core component may output the combined image data to the Tone Control component, or to other components of the image signal processor 620. The Tone Control component may compress the combined image data, such as from the unsigned 23-bit RGB format data to an unsigned 17-bit RGB format (enhanced dynamic data).

The image signal processor 620, or one or more components thereof, such as the three-dimensional noise reduction components reduce image noise for a frame based on one or more previously processed frames and output, or otherwise make available, noise reduced images to one or more other components of the image signal processor 620. In some implementations, the three-dimensional noise reduction component may be omitted or may be replaced by one or more lower-dimensional noise reduction components, such as by a spatial noise reduction component. The three-dimensional noise reduction components of the image signal processor 620 may, respectively, include one or more temporal noise reduction (TNR) components, one or more raw-to-raw (R2R) components, or one or more temporal noise reduction components and one or more raw-to-raw components. For example, the image signal processor 620 may include a three-dimensional noise reduction component that includes a temporal noise reduction component and a raw-to-raw component.

The image signal processor 620, or one or more components thereof, such as the sharpening components, obtains sharpened image data based on the image data, such as based on noise reduced image data, which may recover image detail, such as detail reduced by temporal denoising or warping. The sharpening components respectively output, or otherwise make available, sharpened image data to one or more other components of the image signal processor 620.

The image signal processor 620, or one or more components thereof, such as the raw-to-YUV components, may transform, or convert, image data, such as from the raw image format to another image format, such as the YUV format, which includes a combination of a luminance (Y) component and two chrominance (UV) components. The raw-to-YUV components may, respectively, demosaic, color process, or both, images.

Although not expressly shown in FIG. 6, in some implementations, a respective raw-to-YUV component may include one or more sub-components. For example, the raw-to-YUV component may include a white balance (WB) component, which performs white balance correction on the image data. In another example, a respective raw-to-YUV component may include one or more color correction components (CC0, CC1), which may implement linear color rendering, which may include applying a 3×3 color matrix. For example, the raw-to-YUV component may include a first color correction component (CC0) and a second color correction component (CC1). In another example, a respective raw-to-YUV component may include a three-dimensional lookup table component, such as subsequent to a first color correction component. Although not expressly shown in FIG. 6, in some implementations, a respective raw-to-YUV component may include a Multi-Axis Color Correction (MCC) component, such as subsequent to a three-dimensional lookup table component, which may implement non-linear color rendering, such as in Hue, Saturation, Value (HSV) space.

In another example, a respective raw-to-YUV component may include a black point RGB removal (BPRGB) component, which may process image data, such as low intensity values, such as values within a defined intensity threshold, such as less than or equal to, $2^8$, to obtain histogram data wherein values exceeding a defined intensity threshold may be omitted, or excluded, from the histogram data processing. In another example, a respective raw-to-YUV component may include a Multiple Tone Control (Multi-TC) component, which may convert image data, such as unsigned 17-bit RGB image data, to another format, such as unsigned 14-bit RGB image data. The Multiple Tone Control component may apply dynamic tone mapping to the Y channel (luminance) data, which may be based on, for example, image capture conditions, such as light conditions or scene conditions. The tone mapping may include local tone mapping, global tone mapping, or a combination thereof.

In another example, a respective raw-to-YUV component may include a Gamma (GM) component, which may convert image data, such as unsigned 14-bit RGB image data, to another format, such as unsigned 10-bit RGB image data. The Gamma component may apply a lookup-table independently per channel for color rendering (gamma curve application). Using a lookup-table, which may be an array, may reduce resource utilization, such as processor utilization, using an array indexing operation rather than more complex computation. In another example, a respective raw-to-YUV component may include a three-dimensional lookup table (3DLUT) component, which may include, or may be, a three-dimensional lookup table, which may map RGB input values to RGB output values through a non-linear function for non-linear color rendering. In another example, a respective raw-to-YUV component may include a Multi-Axis Color Correction (MCC) component, which may implement non-linear color rendering. For example, the multi-axis color correction component may perform color non-linear rendering, such as in Hue, Saturation, Value (HSV) space.

The image signal processor 620, or one or more components thereof, such as the Chroma Noise Reduction (CNR) components, may perform chroma denoising, luma denoising, or both.

The image signal processor 620, or one or more components thereof, such as the local tone mapping components, may perform multi-scale local tone mapping using a single pass approach or a multi-pass approach on a frame at different scales. The as the local tone mapping components may, respectively, enhance detail and may omit introducing artifacts. For example, the Local Tone Mapping components may, respectively, apply tone mapping, which may be similar to applying an unsharp-mask. Processing an image by the local tone mapping components may include obtaining, processing, such as in response to gamma correction, tone control, or both, and using a low-resolution map for local tone mapping.

The image signal processor 620, or one or more components thereof, such as the YUV-to-YUV (Y2Y) components, may perform local tone mapping of YUV images. In some implementations, the YUV-to-YUV components may include multi-scale local tone mapping using a single pass approach or a multi-pass approach on a frame at different scales.

The image signal processor 620, or one or more components thereof, such as the warp and blend components, may warp images, blend images, or both. In some implementations, the warp and blend components may warp a corona around the equator of a respective frame to a rectangle. For example, the warp and blend components may warp a corona around the equator of a respective frame to a rectangle based on the corresponding low-resolution frame. The warp and blend components, may, respectively, apply one or more transformations to the frames, such as to correct for distortions at image edges, which may be subject to a close to identity constraint.

The image signal processor 620, or one or more components thereof, such as the stitching cost components, may generate a stitching cost map, which may be represented as a rectangle having disparity (x) and longitude (y) based on a warping. Respective values of the stitching cost map may be a cost function of a disparity (x) value for a corresponding longitude. Stitching cost maps may be generated for various scales, longitudes, and disparities.

The image signal processor 620, or one or more components thereof, such as the scaler components, may scale images, such as in patches, or blocks, of pixels, such as 16×16 blocks, 8×8 blocks, or patches or blocks of any other size or combination of sizes.

The image signal processor 620, or one or more components thereof, such as the configuration controller, may control the operation of the image signal processor 620, or the components thereof.

The image signal processor 620 outputs processed image data, such as by storing the processed image data in a memory of the image capture apparatus, such as external to the image signal processor 620, or by sending, or otherwise making available, the processed image data to another component of the image processing pipeline 600, such as the encoder 630, or to another component of the image capture apparatus.

The encoder 630 encodes or compresses the output of the image signal processor 620. In some implementations, the encoder 630 implements one or more encoding standards, which may include motion estimation. The encoder 630 outputs the encoded processed image to an output 670. In an embodiment that does not include the encoder 630, the image signal processor 620 outputs the processed image to the output 670. The output 670 may include, for example, a display, such as a display of the image capture apparatus, such as one or more of the displays 108, 142 shown in FIGS. 1A-1B, the display 224 shown in FIG. 2B, the display 424 shown in FIG. 4A, or the display 566 shown in FIG. 5, to a storage device, or both. The output 670 is a signal, such as to an external device.

Figure 7:
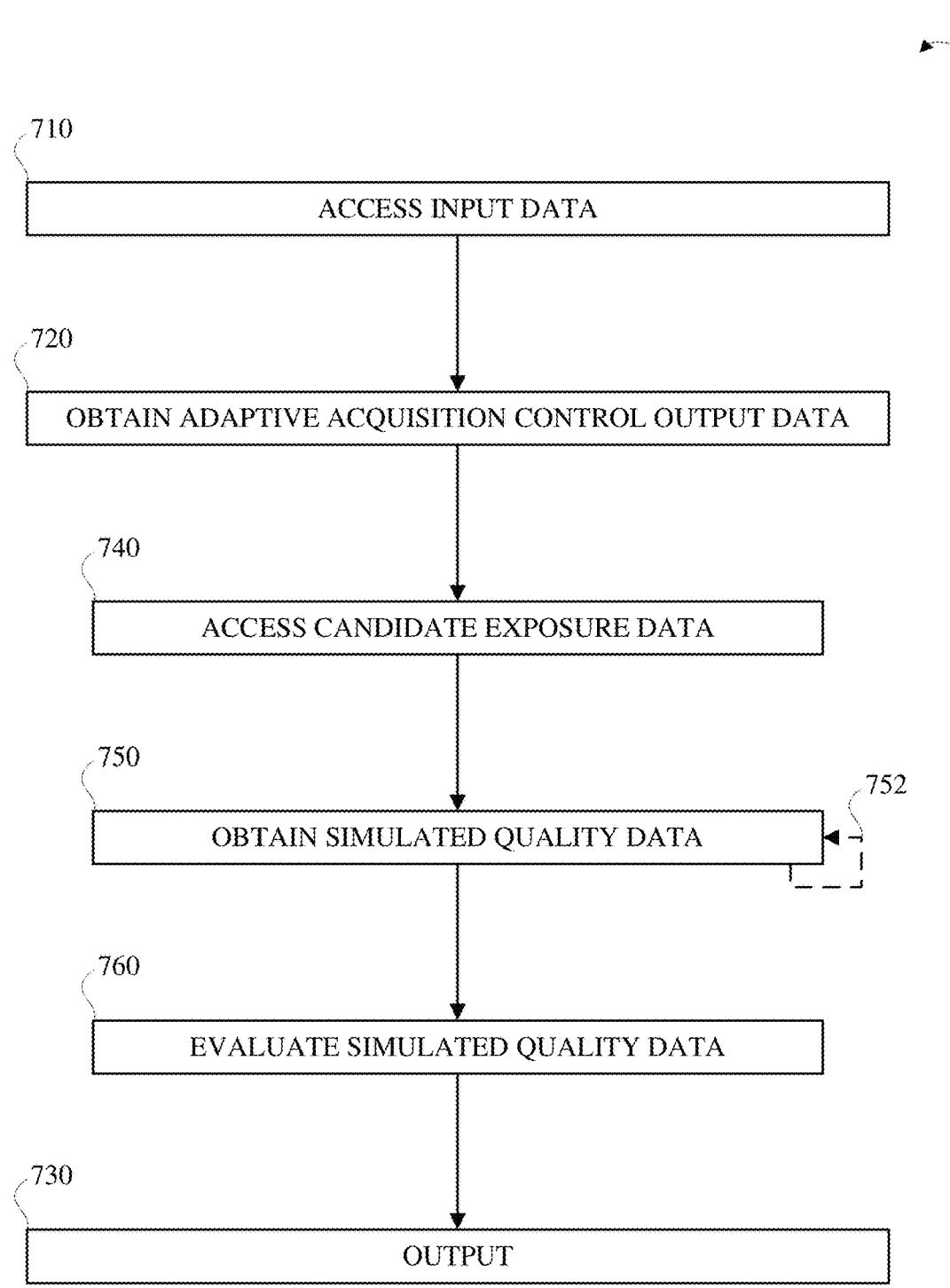
FIG. 7 is a flow diagram of an example of adaptive acquisition control including automatic exposure with simulated histogram data.

FIG. 7 is a flow diagram of an example of adaptive acquisition control including automatic exposure with simulated histogram data 700. Adaptive acquisition control including automatic exposure with simulated histogram data 700, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, the image capture apparatus 500 shown in FIG. 5, as a part of the image processing pipeline 600 shown in FIG. 6, or in another image capture apparatus. In some implementations, adaptive acquisition control including automatic exposure with simulated histogram data 700, or one or more portions thereof, may be implemented in a digital signal processor (DSP), an application-specific integrated circuit (ASIC), or a combination of a digital signal processor and an application-specific integrated circuit. One or more aspects of adaptive acquisition control including automatic exposure with simulated histogram data 700 may be implemented in hardware, software, or a combination of hardware and software. In some implementations, other aspects of image acquisition and processing not expressly shown in FIG. 7 may be used. FIG. 7 shows adaptive acquisition control including automatic exposure with simulated histogram data

700 for a frame, or image, of a sequence of frames, or images, such as a sequence of frames of a video.

Adaptive acquisition control including automatic exposure with simulated histogram data 700 includes accessing current input image data (at 710), obtaining adaptive acquisition control output data (at 720), and outputting the adaptive acquisition control output data (at 730).

An image capture apparatus that implements adaptive acquisition control including automatic exposure with simulated histogram data 700, such as the image capture apparatus 300 shown in FIG. 3, or a component thereof, such as an image processing pipeline, such as the image processing pipeline 600 shown in FIG. 6, or a component thereof, such as an image sensor, such as the image sensor 610 shown in FIG. 6, captures a current input image in accordance with current adaptive acquisition control data, such as the adaptive acquisition control data 660 shown in FIG. 6. The current adaptive acquisition control data includes current exposure data that includes a current exposure value that indicates a current exposure duration value and a current gain value, wherein the current exposure value may be a result of multiplying the current exposure duration value and the current gain value. The current adaptive acquisition control data may be adaptive acquisition control data previously output by an image signal processor of the image processing pipeline, such as the image signal processor 620 shown in FIG. 6. For example, the current input image, or frame, may be a frame of a sequence of frames of a video captured by the image capture apparatus in accordance with a defined frame rate, such as thirty frames per second (30 fps). The image sensor may output the current input image to another component of the image capture apparatus. For example, the image sensor may store the current input image in a memory of the image capture apparatus.

Figure 8:
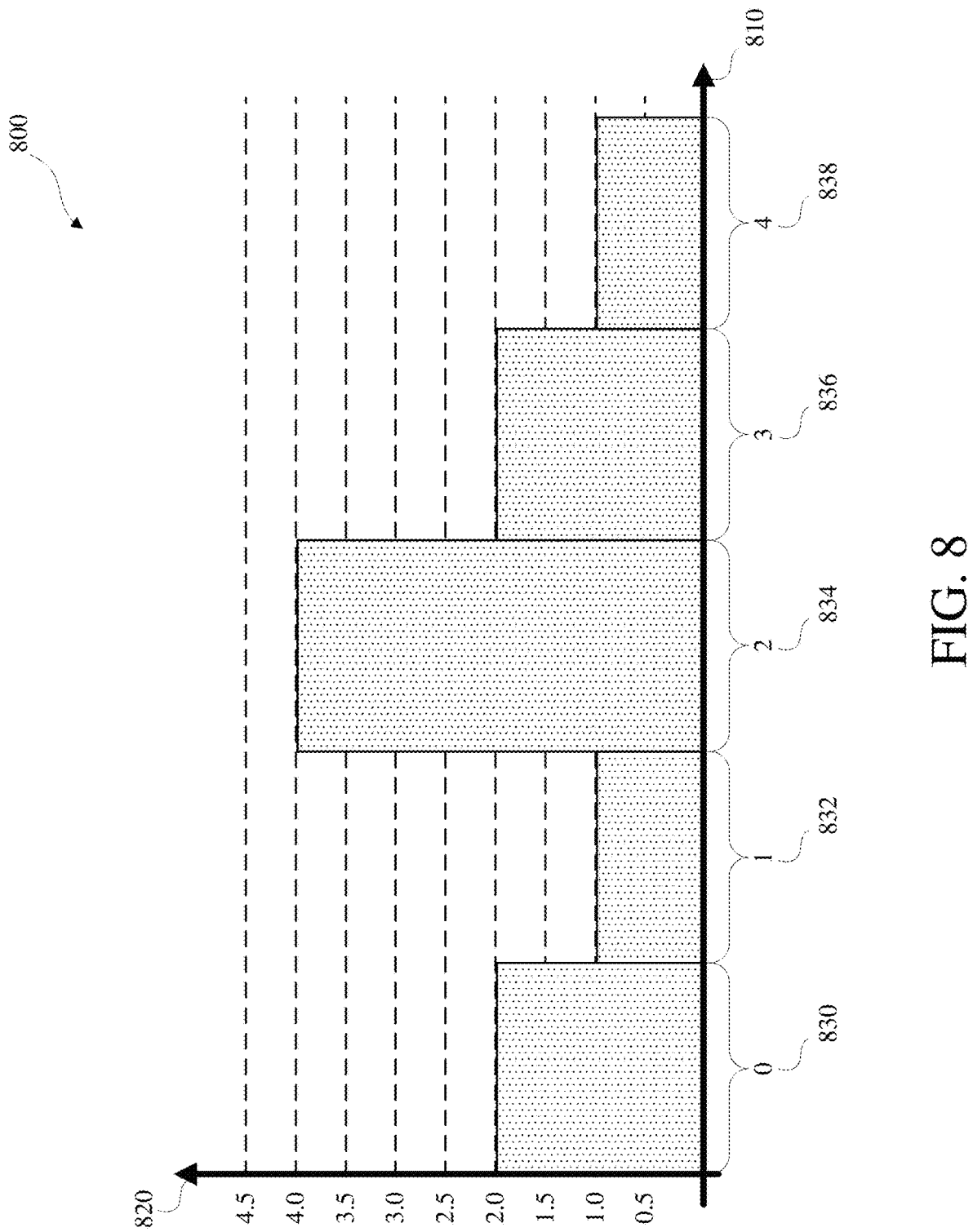
FIG. 8 is a diagram of an example of a histogram representing histogram data for the current input image.

The image signal processor, or a component thereof, such as an adaptive acquisition control component, or a component thereof, such as an exposure control component (auto-exposure or AE), accesses current input image data including the current input image (at 710). The current input image, or frame, may be accessed, such as read, such as from the memory of the image capture apparatus, received, or otherwise accessed, such as from the image sensor. Accessing the current input image data includes accessing, or obtaining, the current adaptive acquisition control data. For example, the current input image data may include the current adaptive acquisition control data. Accessing the current input image data includes accessing, or obtaining, a current histogram, or current histogram data, corresponding to the current input image. For example, the current input image data may include the current histogram data. An example of a current histogram is shown in FIG. 8.

The exposure control component obtains adaptive acquisition control output data (at 720). The adaptive acquisition control output data includes a target exposure value indicating a target exposure duration value and a target gain value.

Obtaining the adaptive acquisition control output data includes accessing candidate exposure data (at 740), obtaining simulated quality data (at 750), and evaluating the simulated quality data (at 760).

The exposure control component accesses, or obtains, the candidate exposure data (at 740), such as from another component of the image capture apparatus. For example, the exposure control component may read the candidate exposure data from a memory of the image capture apparatus.

In some implementations, the candidate exposure data indicates, or includes, candidate exposure duration data including a defined cardinality (smartAeListSz), such as sixty-four (smartAeListSz=64), of candidate exposure duration values (timeList), such as in a range from a defined minimum exposure duration value (MINTIME) to a maximum exposure duration value (MAXTIME), such that a candidate exposure duration value (t') from the candidate exposure duration values (timeList) is greater than or equal to the minimum exposure duration value and is less than or equal to the maximum exposure duration value (MAXTIME), which may be expressed as MINTIME<=t'<=MAXTIME. In some implementations, the candidate exposure duration values include at least one candidate exposure duration value (t') that differs from the current exposure duration value (t). The candidate exposure duration values (timeList) may be accessed, or obtained, as a list, such as an indexed list, such as an array, or table.

In some implementations, the candidate exposure data indicates, or includes, candidate exposure data including the defined cardinality (smartAeListSz) of candidate exposure values (expoList). The candidate exposure values (expoList) may be accessed, or obtained, as a list, such as an indexed list, such as an array, or table. A candidate exposure value from the candidate exposure values indicates a candidate exposure duration value and a candidate gain value, wherein the candidate exposure value may be a result of multiplying the candidate exposure duration value by the candidate gain value. The candidate exposure values may correspond, temporally, with one or more of the candidate exposure duration values. One or more of the candidate exposure duration values (timeList) may differ from the exposure duration values that correspond to the candidate exposure values. The candidate exposure values may be obtained in accordance with a defined range of gain values, such as from a defined minimum gain value (gainMin) to a defined maximum gain value (gainMax). A minimal candidate exposure value may be a product of multiplying the minimum exposure duration value by the defined minimum gain value. A maximal candidate exposure value may be a product of multiplying the maximum exposure duration value by the defined maximum gain value.

A component of the image capture apparatus may obtain, such as generate or create, the candidate exposure data. Generating the candidate exposure data may include determining a distribution type for generating the candidate exposure data. For example, the image capture apparatus, or a component thereof, may obtain the distribution type for generating the candidate exposure data from available distribution types, which may include a linear distribution type, a logarithmic distribution type, or both.

The candidate exposure data may be obtained, such as generated, in accordance with one or more thresholds, boundaries, or bridles. For example, the candidate exposure data may be obtained, or generated, in a range from a minimum exposure value to a maximum exposure value.

Figure 9:
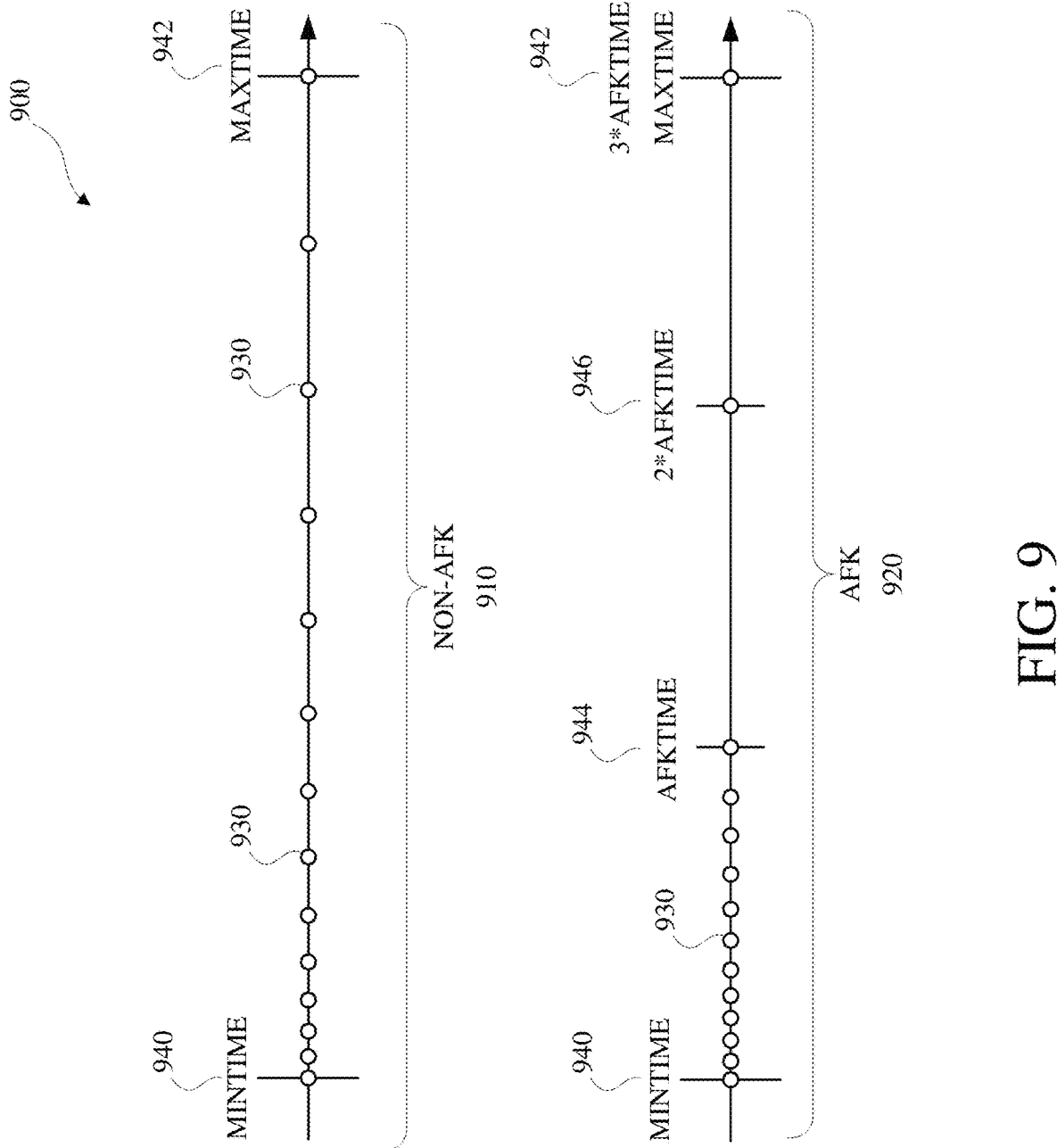
FIG. 9 is a diagram of examples of candidate exposure duration data.

Obtaining, or generating, the candidate exposure data may include obtaining, or generating, the candidate exposure data in accordance with anti-flicker data, such as a flicker frequency, or flickering constraint, which may be a defined flicker frequency, such as 50 hz or 60 hz. In some implementations, the flicker frequency is configurable. For example, data indicating a configured flicker frequency value may be included in image acquisition configuration data, such as the image acquisition configuration data 650 shown in FIG. 6. For example, the light captured by the image sensor may originate from an artificial light source, wherein the light output of the artificial light source oscillates in accordance with the flicker frequency. In the absence of using anti-flicker data, flicker artifacts may be included in images, or sequences of images, which may be relatively pronounced at relatively low exposure duration values. An example of obtaining candidate exposure duration data is shown in FIG. 9.

The exposure control component obtains the simulated quality data (at 750). Obtaining the simulated quality data (at 750) includes obtaining the simulated quality data in accordance with the current input image data (obtained at 710). The simulated quality data may include simulated noise data, simulated blur data, simulated black saturation data, simulated white saturation data, or a combination thereof.

Obtaining the simulated quality data includes obtaining the simulated quality data, or one or more portions thereof, on a per-candidate basis with respect to the candidate exposure data (obtained at 740), such as with respect to the candidate exposure duration values from the candidate exposure data, as indicated by the broken directional line (at 752).

Figure 10:
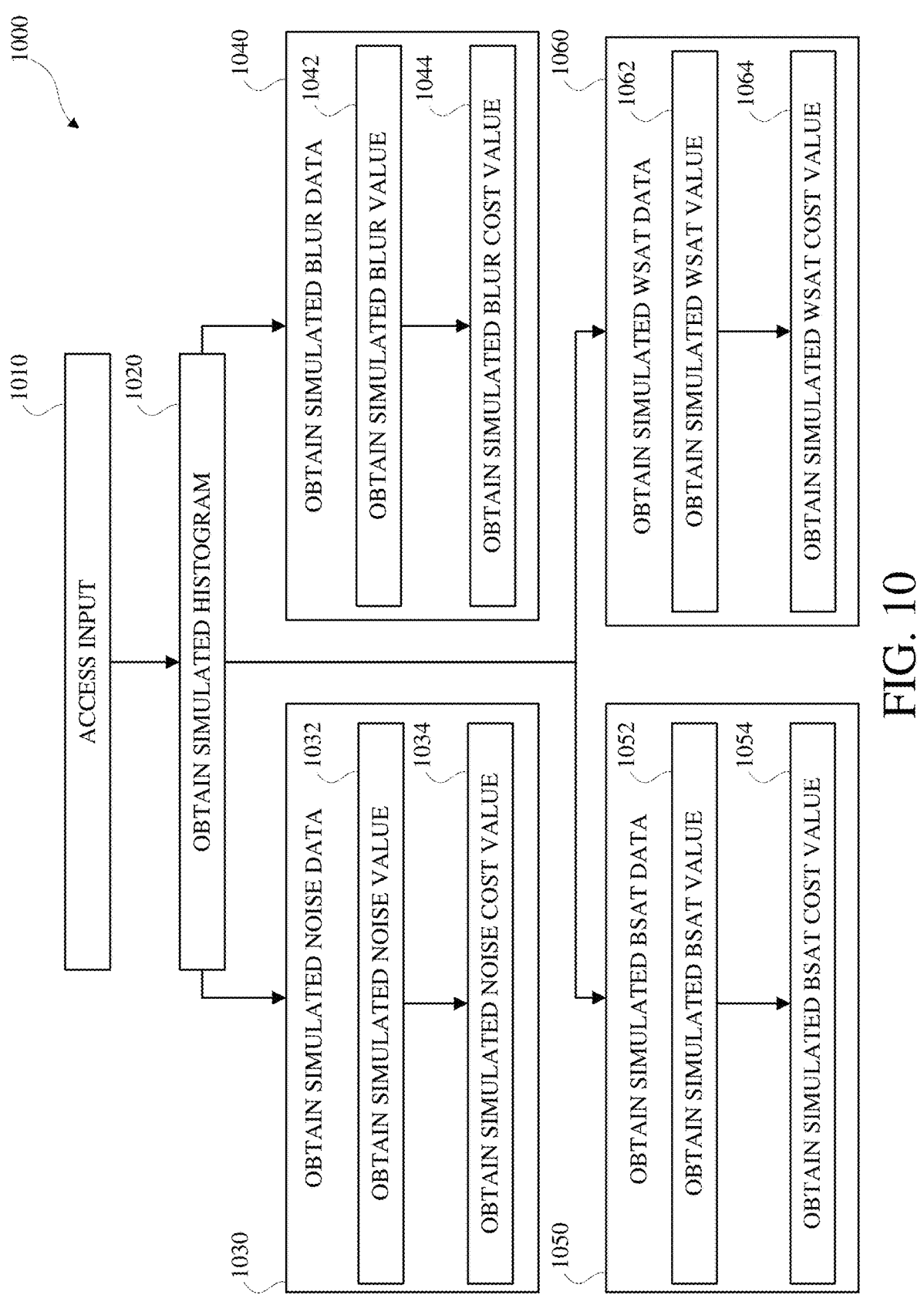
FIG. 10 is a flow diagram of an example of obtaining simulated quality data.

For example, the exposure control component may access first current candidate exposure data from the candidate exposure data (obtained at 740), may obtain first simulated quality data with respect to the first current candidate exposure data, may access second current candidate exposure data from the candidate exposure data, and may obtain second simulated quality data with respect to the second current candidate exposure data. The current candidate exposure data indicates a current candidate exposure duration value from the candidate exposure duration values from the candidate exposure data. The current candidate exposure data indicates a current candidate exposure value from the candidate exposure values from the candidate exposure data. An example of obtaining simulated quality data for current candidate exposure data is shown in FIG. 10.

In some implementations, the exposure control component obtains the simulated quality data (at 750) for the candidate exposure data on the per-candidate basis iteratively. In some implementations, the exposure control component obtains the simulated quality data (at 750) for the candidate exposure data on the per-candidate basis using parallel processing.

Figure 11:
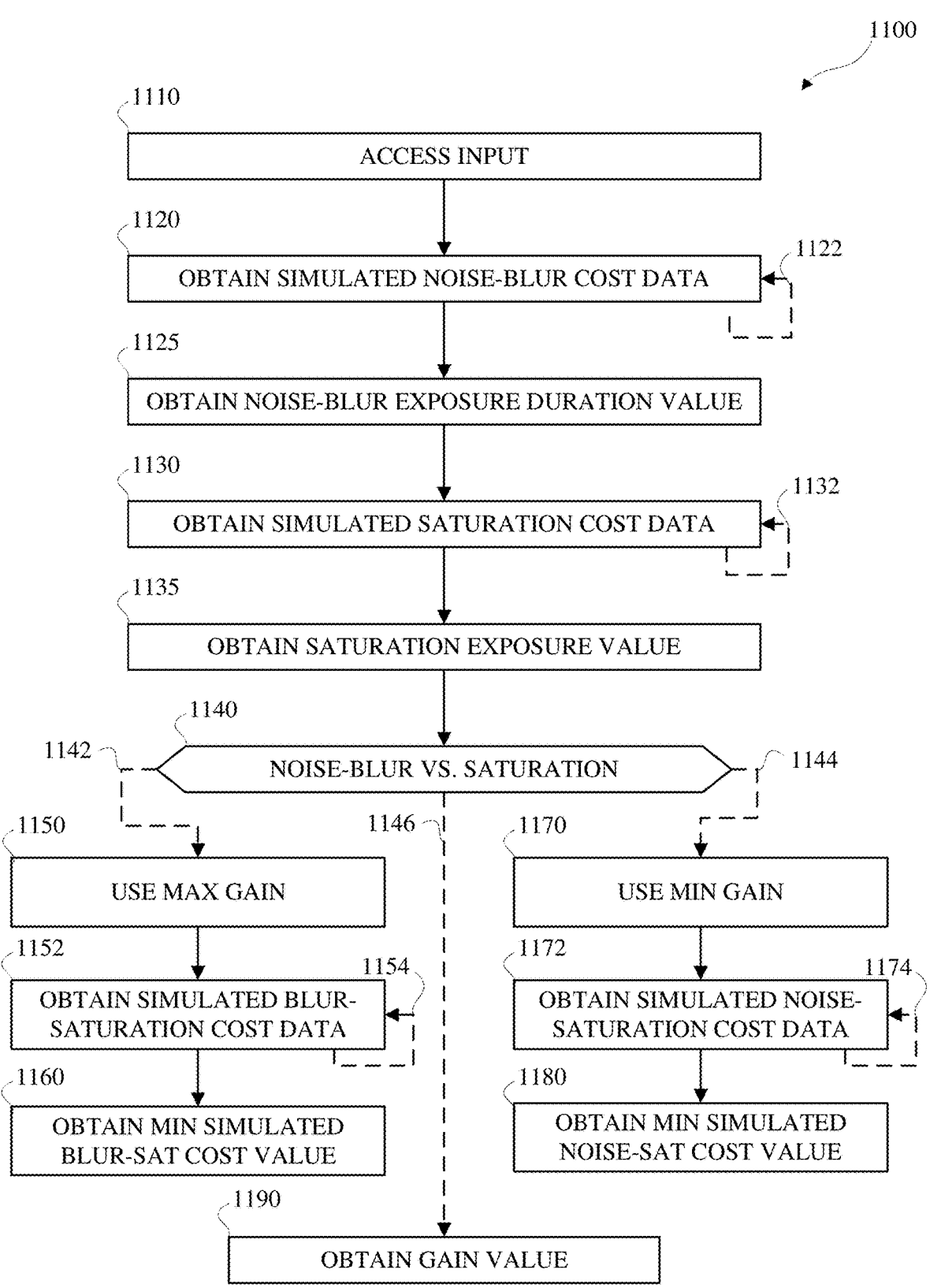
FIG. 11 is a flow diagram of an example of evaluating simulated quality data.

The exposure control component evaluates the simulated quality data (at 760). An example of evaluating the simulated quality data is shown in FIG. 11.

The exposure control component outputs the adaptive acquisition control output data (at 730). For example, the exposure control component may output the adaptive acquisition control output data (at 730) to the image sensor, such as shown (at 660) in FIG. 6, such that the image sensor subsequently captures one or more images in accordance with the adaptive acquisition control output data, or one or more portions thereof.

In some implementations, prior to outputting the adaptive acquisition control output data, the exposure control component obtains a smoothed target exposure duration value by smoothing the target exposure duration value and uses the smoothed target exposure duration value as the target exposure duration value.

In some implementations, prior to outputting the adaptive acquisition control output data, the exposure control component obtains a smoothed target exposure value by smoothing the target exposure value and uses the smoothed target exposure value as the target exposure value.

In some implementations, prior to outputting the adaptive acquisition control output data, the exposure control component smooths the target exposure duration value and the target exposure value.

Smoothing the target exposure duration value, the target exposure value, or both, avoids abrupt variations in image quality among sequential frames. Smoothing the target exposure duration value reduces abrupt variations in signal to noise ratio among sequential frames, such as avoiding a relatively low noise frame followed by a relatively high noise frame followed by a relatively low noise frame.

Smoothing the target exposure value reduces abrupt variations in saturation among sequential frames, such as avoiding a frame that includes clipped highlights, followed by a frame that includes unclipped highlights, followed by a frame that includes clipped highlights.

FIG. 8 is a diagram of an example of a histogram 800 representing histogram data for the current input image. The histogram 800 is a graphical representation of histogram data that represents a distribution of values, such as pixel values, such as pixel luminance values from the current input image among a range of available values, such as pixel values, such as pixel luminance values.

A histogram is a graph, or chart, such as a bar chart, that represents a distribution of data, such as numerical data (observations), such as a distribution of pixel values, such as luminance values, or color values, in an image, or a portion of an image, wherein a range of possible values is divided into a series of consecutive, disjoint, non-overlapping, intervals, bins, or buckets, such that a respective bin represents a proper subset of the range of values represented by the histogram, wherein the width, along the horizontal axis of the histogram, of a bin represents the size of the range of values represented by the bin. The number, count, frequency, or cardinality of observations in the range of values represented by a bin may be referred to as the bin cardinality, and may correspond to the height, along the vertical axis of the histogram, of the bin. The bins of a histogram may be uniquely identified, or referenced, by respective index values, wherein the first, leftmost, minimal, or lowest range of values, bin may have the bin index, or index value, of zero (0). The last, rightmost, maximal, or highest range of values, bin has the highest bin index of the histogram. The size, or cardinality, of a histogram indicates the number, count, or cardinality of bins. For example, a histogram may include two hundred fifty-six (256) bins (bin cardinality is 256), wherein the bin index of the minimal bin is zero and the bin index of the maximal bin is two hundred fifty-five (255). As used herein, except as is described herein or as is otherwise clear from context, the term histogram refers to histogram data, which includes data defining or describing a histogram, such as bin cardinality data. For example, histogram data may include an array, or another data structure, wherein array elements correspond to bin indexes and the values of the array elements correspond to bin cardinalities. In histogram data for an image, the minimal bin represents black saturated pixels, and the maximal bin represents white saturated pixels.

As shown in FIG. 8, the histogram 800 includes a horizontal axis 810 representing the range of possible values, such as pixel values, such as pixel luminance values.

As shown in FIG. 8, the histogram 800 includes a vertical axis 820 representing a number, count, or cardinality, (frequency) of values, or observations, such as pixel values, such as pixel luminance values, from the current input image.

As shown in FIG. 8, the histogram 800 is divided into a sequence, from left to right, of non-overlapping bins, buckets, or intervals, (disjoint categories) including a first bin 830, a second bin 832, a third bin 834, a fourth bin 836, and a fifth bin 838, represented as rectangles, as shown.

Although the histogram 800 shown in FIG. 8 is shown as including a number, count, or cardinality, of five bins 830-838 for simplicity, another number, count, or cardinality of bins, which may be referred to as bins cardinality or histogram width, may be used, such as two hundred fifty-six (256) bins.

The horizontal dimension of a respective bin 830-838, which may be referred to as the bin width, represents range of available values, such as pixel values, such as pixel luminance values, which is a proper, contiguous, subset of the range of available values represented by the histogram.

The vertical dimension of a respective bin 830-838, which may be referred to as the bin height, may represent the number, count, or cardinality of values, such as pixel values, such as pixel luminance values, from the current input image (observations) that are within the range corresponding to the respective bin 830-838. For clarity, the number, count, or cardinality of values, such as pixel values, such as pixel luminance values, of a respective bin 830-838 may be referred to as the bin cardinality. In some implementations, the area of a bin may represent the bin cardinality.

The first bin 830 has a bin index value of zero (0) and is the minimum index bin for the histogram 800. The horizontal dimension of the first bin 830 represents a first, minimum, range of values. The vertical dimension of the first bin 830 indicates a bin cardinality of two (2.0). Values in the bin having the minimum bin index, such as the first bin 830 as shown in FIG. 8, may be identified as black saturated, and the bin having the minimum bin index may be referred to as the black saturated bin.

The second bin 832 has a bin index value of one (1). The horizontal dimension of the second bin 832 represents a second range of values. The vertical dimension of the second bin 832 indicates a bin cardinality of one (1.0).

The third bin 834 has a bin index value of two (2). The horizontal dimension of the third bin 834 represents a third range of values. The vertical dimension of the third bin 834 indicates a bin cardinality of four (4.0).

The fourth bin 836 has a bin index value of three (3). The horizontal dimension of the fourth bin 836 represents a fourth range of values. The vertical dimension of the fourth bin 836 indicates a bin cardinality of two (2.0).

The fifth bin 838 has a bin index value of four (4), which is the maximum bin index value as shown. The horizontal dimension of the fifth bin 838 represents a fifth range of values. The vertical dimension of the fifth bin 838 indicates a bin cardinality of one (1.0). Values in the bin having the maximum bin index, such as the fifth bin 838 as shown in FIG. 8, may be identified as white saturated, and the bin having the maximum bin index may be referred to as the white saturation bin.

FIG. 9 is a diagram of examples of candidate exposure duration data 900. FIG. 9 shows an example of non-anti-flicker (NON-AFK) candidate exposure duration data 910, and an example of anti-flicker (AFK) candidate exposure duration data 920.

The example of non-anti-flicker (NON-AFK) candidate exposure duration data 910 includes candidate exposure duration values 930, shown as circles, in a range from a minimum exposure duration value 940 (MINTIME) to a maximum exposure duration value 942 (MAXTIME), in accordance with a logarithmic distribution. Although not shown in FIG. 9, another distribution type, such as a linear distribution type, may be used. Although FIG. 9 shows fourteen candidate exposure duration values 930 for simplicity, another number, count, or cardinality, of candidate exposure duration values, such as sixty-four candidate exposure duration values, may be used. A candidate exposure duration value 930 from the candidate exposure duration values 930 may be equivalent to an exposure duration value (t) used to capture a current input image. For simplicity, one or more of the candidate exposure duration values 930 may be described as a multiple of the exposure duration value (t) used to capture the current input image. For example, the candidate exposure duration values 930 may include a first candidate exposure duration value that is one fourth of the exposure duration value (t) used to capture the current input image (t/4), a second candidate exposure duration value that is one half of the exposure duration value (t) used to capture the current input image (t/2), a third candidate exposure duration value that is equivalent to the exposure duration value (t) used to capture the current input image (t), a fourth candidate exposure duration value that is two times the exposure duration value (t) used to capture the current input image (2t), and a fifth candidate exposure duration value that is four times the exposure duration value (t) used to capture the current input image (4t).

The minimum exposure duration value 940 (MINTIME) may correspond with a limitation or constraint of the image sensor, such as two milliseconds (2 ms). In some implementations, the minimum exposure duration value 940 (MINTIME) may be a defined minimum exposure duration value, such as a defined minimum exposure duration value indicated in image acquisition configuration data, such as the image acquisition configuration data 650 shown in FIG. 6, that is greater than or equal to the limitation or constraint of the image sensor.

The maximum exposure duration value 942 (MAXTIME) may correspond with a reciprocal of a current frame rate. For example, the current frame rate may be thirty frames per second (30 fps) and the maximum exposure duration value 942 (MAXTIME) may be thirty-three milliseconds (33 ms). In some implementations, the maximum exposure duration value 942 (MAXTIME) may be a defined maximum exposure duration value, such as a defined maximum exposure duration value indicated in the image acquisition configuration data, which is less than or equal to the reciprocal of the current frame rate.

The example of anti-flicker (AFK) candidate exposure duration data 920 includes candidate exposure duration values 930, shown as circles, in the range from the minimum exposure duration value 940 (MINTIME) to the maximum exposure duration value 942 (MAXTIME), in accordance with a logarithmic distribution and in accordance with anti-flicker data, such as a flicker frequency. Although not shown in FIG. 9, another distribution type, such as a linear distribution type, may be used. Although FIG. 9 shows fourteen candidate exposure duration values 930 for simplicity, another number, count, or cardinality, of candidate exposure duration values, such as sixty-four candidate exposure duration values, may be used. A candidate exposure duration value 930 from the candidate exposure duration values may be equivalent to an exposure duration value (t) used to capture a current input image. For simplicity, one or more of the candidate exposure duration values 930 may be described as a multiple of the exposure duration value (t) used to capture the current input image. For example, the candidate exposure duration values 930 may include a first candidate exposure duration value that is one fourth of the exposure duration value (t) used to capture the current input image (t/4), a second candidate exposure duration value that is one half of the exposure duration value (t) used to capture the current input image (t/2), a third candidate exposure duration value that is equivalent to the exposure duration value (t) used to capture the current input image (t), a fourth candidate exposure duration value that is two times the exposure duration value (t) used to capture the current input image (2t), and a fifth candidate exposure duration value that is four times the exposure duration value (t) used to capture the current input image (4t).

The example of anti-flicker (AFK) candidate exposure duration data 920 shows a first anti-flicker temporal location 944 (AFKTIME), between the minimum exposure duration value 940 (MINTIME) and the maximum exposure duration value 942 (MAXTIME), corresponding to a defined or determined flickering constraint, or duration, relative to the minimum exposure duration value 940 (MINTIME). The example of anti-flicker (AFK) candidate exposure duration data 920 shows a second anti-flicker temporal location 946 (2*AFKTIME), between the minimum exposure duration value 940 (MINTIME) and the maximum exposure duration value 942 (MAXTIME), that is a multiple, such as two times, the flickering constraint. The maximum exposure duration value 942 (MAXTIME) is a multiple, such as three times (3*AFKTIME), the flickering constraint. The candidate exposure duration values 930 includes candidate exposure duration values that are greater than or equal to the first anti-flicker temporal location 944 (AFKTIME) that are aligned with the anti-flicker temporal locations 944, 946, 942. The candidate exposure duration values 930 includes candidate exposure duration values that are less than the first anti-flicker temporal location 944 (AFKTIME) that are distributed, such as logarithmically as shown, between the minimum exposure duration value 940 (MINTIME), and the first anti-flicker temporal location 944 (AFKTIME). Candidate exposure duration values greater than the first anti-flicker temporal location 944 (AFKTIME) that are unaligned with multiples of the flickering constraint may be omitted, excluded, or avoided. The first anti-flicker temporal location 944 (AFKTIME) may be obtained as a result of dividing one by two times the flicker frequency (freq), which may be expressed as AFKTIME=1/(2*freq).

FIG. 10 is a flow diagram of an example of obtaining simulated quality data 1000. Obtaining simulated quality data 1000, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, the image capture apparatus 500 shown in FIG. 5, as a part of the image processing pipeline 600 shown in FIG. 6, or in another image capture apparatus. In some implementations, obtaining simulated quality data 1000, or one or more portions thereof, may be implemented in a digital signal processor (DSP), an application-specific integrated circuit (ASIC), or a combination of a digital signal processor and an application-specific integrated circuit. One or more aspects of obtaining simulated quality data 1000 may be implemented in hardware, software, or a combination of hardware and software.

Obtaining simulated quality data 1000 includes accessing input data (at 1010), obtaining simulated histogram data (at 1020), obtaining simulated noise data (at 1030), obtaining simulated blur data (at 1040), obtaining simulated black saturation (BSAT) data (at 1050), and obtaining simulated white saturation data (at 1060). Although described in a sequence, the simulated noise data, the simulated blur data, the simulated black saturation data, and the simulated white saturation data may be obtained in another order or in parallel.

Accessing the input data (at 1010) includes accessing current input image data, such as the current input image data obtained as shown (at 710) in FIG. 7. The current input image data includes a current input image captured by the image capture apparatus in accordance with current adaptive acquisition control data. The current adaptive acquisition control data includes current exposure data that includes a current exposure value that indicates a current exposure duration value and a current gain value. The input data includes a current histogram corresponding to the current input image.

Accessing the input data (at 1010) includes accessing current candidate exposure data from candidate exposure data, such as the candidate exposure data obtained as shown (at 740) in FIG. 7. The current candidate exposure data indicates a current candidate exposure duration value.

Figure 12:
FIG. 12 is a flow diagram of an example of obtaining simulated histogram data.
Figure 12:
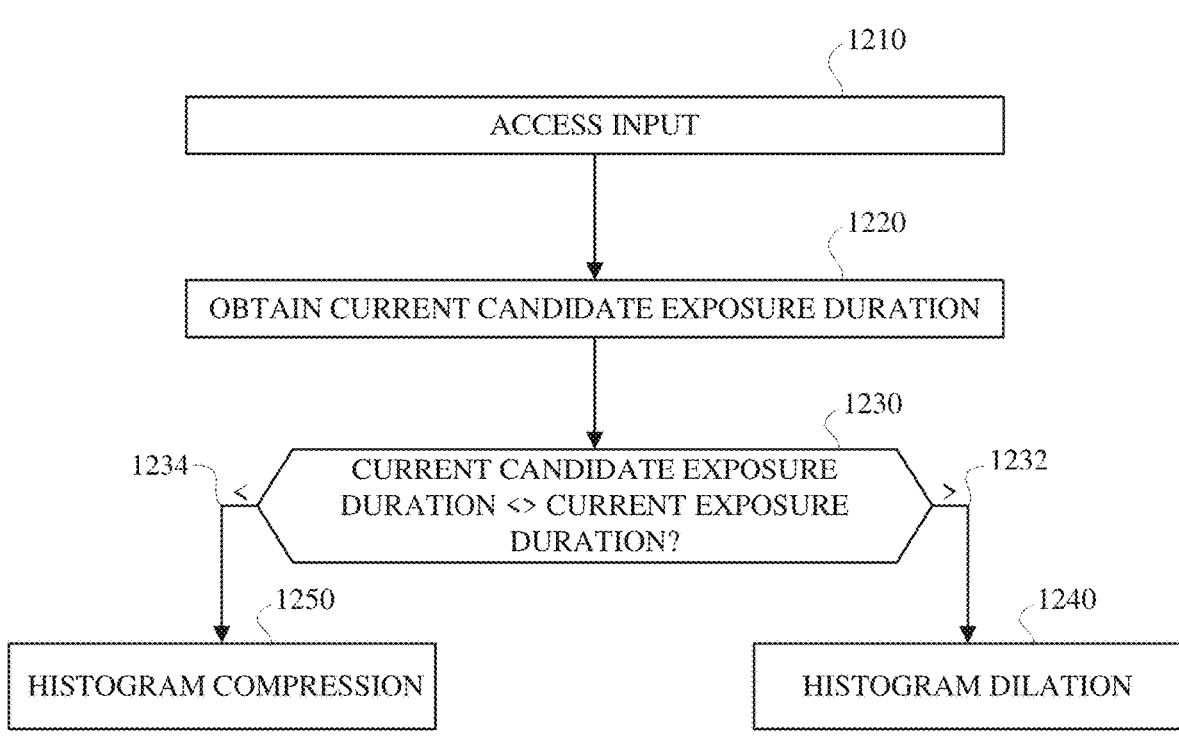

The image capture apparatus, or a component thereof such as the image processing pipeline, or a component thereof, such as such as the adaptive acquisition control component, or a component thereof, such as the exposure control component, obtains simulated histogram data (at 1020) in accordance with the current input image data and the current candidate exposure data. An example of obtaining the simulated histogram data is shown in FIG. 12.

The image capture apparatus, or a component thereof such as the image processing pipeline, or a component thereof, such as such as the adaptive acquisition control component, or a component thereof, such as the exposure control component, obtains the simulated noise data (at 1030).

Obtaining the simulated noise data (at 1030) includes obtaining a simulated noise value (at 1032) and obtaining a simulated noise cost value (at 1034).

The image capture apparatus, or a component thereof such as the image processing pipeline, or a component thereof, such as such as the adaptive acquisition control component, or a component thereof, such as the exposure control component, obtains the simulated noise value (at 1032) in accordance with the simulated histogram data (obtained at 1020).

Obtaining the simulated noise value includes obtaining, as the simulated noise value, a signal to noise ratio (SNR) value with respect to bins from the simulated histogram data that represent values that are less than, or darker than, a defined dark threshold, such as fifty percent (0.5). The signal to noise ratio value indicates a ratio of a signal, corresponding to the bins from the simulated histogram data that represent values that are less than the defined dark threshold, to the standard deviation thereof. The use of noise variance, absolute variance, quantization noise, read noise, or a combination thereof may be omitted, excluded, or avoided. The signal to noise ratio value is optimized with respect to exposure duration for linear gain.

For a pixel value with normalized intensity (x), a sensor characterization estimation of variance, with respect to a sensor gain (g) a defined, such as with respect to the current sensor mode, shot variance noise parameter (a) and a defined, such as with respect to the current sensor mode, black sensor variance parameter (b), may be expressed as the following:

$$\sigma_x^2 = a \cdot g \cdot x + b \cdot g^2.$$

Obtaining the signal to noise ratio (SNR) value for a pixel (SNR(x)) may be expressed as the following:

$$SNR(x) = \frac{x}{\sigma_x} = \frac{x}{\sqrt{a \cdot g \cdot x + b \cdot g^2}}.$$

The image capture apparatus, or a component thereof such as the image processing pipeline, or a component thereof, such as such as the adaptive acquisition control component, or a component thereof, such as the exposure control component, obtains the simulated noise cost value (at 1034) in accordance with the simulated noise value and a defined noise cost function. The signal to noise ratio (SNR) value with respect to bins from the simulated histogram data that represent values that are less than, or darker than, the defined dark threshold, is a weighted sum of the per-bin signal to noise ratio values, weighted in accordance with the corresponding bin cardinality.

Obtaining the simulated noise cost value (simNoiseCost), for a simulated histogram includes data for a number, count, or cardinality, (N) of pixels, includes obtaining, as the simulated noise cost value, a result of dividing a sum of per-bin simulated noise cost values by a result of multiplying the defined dark threshold (darkThreshold) by the cardinality of pixels (N) of the simulated histogram. A per-bin simulated noise cost value, for a respective current bin (i), with respect to the bins from the simulated histogram data that represent values that are less than the defined dark threshold, representing a number, count, or cardinality, of pixels (h[i]), with respect to the normalized signal value of the respective bin (x[i]), is a result of multiplying the corresponding number, count, or cardinality, of pixels (h[i]) by a corresponding result of the defined noise cost function (cost( )) with respect to the signal to noise ratio value for the respective bin ((SNR(x[i])). Obtaining the simulated noise cost value may be expressed as the following:

$$simNoiseCost = \text{sum}(h[i] * \text{cost}(SNR(x[i]))/(darkThreshold * N).$$

Figure 19:
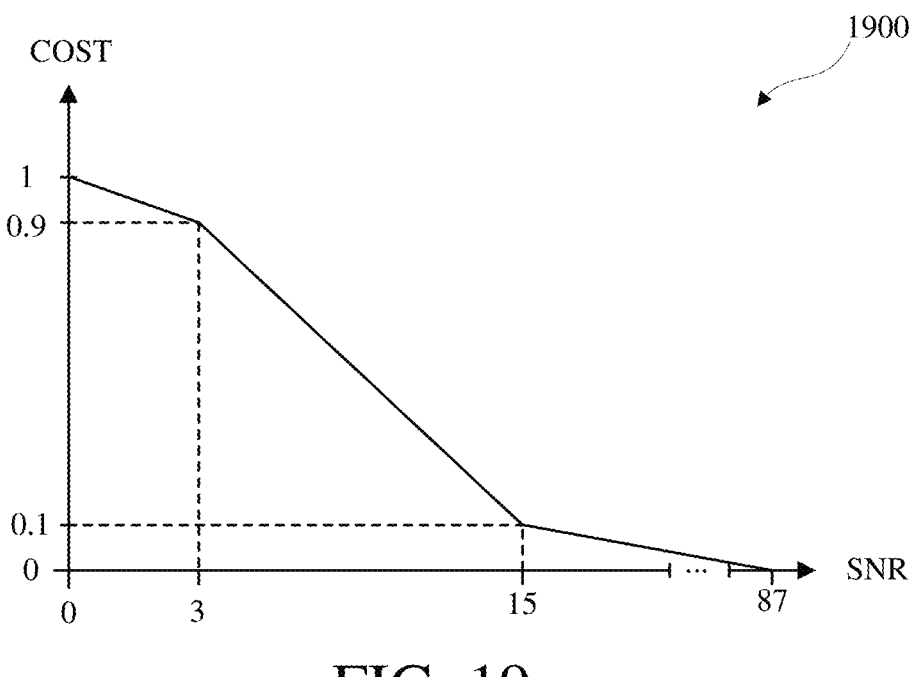
FIG. 19 is a diagram of an example of a noise cost function.

In some implementations, the noise cost function may be a piecewise linear function. The noise cost function may indicate a cost of zero (0) for the maximal aggregate signal to noise ratio. An example of a noise cost function is shown in FIG. 19.

The image capture apparatus, or a component thereof such as the image processing pipeline, or a component thereof, such as such as the adaptive acquisition control component, or a component thereof, such as the exposure control component, includes the simulated noise cost value in the simulated noise data. The simulated noise data (obtained at 1030) with respect to the current candidate exposure data may be a portion of the simulated noise data obtained for the candidate exposure data as shown (at 750) in FIG. 7.

The image capture apparatus, or a component thereof such as the image processing pipeline, or a component thereof, such as such as the adaptive acquisition control component, or a component thereof, such as the exposure control component, obtains the simulated blur data (at 1040).

Obtaining the simulated blur data (at 1040) includes obtaining a simulated motion blur length value (at 1042) and obtaining a simulated blur cost value (at 1044).

The image capture apparatus, or a component thereof such as the image processing pipeline, or a component thereof, such as such as the adaptive acquisition control component, or a component thereof, such as the exposure control component, obtains the simulated motion blur length value (at 1042) in accordance with motion data obtained from another component of the image capture apparatus, such as a motion sensor of the image capture apparatus, such as one or more spatial, or spatiotemporal, sensors, such as the spatial, or spatiotemporal, sensors 540 shown in FIG. 5.

The motion data indicates motion of the image capture apparatus in accordance with a preceding, such as immediately preceding, temporal span that is a reciprocal of a current frame rate, such as corresponding to capturing the current input image normalized to a defined duration, such as one second. For example, the motion sensor of the image capture apparatus may sense, detect, measure, capture, or otherwise obtain the motion data concurrently, or substantially concurrently, with the image sensor of the image capture apparatus capturing the current input image.

The motion data includes a motion blur speed value relative to, such as a percentage of, a diagonal dimension of the current input image. For example, the motion blur length with respect to capturing the current input image may be one percent (1%) of the image diagonal, the current frame rate may be thirty frames per second (30 fps), capturing the current input image may correspond with thirty-three milliseconds (0.033 seconds), and the motion blur speed value may be a result of dividing one (percent of image diagonal) by thirty-three milliseconds (0.033 seconds), which is thirty percent (30%) of the image diagonal.

In some implementations, the motion data may include multiple motion blur speed values, respectively relative to a respective portion of the current input image, and a combination, such as a mean, of the motion blur speed values may be obtained as the motion blur speed value for the image.

The image capture apparatus, or a component thereof such as the image processing pipeline, or a component thereof, such as such as the adaptive acquisition control component, or a component thereof, such as the exposure control component, obtains, as the simulated motion blur length value, a result of multiplying the motion blur speed value by the current candidate exposure duration value.

Figure 20:
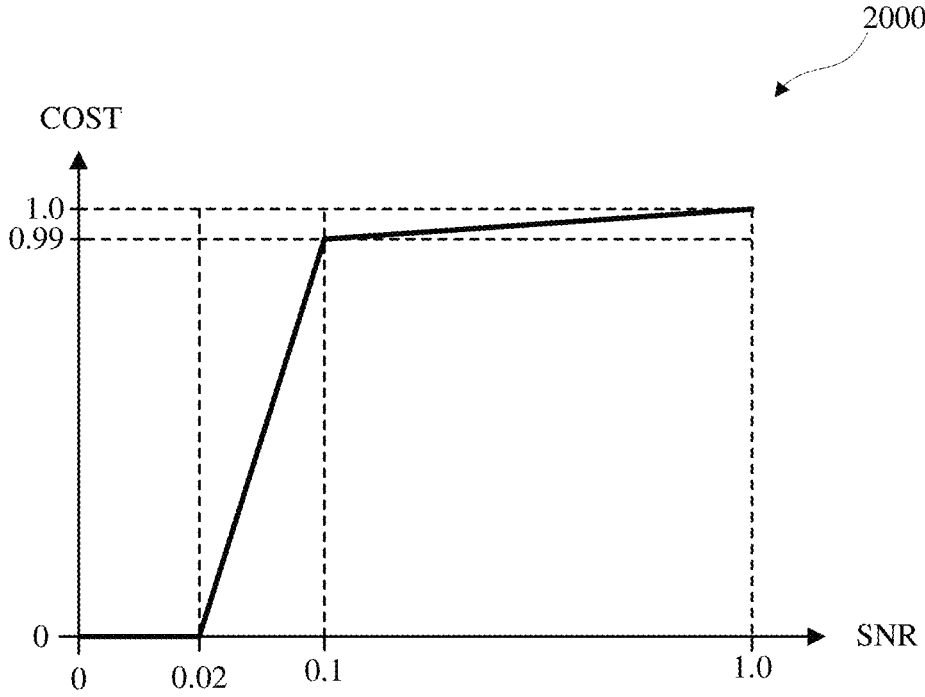
FIG. 20 is a diagram of an example of a blur cost function.

The image capture apparatus, or a component thereof such as the image processing pipeline, or a component thereof, such as such as the adaptive acquisition control component, or a component thereof, such as the exposure control component, obtains the simulated blur cost value (at 1044) in accordance with the simulated motion blur length value and a defined blur cost function. An example of the defined blur cost function is shown in FIG. 20.

The image capture apparatus, or a component thereof such as the image processing pipeline, or a component thereof, such as such as the adaptive acquisition control component, or a component thereof, such as the exposure control component, includes the simulated blur cost value in the simulated blur data. The simulated blur data (obtained at 1040) with respect to the current candidate exposure data may be a portion of the simulated blur data obtained for the candidate exposure data as shown (at 750) in FIG. 7.

The image capture apparatus, or a component thereof such as the image processing pipeline, or a component thereof, such as such as the adaptive acquisition control component, or a component thereof, such as the exposure control component, obtains the simulated black saturation (BSAT) data (at 1050).

Obtaining the simulated black saturation (BSAT) data (at 1050) includes obtaining a simulated black saturation (BSAT) value (at 1052) and obtaining a simulated black saturation (BSAT) cost value (at 1054).

The image capture apparatus, or a component thereof such as the image processing pipeline, or a component thereof, such as such as the adaptive acquisition control component, or a component thereof, such as the exposure control component, obtains the simulated black saturation (BSAT) value (at 1052) in accordance with the simulated histogram data. The current candidate exposure data indicates a current candidate exposure value that indicates the current candidate exposure duration value.

Obtaining the simulated black saturation value includes obtaining, as the simulated black saturation value, a cardinality of a minimum index bin from the simulated histogram data. In some implementations, the simulated histogram data includes per-color channel simulated histogram data, including simulated histogram data for a red color channel (histoR), simulated histogram data for a blue color channel (histoB), and simulated histogram data for a green color channel (histoG), and obtaining the simulated black saturation value includes obtaining, as the simulated black saturation value, the maximum value among the cardinalities of the respective minimum index bins from the per-color channel simulated histogram data, which may be expressed as BSAT=max(histoR[0], histoG[0], histoB[0]).

The image capture apparatus, or a component thereof such as the image processing pipeline, or a component thereof, such as such as the adaptive acquisition control component, or a component thereof, such as the exposure control component, obtains the simulated black saturation (BSAT) cost value (at 1054) in accordance with the simulated black saturation value and a defined black saturation cost function, which may be piecewise linear.

The image capture apparatus, or a component thereof such as the image processing pipeline, or a component thereof, such as such as the adaptive acquisition control component, or a component thereof, such as the exposure control component, includes the simulated black saturation cost value in the simulated black saturation data. The simulated black saturation data (obtained at 1050) with respect to the current candidate exposure data may be a portion of the simulated black saturation data obtained for the candidate exposure data as shown (at 750) in FIG. 7.

The image capture apparatus, or a component thereof such as the image processing pipeline, or a component thereof, such as such as the adaptive acquisition control component, or a component thereof, such as the exposure control component, obtains the simulated white saturation (WSAT) data (at 1060).

Obtaining the simulated white saturation (WSAT) data (at 1060) includes obtaining a simulated white saturation (WSAT) value (at 1062) and obtaining a simulated white saturation (WSAT) cost value (at 1064).

The image capture apparatus, or a component thereof such as the image processing pipeline, or a component thereof, such as such as the adaptive acquisition control component, or a component thereof, such as the exposure control component, obtains the simulated white saturation (WSAT) value (at 1062) in accordance with the simulated histogram data.

Obtaining the simulated white saturation value includes obtaining, as the simulated white saturation value, a cumulative cardinality of at least one bin from the simulated histogram data corresponding to pixel values greater than a result of dividing a maximum bin index of the simulated histogram data by a white balance scale value. The white balance scale value is a gain applied by a white balance component of the image capture apparatus. For example, for a color channel, using a white balance scale value (X) greater than or equal to one (X>=1), wherein the simulated histogram data includes a number, count, or cardinality (N)

of bins, indexed from a minimum bin index of zero (0) to a maximum bin index of the number, count, or cardinality (N) of bins minus one (N−1), pixel values greater than a result of dividing the maximum bin index (N−1) by the white balance scale value (X) (N−1/X) are identified as saturated, which may preserve color and prevent, avoid, or minimize highlight clipping, such as in colored environment, such as underwater.

In some implementations, in the absence of white balance, the cardinality of the maximum bin index simulated bin from the simulated histogram data may be used as the simulated white saturation value.

The image capture apparatus, or a component thereof such as the image processing pipeline, or a component thereof, such as such as the adaptive acquisition control component, or a component thereof, such as the exposure control component, obtains the simulated white saturation (WSAT) cost value (at 1064) in accordance with the simulated white saturation value and a defined white saturation cost function, which may be piecewise linear.

In some implementations, the black saturation cost function, the white saturation cost function, or both, may be adjusted, such as in view of one or more artifact types, such as wherein relatively low signal values are relatively sensitive to noise, hardware induced artifacts, or both. Although obtaining the simulated black saturation value is described herein with respect to the minimum index bin, the simulated black saturation value may be obtained with respect to multiple, such as two or three, minimal index bins.

The image capture apparatus, or a component thereof such as the image processing pipeline, or a component thereof, such as such as the adaptive acquisition control component, or a component thereof, such as the exposure control component, includes the simulated white saturation cost value in the simulated white saturation data. The simulated white saturation data (obtained at 1060) with respect to the current candidate exposure data may be a portion of the simulated white saturation data obtained for the candidate exposure data as shown (at 750) in FIG. 7.

FIG. 11 is a flow diagram of an example of evaluating simulated quality data 1100. Evaluating simulated quality data 1100, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, the image capture apparatus 500 shown in FIG. 5, as a part of the image processing pipeline 600 shown in FIG. 6, or in another image capture apparatus. In some implementations, evaluating simulated quality data 1100, or one or more portions thereof, may be implemented in a digital signal processor (DSP), an application-specific integrated circuit (ASIC), or a combination of a digital signal processor and an application-specific integrated circuit. One or more aspects of evaluating simulated quality data 1100 may be implemented in hardware, software, or a combination of hardware and software.

Evaluating simulated quality data 1100 includes accessing input data (at 1110), obtaining simulated noise-blur cost data (at 1120), obtaining a noise-blur exposure duration value (at 1125), obtaining simulated saturation cost data (at 1130), obtaining a saturation exposure value (at 1135), evaluating the noise-blur exposure duration value and the saturation exposure value (at 1140), using a maximum gain value (at 1150), obtaining simulated blur-saturation cost data (at 1152), obtaining a minimal simulated blur-saturation cost value (at 1160), using a minimum gain value (at 1170), obtaining simulated noise-saturation cost data (at 1172), obtaining a minimal simulated noise-saturation cost value (at 1180), and obtaining a gain value (at 1190).

Accessing the input data (at 1110) includes accessing simulated noise data, such as simulated noise data from the simulated quality data shown (at 750) in FIG. 7 and (at 1030) in FIG. 10. Accessing the input data (at 1110) includes accessing simulated blur data, such as simulated blur data from the simulated quality data shown (at 750) in FIG. 7 and (at 1040) in FIG. 10. Accessing the input data (at 1110) includes accessing simulated black saturation data, such as simulated black saturation data from the simulated quality data shown (at 750) in FIG. 7 and (at 1050) in FIG. 10. Accessing the input data (at 1110) includes accessing simulated white saturation data, such as simulated white saturation data from the simulated quality data shown (at 750) in FIG. 7 and (at 1060) in FIG. 10.

The image capture apparatus, or a component thereof such as the image processing pipeline, or a component thereof, such as such as the adaptive acquisition control component, or a component thereof, such as the exposure control component, obtains the simulated noise-blur cost data (at 1120).

Obtaining the simulated noise-blur cost data (at 1120) includes obtaining the simulated noise-blur cost data, on a per-candidate basis with respect to the candidate exposure duration values as shown by the broken directional line (at 1122), in accordance with the simulated noise data (accessed at 1110).

Obtaining the simulated noise-blur cost data (at 1120) on a per-candidate basis with respect to the candidate exposure duration values includes, for a respective candidate exposure duration value from the candidate exposure duration values, obtaining a simulated noise-blur cost value. To obtain the simulated noise-blur cost value the image capture apparatus, or a component thereof such as the image processing pipeline, or a component thereof, such as such as the adaptive acquisition control component, or a component thereof, such as the exposure control component, obtains a Euclidian distance between a simulated noise cost value for the respective candidate exposure duration value from the simulated noise data and a corresponding simulated blur cost value from the simulated blur data.

The image capture apparatus, or a component thereof such as the image processing pipeline, or a component thereof, such as such as the adaptive acquisition control component, or a component thereof, such as the exposure control component includes the simulated noise-blur cost value obtained in accordance with the respective candidate exposure duration value in the simulated noise-blur cost data.

The image capture apparatus, or a component thereof such as the image processing pipeline, or a component thereof, such as such as the adaptive acquisition control component, or a component thereof, such as the exposure control component, obtains the noise-blur exposure duration value (at 1125) in accordance with a minimal simulated noise-blur cost value from the simulated noise-blur cost data (obtained at 1120).

The image capture apparatus, or a component thereof such as the image processing pipeline, or a component thereof, such as such as the adaptive acquisition control component, or a component thereof, such as the exposure control component, obtains the simulated saturation cost data (at 1130).

Obtaining the simulated saturation cost data (at 1130) includes obtaining the simulated saturation cost data, on a per-candidate basis with respect to the candidate exposure duration values as shown by the broken directional line (at 1132), in accordance with the simulated black saturation data and the simulated white saturation data (accessed at 1110).

Obtaining the simulated saturation cost data (at 1130) on a per-candidate basis with respect to the candidate exposure duration values includes, for a respective candidate exposure duration value from the candidate exposure duration values, obtaining a simulated saturation cost value. To obtain the simulated saturation cost value the image capture apparatus, or a component thereof such as the image processing pipeline, or a component thereof, such as such as the adaptive acquisition control component, or a component thereof, such as the exposure control component, obtains a Euclidian distance between a simulated black saturation cost value for the respective candidate exposure duration value from the simulated black saturation data and a corresponding simulated white saturation cost value from the simulated white saturation data.

The image capture apparatus, or a component thereof such as the image processing pipeline, or a component thereof, such as such as the adaptive acquisition control component, or a component thereof, such as the exposure control component includes the simulated saturation cost value obtained in accordance with the respective candidate exposure duration value in the simulated saturation cost data.

The image capture apparatus, or a component thereof such as the image processing pipeline, or a component thereof, such as such as the adaptive acquisition control component, or a component thereof, such as the exposure control component, obtains the saturation exposure value (at 1135) in accordance with a minimal simulated saturation cost value from the simulated saturation cost data.

Although obtaining the simulated saturation cost data and obtaining the saturation exposure value are shown sequentially after obtaining the simulated noise-blur cost data and obtaining the noise-blur exposure duration value, obtaining the simulated saturation cost data and obtaining the saturation exposure value may be performed prior to, or concurrently with, such as using parallel processing, obtaining the simulated noise-blur cost data and obtaining the noise-blur exposure duration value.

The image capture apparatus, or a component thereof such as the image processing pipeline, or a component thereof, such as such as the adaptive acquisition control component, or a component thereof, such as the exposure control component, evaluates the noise-blur exposure duration value and the saturation exposure value (at 1140).

Evaluating the noise-blur exposure duration value and the saturation exposure value (at 1140) may include determining whether the noise-blur exposure duration value (obtained at 1125) is less than a result of dividing the saturation exposure value (obtained at 1135) by the defined maximum gain value (gainMax).

For example, the image capture apparatus, or a component thereof such as the image processing pipeline, or a component thereof, such as such as the adaptive acquisition control component, or a component thereof, such as the exposure control component, may determine that the noise-blur exposure duration value (obtained at 1125) is less than the result of dividing the saturation exposure value (obtained at 1135) by the defined maximum gain value (gainMax) as indicated by the broken directional line (at 1142) from evaluating the noise-blur exposure duration value and the saturation exposure value (at 1140) to using the maximum gain (at 1150), indicating that the noise-blur exposure duration value (obtained at 1125) is low relative to the saturation exposure value (obtained at 1135).

Evaluating the noise-blur exposure duration value and the saturation exposure value (at 1140) may include determining whether the noise-blur exposure duration value (obtained at 1125) is greater than a result of dividing the saturation exposure value (obtained at 1135) by the defined minimum gain value (gainMin).

For example, the image capture apparatus, or a component thereof such as the image processing pipeline, or a component thereof, such as such as the adaptive acquisition control component, or a component thereof, such as the exposure control component, may determine that the noise-blur exposure duration value (obtained at 1125) is greater than the result of dividing the saturation exposure value (obtained at 1135) by the defined minimum gain value (gainMin) as indicated by the broken directional line (at 1144) from evaluating the noise-blur exposure duration value and the saturation exposure value (at 1140) to using the minimum gain (at 1170), indicating that the noise-blur exposure duration value (obtained at 1125) is high relative to the saturation exposure value (obtained at 1135).

Evaluating the noise-blur exposure duration value and the saturation exposure value (at 1140) may include determining whether the noise-blur exposure duration value (obtained at 1125) is greater than or equal to the result of dividing the saturation exposure value (obtained at 1135) by the defined maximum gain value (gainMax) and less than or equal to the result of dividing the saturation exposure value (obtained at 1135) by the defined minimum gain value (gainMin).

For example, the image capture apparatus, or a component thereof such as the image processing pipeline, or a component thereof, such as such as the adaptive acquisition control component, or a component thereof, such as the exposure control component, may determine that the noise-blur exposure duration value (obtained at 1125) is greater than or equal to the result of dividing the saturation exposure value (obtained at 1135) by the defined maximum gain value (gainMax) and less than or equal to the result of dividing the saturation exposure value (obtained at 1135) by the defined minimum gain value (gainMin) as indicated by the broken directional line by the broken directional line (at 1146) from evaluating the noise-blur exposure duration value and the saturation exposure value (at 1140) to obtaining the gain value (at 1190), indicating that the noise-blur exposure duration value (obtained at 1125) is compatible with the saturation exposure value (obtained at 1135).

In some implementations, the image capture apparatus, or a component thereof such as the image processing pipeline, or a component thereof, such as such as the adaptive acquisition control component, or a component thereof, such as the exposure control component, determines (at 1140) that the noise-blur exposure duration value (obtained at 1125) is less than the result of dividing the saturation exposure value (obtained at 1135) by the defined maximum gain value (gainMax), and in response to determining (a determination) that the noise-blur exposure duration value is less than the result of dividing the saturation exposure value by the maximum gain value (gainMax), the image capture apparatus, or a component thereof such as the image processing pipeline, or a component thereof, such as such as the adaptive acquisition control component, or a component thereof, such as the exposure control component, obtains the maximum gain value as the target gain value for the adaptive acquisition control output data (at 1150).

In some implementations, the image capture apparatus, or a component thereof such as the image processing pipeline, or a component thereof, such as such as the adaptive acquisition control component, or a component thereof, such as the exposure control component, determines (at 1140) that the noise-blur exposure duration value (obtained at 1125) is less than the result of dividing the saturation exposure value (obtained at 1135) by the defined maximum gain value (gainMax), and in response to determining (a determination) that the noise-blur exposure duration value is less than the result of dividing the saturation exposure value by the maximum gain value (gainMax), the image capture apparatus, or a component thereof such as the image processing pipeline, or a component thereof, such as such as the adaptive acquisition control component, or a component thereof, such as the exposure control component, obtains the simulated blur-saturation cost data (at 1152).

Obtaining the simulated blur-saturation cost data (at 1152) includes obtaining the simulated blur-saturation cost data, on a per-candidate basis with respect to the candidate exposure duration values as shown by the broken directional line (at 1154), in accordance with the simulated blur data and the simulated black saturation data.

Obtaining the simulated blur-saturation cost data (at 1152) on a per-candidate basis with respect to the candidate exposure duration values includes, for a respective candidate exposure duration value from the candidate exposure duration values, obtaining a simulated blur-saturation cost value. To obtain the simulated blur-saturation cost value the image capture apparatus, or a component thereof such as the image processing pipeline, or a component thereof, such as such as the adaptive acquisition control component, or a component thereof, such as the exposure control component, obtains a Euclidian distance between a respective simulated blur cost value for the respective candidate exposure duration value from the simulated blur data and a corresponding simulated black saturation cost value from the simulated black saturation data.

The image capture apparatus, or a component thereof such as the image processing pipeline, or a component thereof, such as such as the adaptive acquisition control component, or a component thereof, such as the exposure control component includes the simulated blur-saturation cost value obtained in accordance with the respective candidate exposure duration value in the simulated blur-saturation cost data.

The image capture apparatus, or a component thereof such as the image processing pipeline, or a component thereof, such as such as the adaptive acquisition control component, or a component thereof, such as the exposure control component, obtains the target exposure duration value (at 1160) in accordance with a minimal simulated blur-saturation cost value from the simulated blur-saturation cost data (obtained at 1152).

In some implementations, the image capture apparatus, or a component thereof such as the image processing pipeline, or a component thereof, such as such as the adaptive acquisition control component, or a component thereof, such as the exposure control component, determines (at 1140) that the noise-blur exposure duration value (obtained at 1125) is greater than the result of dividing the saturation exposure value (obtained at 1135) by the defined minimum gain value (gainMin), and in response to determining (a determination) that the noise-blur exposure duration value (obtained at 1125) is greater than the result of dividing the saturation exposure value (obtained at 1135) by the defined minimum gain value (gainMin), the image capture apparatus, or a component thereof such as the image processing pipeline, or a component thereof, such as such as the adaptive acquisition control component, or a component thereof, such as the exposure control component, obtains the minimum gain value as the target gain value for the adaptive acquisition control output data (at 1170).

In some implementations, the image capture apparatus, or a component thereof such as the image processing pipeline, or a component thereof, such as such as the adaptive acquisition control component, or a component thereof, such as the exposure control component, determines (at 1140) that the noise-blur exposure duration value (obtained at 1125) is greater than the result of dividing the saturation exposure value (obtained at 1135) by the defined minimum gain value (gainMin), and in response to determining (a determination) that the noise-blur exposure duration value (obtained at 1125) is greater than the result of dividing the saturation exposure value (obtained at 1135) by the defined minimum gain value (gainMin), the image capture apparatus, or a component thereof such as the image processing pipeline, or a component thereof, such as such as the adaptive acquisition control component, or a component thereof, such as the exposure control component, obtains the simulated noise-saturation cost data (at 1172).

Obtaining the simulated noise-saturation cost data (at 1172) includes obtaining the simulated noise-saturation cost data, on a per-candidate basis with respect to the candidate exposure duration values as shown by the broken directional line (at 1174), in accordance with the simulated noise data and the simulated white saturation data.

Obtaining the simulated noise-saturation cost data (at 1172) on a per-candidate basis with respect to the candidate exposure duration values includes, for a respective candidate exposure duration value from the candidate exposure duration values, obtaining a simulated noise-saturation cost value. To obtain the simulated noise-saturation cost value the image capture apparatus, or a component thereof such as the image processing pipeline, or a component thereof, such as such as the adaptive acquisition control component, or a component thereof, such as the exposure control component, obtains a Euclidian distance between a respective simulated noise cost value for the respective candidate exposure duration value from the simulated noise data and a corresponding simulated white saturation cost value from the simulated white saturation data.

The image capture apparatus, or a component thereof such as the image processing pipeline, or a component thereof, such as such as the adaptive acquisition control component, or a component thereof, such as the exposure control component includes the simulated noise-saturation cost value obtained in accordance with the respective candidate exposure duration value in the simulated noise-saturation cost data.

The image capture apparatus, or a component thereof such as the image processing pipeline, or a component thereof, such as such as the adaptive acquisition control component, or a component thereof, such as the exposure control component, obtains the target exposure duration value (at 1180) in accordance with a minimal simulated noise-saturation cost value from the simulated noise-saturation cost data (obtained at 1172).

In some implementations, the image capture apparatus, or a component thereof such as the image processing pipeline, or a component thereof, such as such as the adaptive acquisition control component, or a component thereof, such as the exposure control component, determines (at 1140) that the noise-blur exposure duration value (obtained at 1125) is greater than or equal to the result of dividing the saturation exposure value (obtained at 1135) by the defined maximum gain value (gainMax) and less than or equal to the result of dividing the saturation exposure value (obtained at 1135) by the defined minimum gain value (gainMin), and in response to determining (a determination) that the noise-blur exposure duration value (obtained at 1125) is greater than or equal to the result of dividing the saturation exposure value (obtained at 1135) by the defined maximum gain value (gainMax) and less than or equal to the result of dividing the saturation exposure value (obtained at 1135) by the defined minimum gain value (gainMin), the image capture apparatus, or a component thereof such as the image processing pipeline, or a component thereof, such as such as the adaptive acquisition control component, or a component thereof, such as the exposure control component, uses the noise-blur exposure duration value (obtained at 1125) as the target exposure duration value and obtains, as the target gain value, a gain value (at 1190) that is a result of dividing the saturation exposure value (obtained at 1135) by the noise-blur exposure duration value (obtained at 1125).

FIG. 12 is a flow diagram of an example of obtaining simulated histogram data 1200. Obtaining, such as generating, the simulated histogram data 1200, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, the image capture apparatus 500 shown in FIG. 5, as a part of the image processing pipeline 600 shown in FIG. 6, or in another image capture apparatus. In some implementations, obtaining the simulated histogram data 1200, or one or more portions thereof, may be implemented in a digital signal processor (DSP), an application-specific integrated circuit (ASIC), or a combination of a digital signal processor and an application-specific integrated circuit. One or more aspects of obtaining the simulated histogram data 1200 may be implemented in hardware, software, or a combination of hardware and software. Obtaining the simulated histogram data 1200 is similar to obtaining simulated histogram data as shown (at 1020) in FIG. 10.

Obtaining the simulated histogram data 1200 includes accessing input data including a current exposure duration value (at 1210), obtaining a current candidate exposure duration value (at 1220), determining whether the current candidate exposure duration value is greater than, or less than, the current exposure duration value (at 1230), histogram dilation (at 1240), and histogram compression (at 1250).

Accessing the input data (at 1010) includes accessing current input image data, such the input data obtained as shown (at 1010) in FIG. 10, or one or more portions thereof. The current input data includes current histogram data corresponding to a current input image. The current input data includes current adaptive acquisition control data corresponding to capturing the current input image. The current adaptive acquisition control data includes current exposure data that includes a current exposure duration value.

Obtaining the current candidate exposure duration value (at 1220) includes accessing the current candidate exposure duration value from candidate exposure data, such as the candidate exposure data obtained as shown (at 740) in FIG. 7.

The image capture apparatus, or a component thereof, such as an exposure control component, determines whether the current candidate exposure duration value is greater than, or less than, (< >) the current exposure duration value (at 1230). In some implementations, the exposure control component determines whether the current candidate exposure duration value is greater than, or less than or equal to, (<=)

the current exposure duration value (at 1230). In some implementations, the exposure control component determines whether the current candidate exposure duration value is greater than or equal to, or less than, (>=) the current exposure duration value (at 1230).

In some implementations, determining whether the current candidate exposure duration value is greater than, or less than, the current exposure duration value (at 1230) includes obtaining, as an exposure ratio value (ER), a result of dividing the current candidate exposure duration value by the current exposure duration value.

In some implementations, the exposure control component determines that the current candidate exposure duration value is greater than (>) the current exposure duration value (at 1232) and performs histogram dilation (at 1240).

In some implementations, determining that the current candidate exposure duration value is greater than (>) the current exposure duration value (at 1232) includes determining that the exposure ratio value is less than one (1). In some implementations, in response to a determination that the current candidate exposure duration value is greater than the current exposure duration value (at 1232), such as a determination that the exposure ratio value is less than one (1), the exposure control component obtains the simulated histogram data by performing histogram dilation (at 1240) in accordance with the current histogram data and the exposure ratio value.

Figure 15:
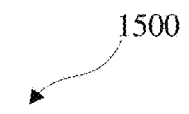
FIG. 15 is a diagram of a first portion of an example of a graphical representation of histogram dilation.
Figure 15:
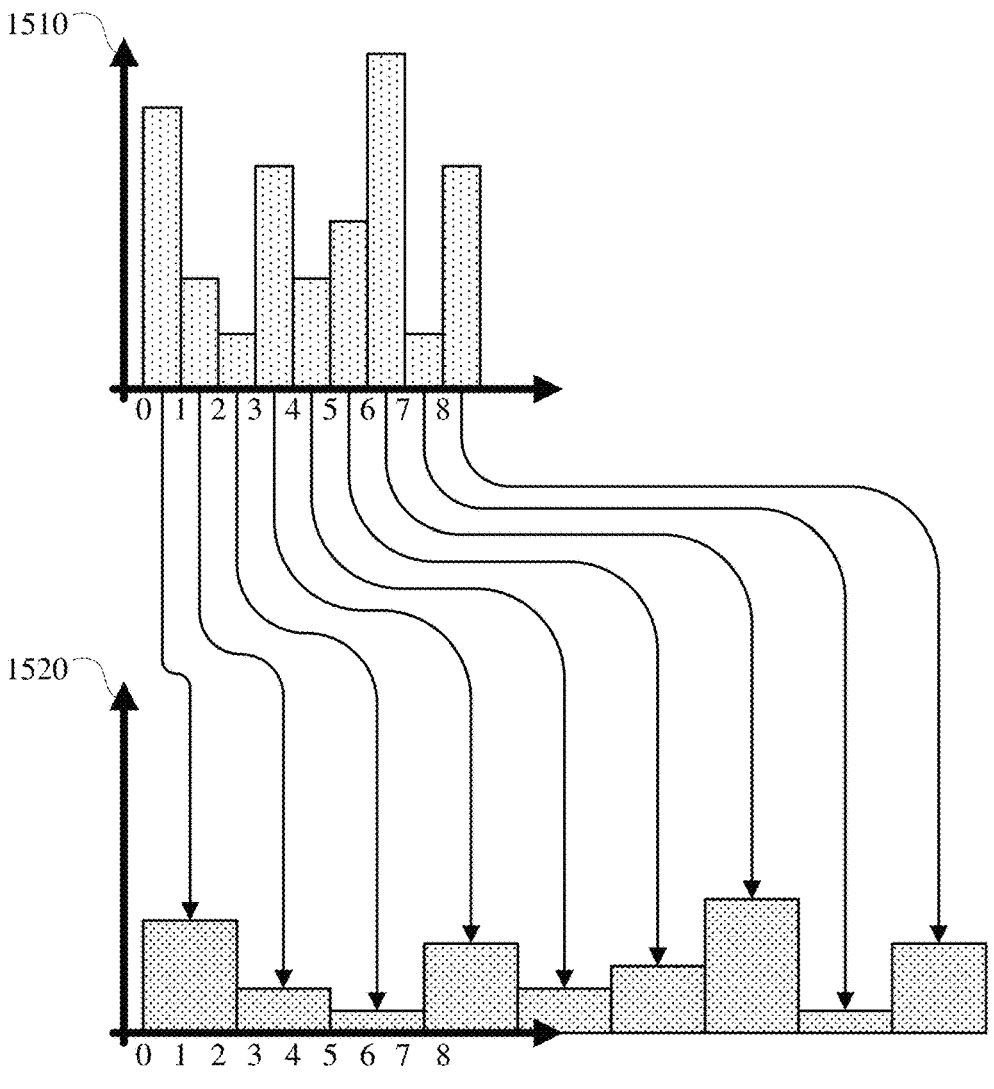
Figure 16:
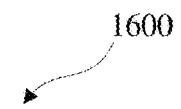
FIG. 16 is a diagram of a second portion of the example of the graphical representation of histogram dilation.
Figure 16:
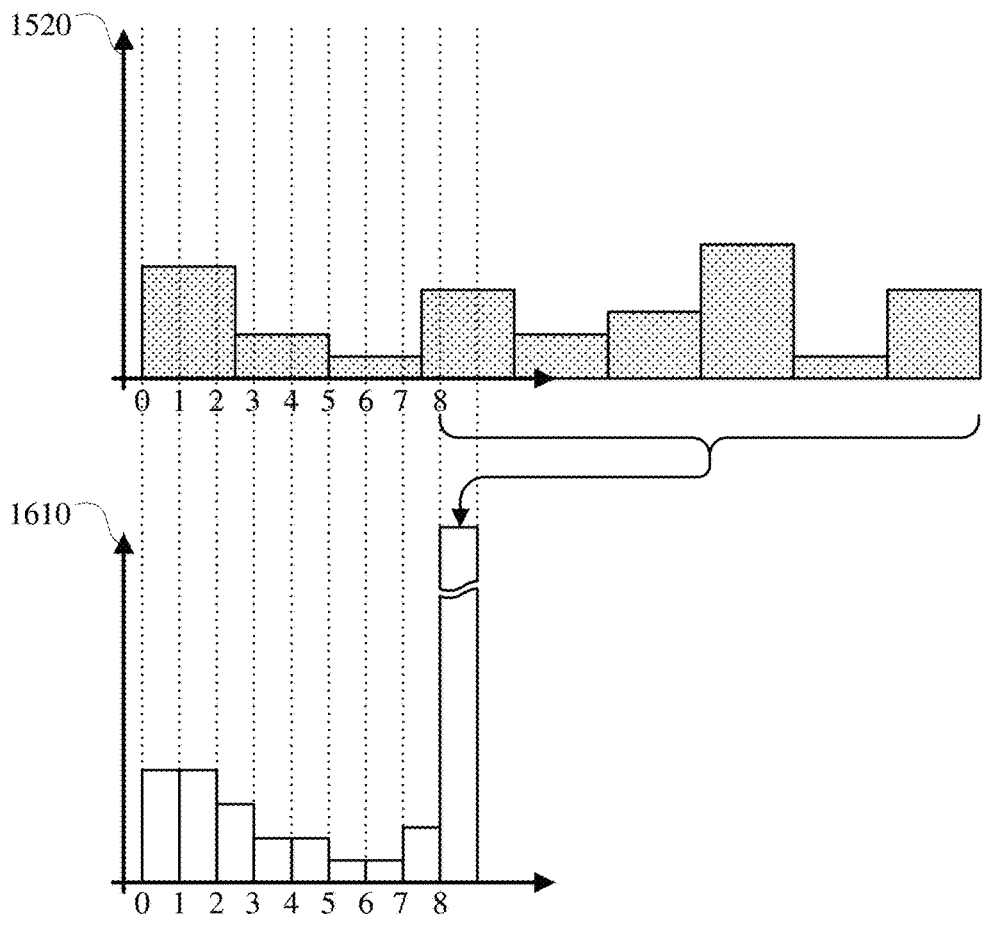

An example of histogram dilation is shown in FIG. 13. An example of a graphical representation of histogram dilation is shown in FIGS. 15-16.

In some implementations, the exposure control component determines that the current candidate exposure duration value is less than (<), or less than or equal to, the current exposure duration value (at 1234) and performs histogram compression (at 1250).

In some implementations, determining that the current candidate exposure duration value is less than (<), or less than or equal to, the current exposure duration value (at 1232) includes determining that the exposure ratio value is greater than, or greater than or equal to, one (1). In some implementations, in response to a determination that the current candidate exposure duration value is less than, or less than or equal to, the current exposure duration value (at 1234), such as a determination that the exposure ratio value is greater than one (1), the exposure control component obtains the simulated histogram data by performing histogram compression (at 1250) in accordance with the current histogram data and the exposure ratio value.

Figure 14:
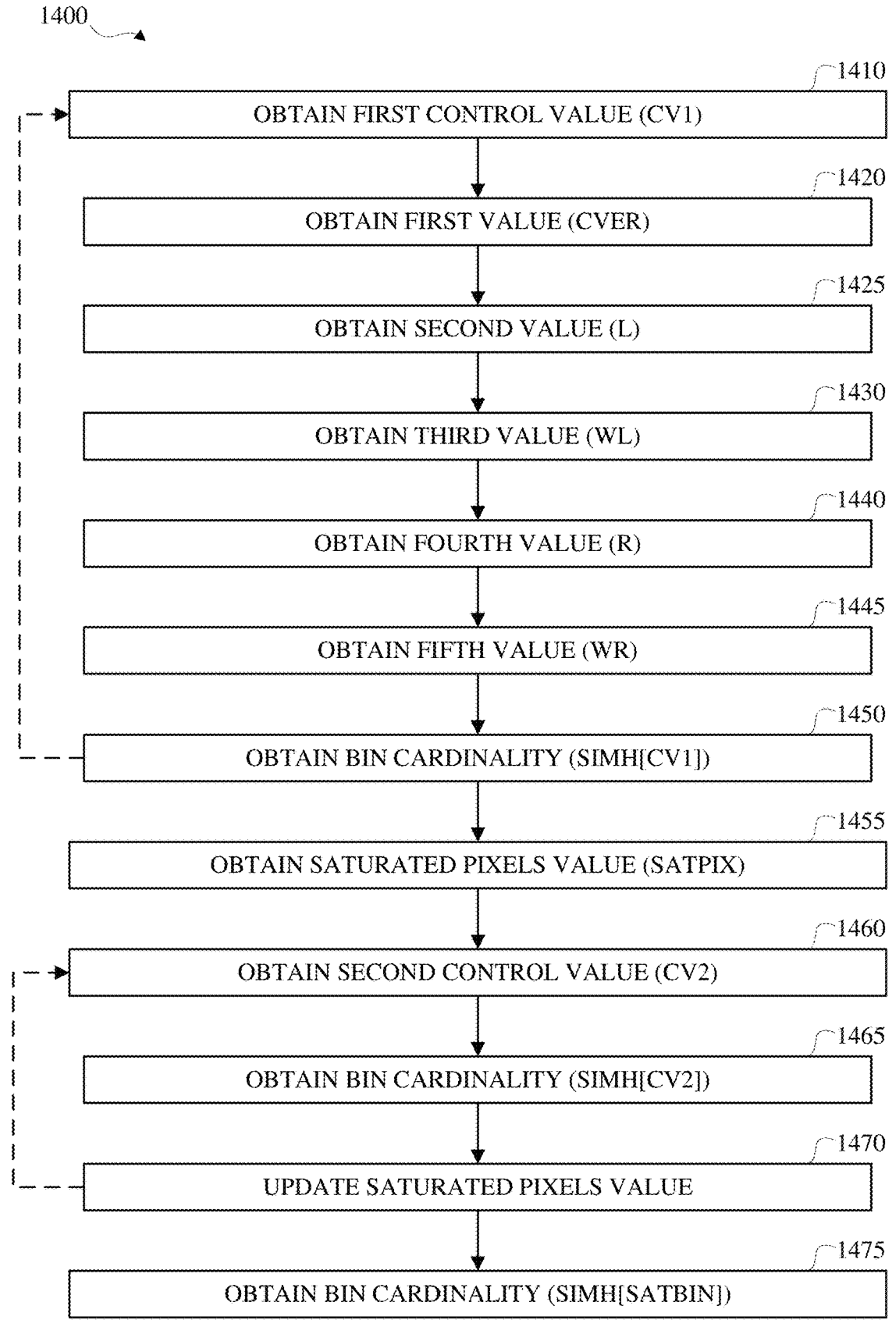
FIG. 14 is a flow diagram of an example of a histogram compression.
Figure 17:
FIG. 17 is a diagram of a first portion of an example of a graphical representation of histogram compression.
Figure 17:
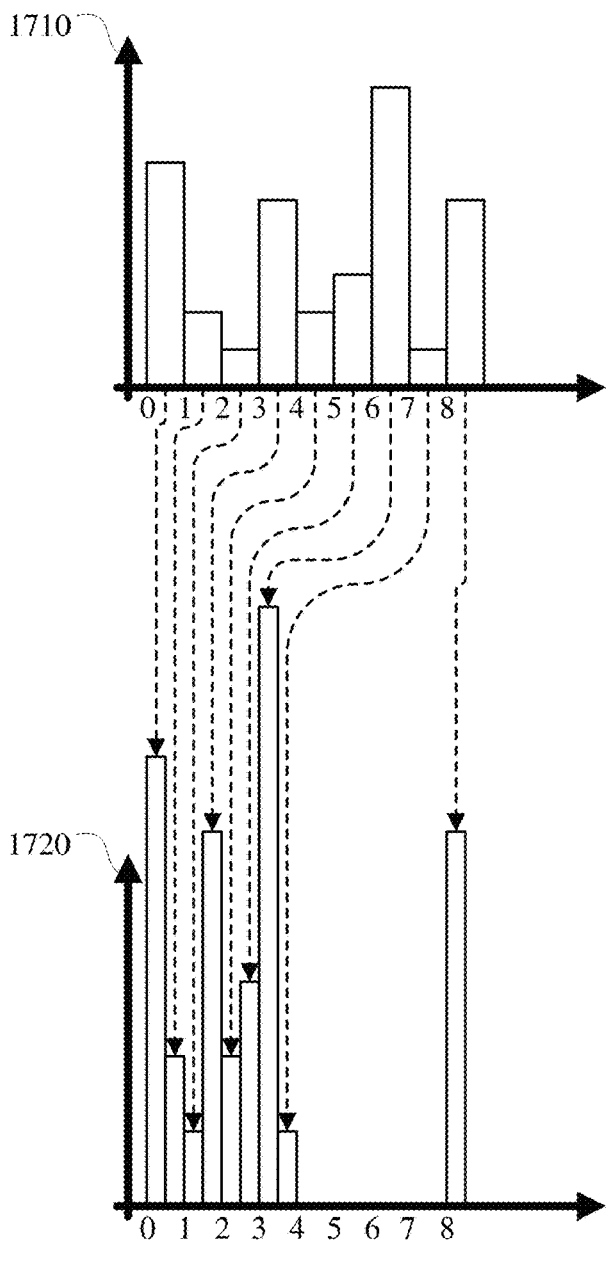
Figure 18:
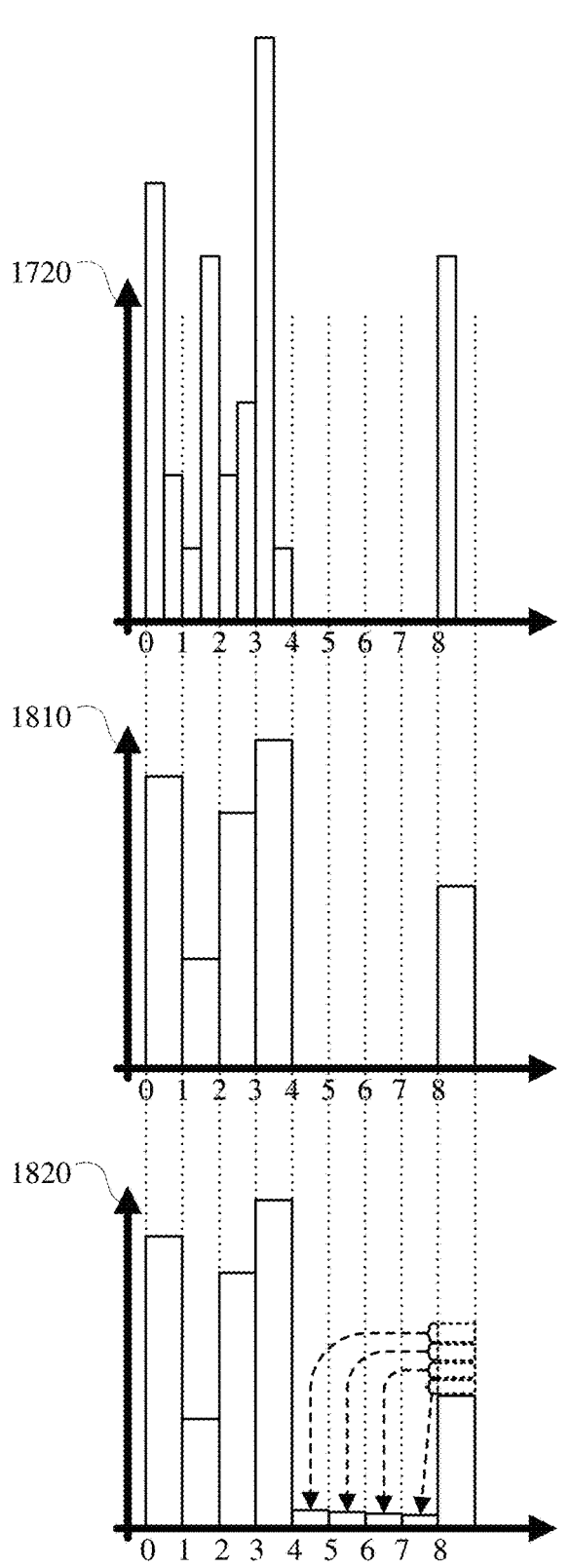
FIG. 18 is a diagram of a second portion of the example of the graphical representation of histogram compression.

An example of histogram compression is shown in FIG. 14. An example of a graphical representation of histogram compression is shown in FIGS. 17-18.

FIG. 13 is a flow diagram of an example of a histogram dilation 1300. Histogram dilation 1300, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, the image capture apparatus 500 shown in FIG. 5, as a part of the image processing pipeline 600 shown in FIG. 6, or in another image capture apparatus. In some implementations, histogram dilation 1300, or one or more portions thereof, may be implemented in a digital signal processor (DSP), an application-specific integrated circuit (ASIC), or a combination of a digital signal processor and an application-specific integrated circuit. One or more aspects of histogram dilation 1300 may be implemented in hardware, software, or a combination of hardware and software. An example of a graphical representation of histogram dilation is shown in FIGS. 15-16.

Histogram dilation 1300 includes obtaining a current control value (at 1310), obtaining a first value (at 1320), obtaining a second value (at 1330), obtaining a bin cardinality value (at 1340), and obtaining a maximal index value bin cardinality value (at 1350). Although not shown separately in FIG. 13, histogram dilation 1300 includes obtaining the current histogram data (CURH) and the exposure ratio value (ER) as described in FIG. 12.

Obtaining the current control value (at 1310) includes obtaining the current control value (CV) from a range of values from zero (0) to one less than a maximal bin index value (SATBIN) from the current histogram data (SATBIN–1), which is equivalent to two less than a histogram cardinality from the current histogram data. For example, for current histogram data including two hundred fifty-six (256) bins, the range of control values is from zero to two hundred fifty-four (254). Obtaining the current control value (at 1310), obtaining the first value (at 1320), obtaining the second value (at 1330), and obtaining the bin cardinality value (at 1340) are performed, such as iteratively, for the range of control values, on a per-control-value basis, in increasing control value order, as indicated by the broken directional line from obtaining the bin cardinality value (at 1340) to obtaining the current control value (at 1310). For example, subsequent to obtaining the bin cardinality value (at 1340), obtaining the current control value (at 1310) may include incrementing the current control value by one, such as in response to a determination that the current control value is less than one less than the maximal bin index value.

Obtaining the first value (at 1320) includes obtaining, as the first value (Q), an integer portion of a result of dividing the control value (CV) by the exposure ratio value (ER), which may be expressed as the following:

$$Q = \text{FLOOR}(CV/ER).$$

Obtaining the second value (at 1330) includes obtaining, as the second value (W), a minimal value (MIN) among one (1) and a result of multiplying a sum of the first value and one (Q+1) by a result of subtracting the control value from the exposure ratio value (ER-CV), which may be expressed as the following:

$$W = \text{MIN}(1, (Q + 1) * ER - CV).$$

Obtaining the bin cardinality value (at 1340) includes obtaining, as the bin cardinality value for a simulated bin of the simulated histogram data at an index value matching the control value (SIMH[CV]), an integer portion (FLOOR) of a result of dividing, by the exposure ratio value (ER), a result of multiplying the second value (W), a sum of a bin cardinality value from a bin from the current histogram data having an index value that matches the first value (CURH [Q]) and a result of subtracting the second value from one (1–W), and a bin cardinality value from a bin from the current histogram data having an index value that matches a result of subtracting one from the first value (CURH[Q–1]), which may be expressed as the following:

$$SIMH[CV] = \text{FLOOR}((W * CURH[Q] + (1 - W) * CURH[Q - 1])/ER).$$

Obtaining the current control value (at 1310), obtaining the first value (at 1320), obtaining the second value (at 1330), and obtaining the bin cardinality value (at 1340) iteratively, for the range of control values, on a per-control-value basis, populates the bins of the simulated histogram other than the white saturated bin, which is the bin having the maximal bin index.

Obtaining another bin cardinality value (at 1350) includes obtaining, as the bin cardinality value for a simulated bin of the simulated histogram data at an index value that matches the maximum index value (SIMH[SATBIN] or SIMH[CV+1]), a result of subtracting a sum of the bin cardinality values from the simulated histogram data (SUM(SIMH)) from a sum of the bin cardinality values from the current histogram data (SUM(CURH)), which may be expressed as the following:

$$SIMH[SATBIN] = \text{SUM}(CURH) - \text{SUM}(SIMH).$$

FIG. 14 is a flow diagram of an example of a histogram compression 1400. Histogram compression 1400, or a portion thereof, is implemented in an image capture apparatus, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, the image capture apparatus 500 shown in FIG. 5, as a part of the image processing pipeline 600 shown in FIG. 6, or in another image capture apparatus. In some implementations, histogram compression 1400, or one or more portions thereof, may be implemented in a digital signal processor (DSP), an application-specific integrated circuit (ASIC), or a combination of a digital signal processor and an application-specific integrated circuit. One or more aspects of histogram compression 1400 may be implemented in hardware, software, or a combination of hardware and software. An example of a graphical representation of histogram compression is shown in FIGS. 17-18.

Histogram compression 1400 includes obtaining a first current control value (at 1410), obtaining a first value (at 1420), obtaining a second value (at 1425), obtaining a third value (at 1430), obtaining a fourth value (at 1440), obtaining a fifth value (at 1445), obtaining a bin cardinality value in accordance with the first control value (at 1450), obtaining a saturated pixels value (at 1455), obtaining a second control value (at 1460), obtaining a bin cardinality value in accordance with the second control value (at 1465), updating the saturated pixels value (at 1470), and obtaining a bin cardinality value for a maximal bin (at 1475). Although not shown separately in FIG. 14, histogram compression 1400 includes obtaining the current histogram data (CURH) and the exposure ratio value (ER), as described in FIG. 12.

Obtaining the first control value (at 1410) includes obtaining the first control value (CV1) from a range of values from zero (0) to an integer portion (FLOOR) of a result of dividing a maximum bin index value (SATBIN) from the current histogram data by the exposure ratio value (ER). Obtaining the first current control value (at 1410), obtaining the first value (at 1420), obtaining the second value (at 1425), determining whether the first value matches the second value (at 1430), obtaining the third value (at 1432 or 1434), obtaining the fourth value (at 1440), obtaining the fifth value (at 1445), obtaining the bin cardinality value in accordance with the first control value (at 1450) are performed, such as iteratively, for the range of control values, on a per-control-value basis, in increasing control value order, as indicated by the broken directional line from obtaining the bin cardinality value (at 1450) to obtaining the first control value (at 1410), which may be expressed as the following:

$$\text{FOR } CV1 \text{ IN RANGE}(0, \text{FLOOR}(SATBIN/ER)).$$

For example, subsequent to obtaining the bin cardinality value (at 1450), obtaining the first control value (at 1410) may include incrementing the first control value by one, such as in response to a determination that the first control value is less than one less than the result of dividing the maximum bin index value (SATBIN) from the current histogram data by the exposure ratio value (ER).

Obtaining the first value (at 1420) includes obtaining, as the first value (CVER), a result of multiplying the first control value (CV1) by the exposure ratio value (ER), which may be expressed as the following:

$$CVER = CV1 * ER.$$

Obtaining the second value (at 1425) includes obtaining, as the second value (L), a minimal integer value greater than or equal to (CEIL or ceiling) the first value, which may be expressed as the following:

$$L = \text{CEIL}(CVER).$$

Obtaining the third value (at 1430) includes determining whether the first value (CVER) matches (< >) the second value (L).

In some implementations, the image capture apparatus, or a component thereof, such as the exposure control component, determines that the first value matches the second value, and obtaining the third value (at 1430) includes, in response to a determination that the first value matches the second value, obtaining, as a third value (WL), zero (WL=0).

In some implementations, the image capture apparatus, or a component thereof, such as the exposure control component, determines that the first value differs from the second value, an obtaining the third value (at 1430) includes, in response to a determination that the first value differs from the second value, obtaining, as the third value (WL), a result of adding the second value (L) to a result of subtracting the first value (CVER) from one, which may be expressed as the following:

$$WL = L + 1 - CVER.$$

Obtaining the fourth value (at 1440) includes obtaining, as the fourth value (R), a result of subtracting one from an integer portion (FLOOR) of a result of multiplying the exposure ratio value (ER) by a sum of one and the first control value (CV1), which may be expressed as the following:

$$R = \text{FLOOR}((CV1 + 1) * ER) - 1.$$

Obtaining the fifth value (at 1445) includes obtaining, as the fifth value (WR), a result of multiplying the sum of one and the first control value (CV1) by a result of subtracting, from the exposure ratio value (ER), a sum of the fourth value and one which may be expressed as the following:

$$WR = (CV1 + 1) * ER - (R + 1).$$

Obtaining the bin cardinality value in accordance with the first control value (at 1450) includes obtaining, as the bin cardinality value for a simulated bin of the simulated histogram data at an index value that matches the first control value (SIMH[CV1]), a result of multiplying the third value (WL), a sum of a bin cardinality value for a bin from the current histogram data at an index value that matches one less than the second value (CURH[L−1]), a sum of bin cardinality values from bins from the current histogram data at bin index values that are greater than or equal to the second value and are less than or equal to the fourth value (CURH[L:R]), and the fifth value (WR), and a bin cardinality value for a bin from the current histogram data at an index value that matches a sum of the fourth value and one (CURH[R+1]), which may be expressed as the following:

$$SIMH[CV1] =$$
$$WL * CURH[L - 1] + \text{SUM}(CURH[L{:}R]) + WR * CURH[R + 1].$$

Obtaining the saturated pixels value (at 1455) includes obtaining, as the saturated pixels value (SATPIX), a bin cardinality value for a bin from the current histogram data at an index value that matches the maximum bin index value (CURH[SATBIN]).

Obtaining the second control value (at 1460), includes obtaining the second control value (CV2) from a range of values from a sum of one and the integer portion (FLOOR) of the result of dividing the maximum bin index value (SATBIN) by the exposure ratio value (ER) to one less than the maximum bin index value (SATBIN−1).

Obtaining the second control value (at 1460), obtaining the bin cardinality value in accordance with the second control value (at 1465), and updating the saturated pixels value (at 1470), which may be collectively referred to as applying a desaturation hypothesis, are performed, such as iteratively, for the range of control values, on a per-control-value basis, in increasing control value order, as indicated by the broken directional line from updating the saturated pixels value (at 1470) to obtaining the second control value (at 1460), which may be expressed as the following:

$$\text{FOR } CV2 \text{ IN RANGE } (\text{FLOOR}(SATBIN/ER) + 1, SATBIN - 1).$$

For example, subsequent to updating the saturated pixels value (at 1470), obtaining the second control value (at 1460) may include incrementing the second control value by one, such as in response to a determination that the second control value is less than one less than the maximum bin index value (SATBIN−1).

Obtaining the bin cardinality value in accordance with the second control value (at 1465) includes obtaining, as the bin cardinality value for a simulated bin of the simulated histogram data at an index value that matches the second control value (SVIH[CV2]), an integer portion (FLOOR) of a result of multiplying a defined desaturation value (DSAT), such as one tenth (0.1) or ten percent, by the saturated pixels value (SATPIX), which may be expressed as the following:

$$SIMH[CV2] = \text{FLOOR}(DSAT * SATPIX).$$

Other desaturation values may be used.

Updating the saturated pixels value (at 1470) includes obtaining, as the (updated) saturated pixels value (SATPIX), a result of subtracting, from the saturated pixels value (SATPIX), the bin cardinality value for the simulated bin of the simulated histogram data at the index value that matches the second control value (SIMH[CV2]), which may be expressed as the following:

$$SATPIX = SATPIX - SIMH[CV2].$$

Obtaining the bin cardinality value for a maximal bin (at 1475) includes obtaining, as a bin cardinality value for a simulated bin of the simulated histogram data at an index value that matches the maximum bin index value (SIMH[SATBIN]), the saturated pixels value (SATPIX), which may be expressed as the following:

$$SIMH[SATBIN]=SATPIX.$$

FIG. 15 is a diagram of a first portion of an example of a graphical representation of histogram dilation 1500.

As shown in FIG. 15, the first portion of the example of the graphical representation of histogram dilation 1500 includes a representative current histogram 1510, corresponding to current histogram data, corresponding to a previously captured image.

The representative current histogram 1510 includes a first, or leftmost, bin having the index value zero (0), a first bin width, and a first bin cardinality (represented by bin height). The representative current histogram 1510 includes a second bin, immediately to the right of the first bin, having the index value one (1), the first bin width, and a second bin cardinality (represented by bin height). The representative current histogram 1510 includes a third bin, immediately to the right of the second bin, having the index value two (2), the first bin width, and a third bin cardinality (represented by bin height). The representative current histogram 1510 includes a fourth bin, immediately to the right of the third bin, having the index value three (3), the first bin width, and a fourth bin cardinality (represented by bin height), shown as equivalent to the second bin cardinality. The representative current histogram 1510 includes a fifth bin, immediately to the right of the fourth bin, having the index value four (4), the first bin width, and a fifth bin cardinality (represented by bin height). The representative current histogram 1510 includes a sixth bin, immediately to the right of the fifth bin, having the index value five (5), the first bin width, and a sixth bin cardinality (represented by bin height). The representative current histogram 1510 includes a seventh bin, immediately to the right of the sixth bin, having the index value six (6), the first bin width, and a seventh bin cardinality (represented by bin height). The representative current histogram 1510 includes an eighth bin, immediately to the right of the seventh bin, having the index value seven (7), the first bin width, and an eighth bin cardinality (represented by bin height), shown as equivalent to the third bin cardinality. The representative current histogram 1510 includes a ninth bin, immediately to the right of the eighth bin, having the index value eight (8), the first bin width, and a ninth bin cardinality (represented by bin height), shown as equivalent to the fourth bin cardinality.

As shown in FIG. 15, the first portion of the example of the graphical representation of histogram dilation 1500 includes a representative dilated histogram 1520, obtained by performing a portion of histogram dilation with respect to the representative current histogram 1510. The representative dilated histogram 1520 corresponds with shifting the abscissa to the right relative to the representative current histogram 1510.

The representative dilated histogram 1520 includes a first, or leftmost, bin having a first dilated bin width, and the first bin cardinality (represented by the area of the first dilated bin). The first dilated bin width is a multiple of the first bin width, wherein the multiple is the exposure ratio value described herein. As shown in FIG. 15, the exposure ratio value is 2.5. The height of the first dilated bin is a result of dividing the height of the first bin by the exposure ratio value.

The representative dilated histogram 1520 includes a second dilated bin, immediately to the right of the first dilated bin, having the first dilated bin width, and the second bin cardinality (represented by the area of the second dilated bin). The height of the second dilated bin is a result of dividing the height of the second bin by the exposure ratio value.

The representative dilated histogram 1520 includes a third dilated bin, immediately to the right of the second dilated bin, having the first dilated bin width, and the third bin cardinality (represented by the area of the third dilated bin). The height of the third dilated bin is a result of dividing the height of the third bin by the exposure ratio value.

The representative dilated histogram 1520 includes a fourth dilated bin, immediately to the right of the third dilated bin, having the first dilated bin width, and the fourth bin cardinality (represented by the area of the fourth dilated bin). The height of the fourth dilated bin is a result of dividing the height of the fourth bin by the exposure ratio value.

The representative dilated histogram 1520 includes a fifth dilated bin, immediately to the right of the fourth dilated bin, having the first dilated bin width, and the fifth bin cardinality (represented by the area of the fifth dilated bin). The height of the fifth dilated bin is a result of dividing the height of the fifth bin by the exposure ratio value.

The representative dilated histogram 1520 includes a sixth dilated bin, immediately to the right of the fifth dilated bin, having the first dilated bin width, and the sixth bin cardinality (represented by the area of the sixth dilated bin). The height of the sixth dilated bin is a result of dividing the height of the sixth bin by the exposure ratio value.

The representative dilated histogram 1520 includes a seventh dilated bin, immediately to the right of the sixth dilated bin, having the first dilated bin width, and the seventh bin cardinality (represented by the area of the seventh dilated bin). The height of the seventh dilated bin is a result of dividing the height of the seventh bin by the exposure ratio value.

The representative dilated histogram 1520 includes an eighth dilated bin, immediately to the right of the seventh dilated bin, having the first dilated bin width, and the eighth bin cardinality (represented by the area of the eighth dilated bin). The height of the eighth dilated bin is a result of dividing the height of the eighth bin by the exposure ratio value.

The representative dilated histogram 1520 includes a ninth dilated bin, immediately to the right of the eighth dilated bin, having the first dilated bin width, and the ninth bin cardinality (represented by the area of the ninth dilated bin). The height of the ninth dilated bin is a result of dividing the height of the ninth bin by the exposure ratio value.

Although nine bins are shown, another number of bins, such as two hundred fifty-six (256) bins, wherein the rightmost bin is the two hundred fifty-sixth (256th) bin, having the bin index value two hundred fifty-five (255).

FIG. 16 is a diagram of a second portion of the example of the graphical representation of histogram dilation 1600.

FIG. 16 shows the representative dilated histogram 1520 shown in FIG. 15 and a simulated histogram 1610 obtained by remapping the representative dilated histogram 1520 in accordance with the first bin width from the representative current histogram 1510 shown in FIG. 15.

The simulated histogram 1610 includes a first, or leftmost, simulated bin having the first bin width, and a first simulated bin cardinality that is a fraction of the first bin dilated cardinality as shown.

The simulated histogram 1610 includes a second simulated bin, immediately to the right of the first simulated bin, having the first bin width, and a second simulated bin cardinality that is a fraction of the first dilated bin cardinality as shown.

The simulated histogram 1610 includes a third simulated bin, immediately to the right of the second simulated bin, having the first bin width, and a third simulated bin cardinality that is an aggregate, such as an average, of a fraction of the first dilated bin cardinality and a fraction of the second dilated bin cardinality.

The simulated histogram 1610 includes a fourth simulated bin, immediately to the right of the third simulated bin, having the first bin width, and a fourth simulated bin cardinality that is a fraction of the second dilated bin cardinality as shown.

The simulated histogram 1610 includes a fifth simulated bin, immediately to the right of the fourth simulated bin, having the first bin width, and a fifth simulated bin cardinality that is a fraction of the second dilated bin cardinality as shown.

The simulated histogram 1610 includes a sixth simulated bin, immediately to the right of the fifth simulated bin, having the first bin width, and a sixth simulated bin cardinality that is a fraction of the third dilated bin cardinality as shown.

The simulated histogram 1610 includes a seventh simulated bin, immediately to the right of the simulated dilated bin, having the first bin width, and a seventh simulated bin cardinality that is a fraction of the third dilated bin cardinality as shown.

The simulated histogram 1610 includes an eighth simulated bin, immediately to the right of the seventh simulated bin, having the first bin width, and an eighth simulated bin cardinality that is an aggregate, such as an average, of a fraction of the third dilated bin cardinality and a fraction of the fourth dilated bin cardinality.

The simulated histogram 1610 includes a ninth simulated bin, immediately to the right of the eighth simulated bin, having the first bin width, and a ninth simulated bin cardinality that is an aggregate, such as a sum, of a fraction of the fourth dilated bin cardinality, the fifth dilated bin cardinality, the sixth dilated bin cardinality, the seventh dilated bin cardinality, the eighth dilated bin cardinality, and the ninth dilated bin cardinality as shown. As shown in FIG. 16, the ninth simulated bin is the rightmost bin corresponding to saturated pixel values. Although nine bins are shown, another number of bins, such as two hundred fifty-six (256) bins, wherein the rightmost bin is the two hundred fifty-sixth (256th) bin, having the bin index value two hundred fifty-five (255), corresponding to saturated pixel values.

FIG. 17 is a diagram of a first portion of an example of a graphical representation of histogram compression 1700.

As shown in FIG. 17, the first portion of the example of the graphical representation of histogram compression 1700 includes a representative current histogram 1710, corresponding to current histogram data, corresponding to a previously captured image.

The representative current histogram 1710 includes a first, or leftmost, bin having the index value zero (0), a first bin width, and a first bin cardinality (represented by bin height). The representative current histogram 1710 includes a second bin, immediately to the right of the first bin, having the index value one (1), the first bin width, and a second bin cardinality (represented by bin height). The representative current histogram 1710 includes a third bin, immediately to the right of the second bin, having the index value two (2), the first bin width, and a third bin cardinality (represented by bin height). The representative current histogram 1710 includes a fourth bin, immediately to the right of the third bin, having the index value three (3), the first bin width, and a fourth bin cardinality (represented by bin height), shown as equivalent to the second bin cardinality. The representative current histogram 1710 includes a fifth bin, immediately to the right of the fourth bin, having the index value four (4), the first bin width, and a fifth bin cardinality (represented by bin height). The representative current histogram 1710 includes a sixth bin, immediately to the right of the fifth bin, having the index value five (5), the first bin width, and a sixth bin cardinality (represented by bin height). The representative current histogram 1710 includes a seventh bin, immediately to the right of the sixth bin, having the index value six (6), the first bin width, and a seventh bin cardinality (represented by bin height). The representative current histogram 1710 includes an eighth bin, immediately to the right of the seventh bin, having the index value seven (7), the first bin width, and an eighth bin cardinality (represented by bin height), shown as equivalent to the third bin cardinality. The representative current histogram 1710 includes a ninth bin, immediately to the right of the eighth bin, having the index value eight (8), the first bin width, and a ninth bin cardinality (represented by bin height), shown as equivalent to the fourth bin cardinality.

As shown in FIG. 17, the first portion of the example of the graphical representation of histogram compression 1700 includes a representative compressed histogram 1720, obtained by performing a portion of histogram compression with respect to the representative current histogram 1710. The representative compressed histogram 1720 corresponds with shifting the abscissa to the left relative to the representative current histogram 1710.

The representative compressed histogram 1720 includes a first, or leftmost, bin having a first compressed bin width, and the first bin cardinality (represented by the area of the first compressed bin). The first compressed bin width is a result of dividing the first bin width by the exposure ratio value described herein. As shown in FIG. 17, the exposure ratio value is two. The height of the first compressed bin is a result of multiplying the height of the first bin by the exposure ratio value.

The representative compressed histogram 1720 includes a second compressed bin, immediately to the right of the first compressed bin, having the first compressed bin width, and the second bin cardinality (represented by the area of the second compressed bin). The height of the second compressed bin is a result of multiplying the height of the second bin by the exposure ratio value.

The representative compressed histogram 1720 includes a third compressed bin, immediately to the right of the second compressed bin, having the first compressed bin width, and the third bin cardinality (represented by the area of the third compressed bin). The height of the third compressed bin is a result of multiplying the height of the third bin by the exposure ratio value.

The representative compressed histogram 1720 includes a fourth compressed bin, immediately to the right of the third compressed bin, having the first compressed bin width, and the fourth bin cardinality (represented by the area of the fourth compressed bin). The height of the fourth compressed bin is a result of multiplying the height of the fourth bin by the exposure ratio value.

The representative compressed histogram 1720 includes a fifth compressed bin, immediately to the right of the fourth compressed bin, having the first compressed bin width, and the fifth bin cardinality (represented by the area of the fifth compressed bin). The height of the fifth compressed bin is a result of multiplying the height of the fifth bin by the exposure ratio value.

The representative compressed histogram 1720 includes a sixth compressed bin, immediately to the right of the fifth compressed bin, having the first compressed bin width, and the sixth bin cardinality (represented by the area of the sixth compressed bin). The height of the sixth compressed bin is a result of multiplying the height of the sixth bin by the exposure ratio value.

The representative compressed histogram 1720 includes a seventh compressed bin, immediately to the right of the sixth compressed bin, having the first compressed bin width, and the seventh bin cardinality (represented by the area of the seventh compressed bin). The height of the seventh compressed bin is a result of multiplying the height of the seventh bin by the exposure ratio value.

The representative compressed histogram 1720 includes an eighth compressed bin, immediately to the right of the seventh compressed bin, having the first compressed bin width, and the eighth bin cardinality (represented by the area of the eighth compressed bin). The height of the eighth compressed bin is a result of multiplying the height of the eighth bin by the exposure ratio value.

As shown in FIG. 17, bins between the second to the last, or second to rightmost, compressed bin and the rightmost compressed bin are omitted from the representative compressed histogram 1720.

The representative compressed histogram 1720 includes a ninth compressed bin, immediately to the right of the eighth compressed bin, having the first compressed bin width, and the ninth bin cardinality (represented by the area of the ninth compressed bin). The height of the ninth compressed bin is a result of multiplying the height of the ninth bin by the exposure ratio value.

Although nine bins are shown, another number of bins, such as two hundred fifty-six (256) bins, wherein the rightmost bin is the two hundred fifty-sixth (256th) bin, having the bin index value two hundred fifty-five (255).

FIG. 18 is a diagram of a second portion of the example of the graphical representation of histogram compression 1800.

FIG. 18 shows the representative compressed histogram 1720 shown in FIG. 17, a partially remapped compressed histogram 1810 obtained by remapping the representative compressed histogram 1720 in accordance with the first bin width from the representative current histogram 1710 shown in FIG. 17, and a simulated histogram 1820 obtained by redistributing portions of the rightmost partially remapped compressed bin from the partially remapped compressed histogram 1810.

The partially remapped compressed histogram 1810 includes a first, or leftmost, simulated bin having the first bin width, and a first simulated bin cardinality that is an aggregate, such as an average, of the first compressed bin cardinality and the second compressed bin cardinality as shown.

The partially remapped compressed histogram 1810 includes a second simulated bin, immediately to the right of the first simulated bin, having the first bin width, and a second simulated bin cardinality that is an aggregate, such as an average, of the third compressed bin cardinality and the fourth compressed bin cardinality as shown.

The partially remapped compressed histogram 1810 includes a third simulated bin, immediately to the right of the second simulated bin, having the first bin width, and a third simulated bin cardinality that is an aggregate, such as an average, of the fifth compressed bin cardinality and the sixth compressed bin cardinality as shown.

The partially remapped compressed histogram 1810 includes a fourth simulated bin, immediately to the right of the third simulated bin, having the first bin width, and a fourth simulated bin cardinality that is an aggregate, such as an average, of the seventh compressed bin cardinality and the eighth compressed bin cardinality as shown.

As shown in FIG. 17, bins between the second to the last, or second to rightmost, compressed bin and the rightmost compressed bin are omitted from the partially remapped compressed histogram 1810.

The partially remapped compressed histogram 1810 includes a partially remapped simulated bin, immediately to the right of the eighth simulated bin, having the first bin width, and a partially remapped bin cardinality that is the ninth compressed bin cardinality as shown.

The simulated histogram 1820 includes the first simulated bin, the second simulated bin, the third simulated bin, and the fourth simulated bin.

The simulated histogram 1820 includes a fifth simulated bin, immediately to the right of the fourth simulated bin, having the first bin width, and a fifth simulated bin cardinality that is a fraction of the partially remapped bin cardinality as shown, wherein the fraction corresponds with dividing the partially remapped bin cardinality by the defined desaturation value described herein. Obtaining the fifth simulated bin includes obtaining an updated partially remapped bin cardinality for the partially remapped simulated bin (rightmost bin) by subtracting the fifth simulated bin cardinality from the partially remapped bin cardinality for the partially remapped simulated bin (rightmost bin).

The simulated histogram 1820 includes a sixth simulated bin, immediately to the right of the fifth simulated bin, having the first bin width, and a sixth simulated bin cardinality that is a fraction of the updated partially remapped bin cardinality as shown, wherein the fraction corresponds with dividing the updated partially remapped bin cardinality by the defined desaturation value described herein. Obtaining the sixth simulated bin includes obtaining a second updated partially remapped bin cardinality for the partially remapped simulated bin (rightmost bin) by subtracting the sixth simulated bin cardinality from the updated partially remapped bin cardinality for the partially remapped simulated bin (rightmost bin).

The simulated histogram 1820 includes a seventh simulated bin, immediately to the right of the simulated compressed bin, having the first bin width, and a seventh simulated bin cardinality that is a fraction of the second updated partially remapped bin cardinality as shown, wherein the fraction corresponds with dividing the second updated partially remapped bin cardinality by the defined desaturation value described herein. Obtaining the seventh simulated bin includes obtaining a third updated partially remapped bin cardinality for the partially remapped simulated bin (rightmost bin) by subtracting the seventh simulated bin cardinality from the second updated partially remapped bin cardinality for the partially remapped simulated bin (rightmost bin).

The simulated histogram 1820 includes an eighth simulated bin, immediately to the right of the seventh simulated bin, having the first bin width, and an eighth simulated bin cardinality that is a fraction of the third updated partially remapped bin cardinality as shown, wherein the fraction corresponds with dividing the third updated partially remapped bin cardinality by the defined desaturation value described herein. Obtaining the eighth simulated bin includes obtaining a ninth simulated bin cardinality for a ninth simulated bin (rightmost bin subsequent to obtaining the eighth simulated bin) by subtracting the eighth simulated bin cardinality from the third updated partially remapped bin cardinality for the partially remapped simulated bin (rightmost bin).

The simulated histogram 1820 includes a ninth simulated bin, immediately to the right of the eighth simulated bin, having the first bin width, and the ninth simulated bin cardinality.

FIG. 19 is a diagram of an example of a noise cost function 1900. As shown in FIG. 19, the simulated noise cost value is zero (0) for a maximal signal to noise ratio (SNR) value.

FIG. 20 is a diagram of an example of a blur cost function 2000. As shown in FIG. 20, the simulated blur cost value is zero (0) for a simulated motion blur length value that is less than two hundredths of a percent (<0.02%) of the diagonal of the image, such as for a 5k image, wherein two hundredths of a percent correlates to two pixels diagonally. As shown in FIG. 20, the simulated blur cost value is between ninety-nine hundredths (0.99) and one (1) for a simulated motion blur length value that is greater than one tenth of a percent (>0.1%) of the diagonal of the image, such as for a 5k image, wherein one tenth of a percent correlates to seven pixels diagonally.

Figure 21:
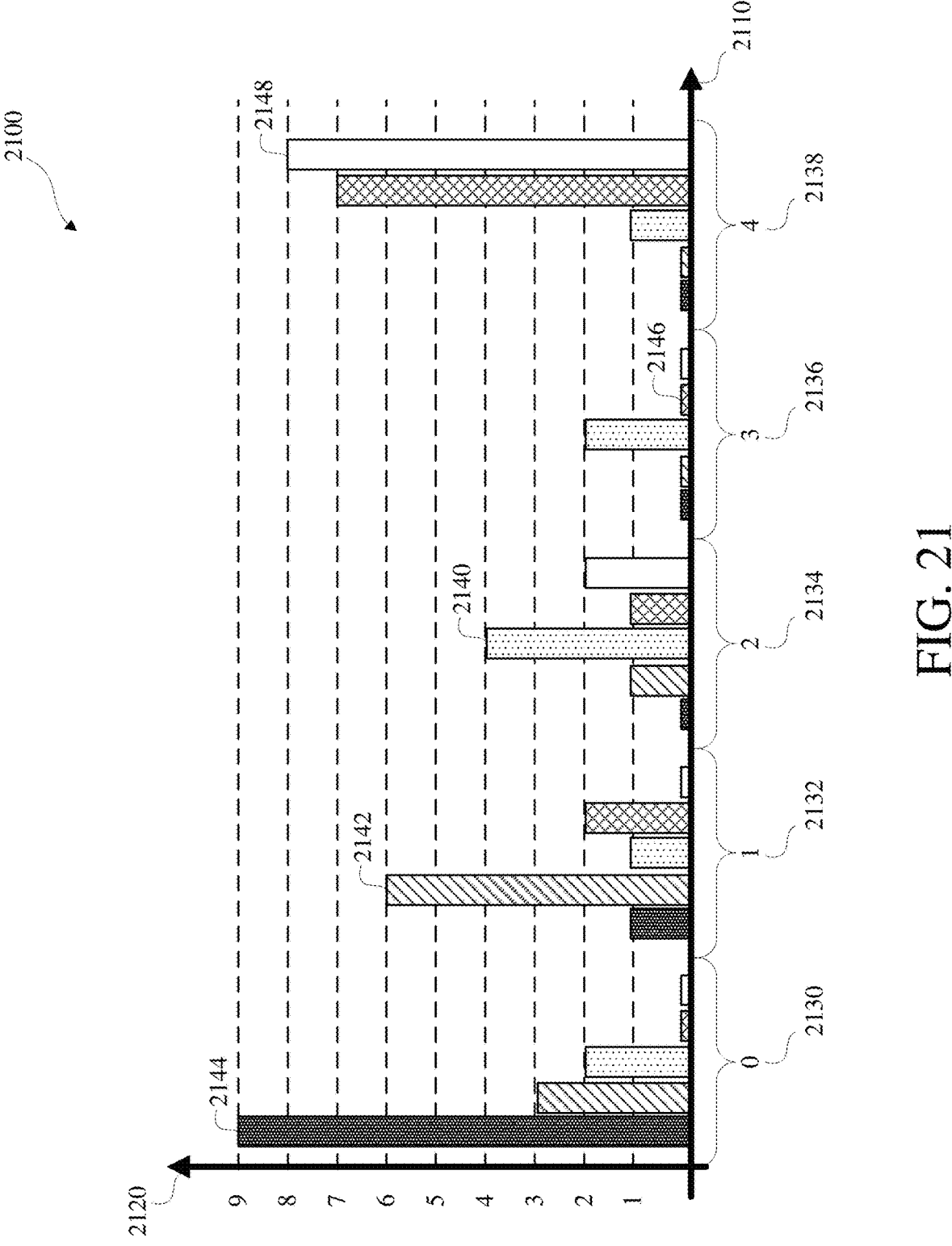
FIG. 21 is a diagram of an example of a histogram comparison graph.

FIG. 21 is a diagram of an example of a histogram comparison graph 2100.

As shown in FIG. 21, the histogram comparison graph 2100 includes a horizontal axis 2110 representing the range of available values, such as pixel values, such as pixel luminance values.

As shown in FIG. 21, the histogram comparison graph 2100 includes a vertical axis 2120 representing a number, count, or cardinality, (frequency) of values, such as observations or simulated values, such as pixel values, such as pixel luminance values.

As shown in FIG. 21, the histogram comparison graph 2100 is divided into a sequence, from left to right, of non-overlapping bin indexes including a first bin index 2130, a second bin index 2132, a third bin index 2134, a fourth bin index 2136, and a fifth bin index 2138.

FIG. 21 shows, with a light stippled background, bins 2140 representing first histogram data corresponding to a current input image captured with a current exposure duration (t), which are similar to the bins shown in FIG. 8.

FIG. 21 shows, with a diagonal stripped background, bins 2142 representing first simulated histogram data corresponding to a candidate exposure duration value (t/2) that is one half of the current exposure duration.

FIG. 21 shows, with a dark stippled background, bins 2144 representing second simulated histogram data corresponding to a candidate exposure duration value (t/4) that is one quarter of the current exposure duration. As shown, the relatively short candidate exposure duration value (t/4) of the second simulated histogram data corresponds to a relatively high cardinality of the black saturated bin 2144 shown at the first bin index 2130.

FIG. 21 shows, with a cross hatched background, bins 2146 representing third simulated histogram data corresponding to a candidate exposure duration value (2t) that is twice the current exposure duration.

FIG. 21 shows, with a white background, bins 2146 representing fourth simulated histogram data corresponding to a candidate exposure duration value (4t) that is four times the current exposure duration. As shown, the relatively long candidate exposure duration value (4t) of the fourth simulated histogram data corresponds to a relatively high cardinality of the white saturated bin 2148 shown at the fifth bin index 2138.

Although five bin indexes 2130-2138 are shown in FIG. 21, another number, count, or cardinality of bin indexes may be used, such as two hundred fifty-six (256) bin indexes. Although four simulated histograms are shown in FIG. 21, another number, count, or cardinality of simulated histograms may be used, such as sixty-three (63).

Figure 22:
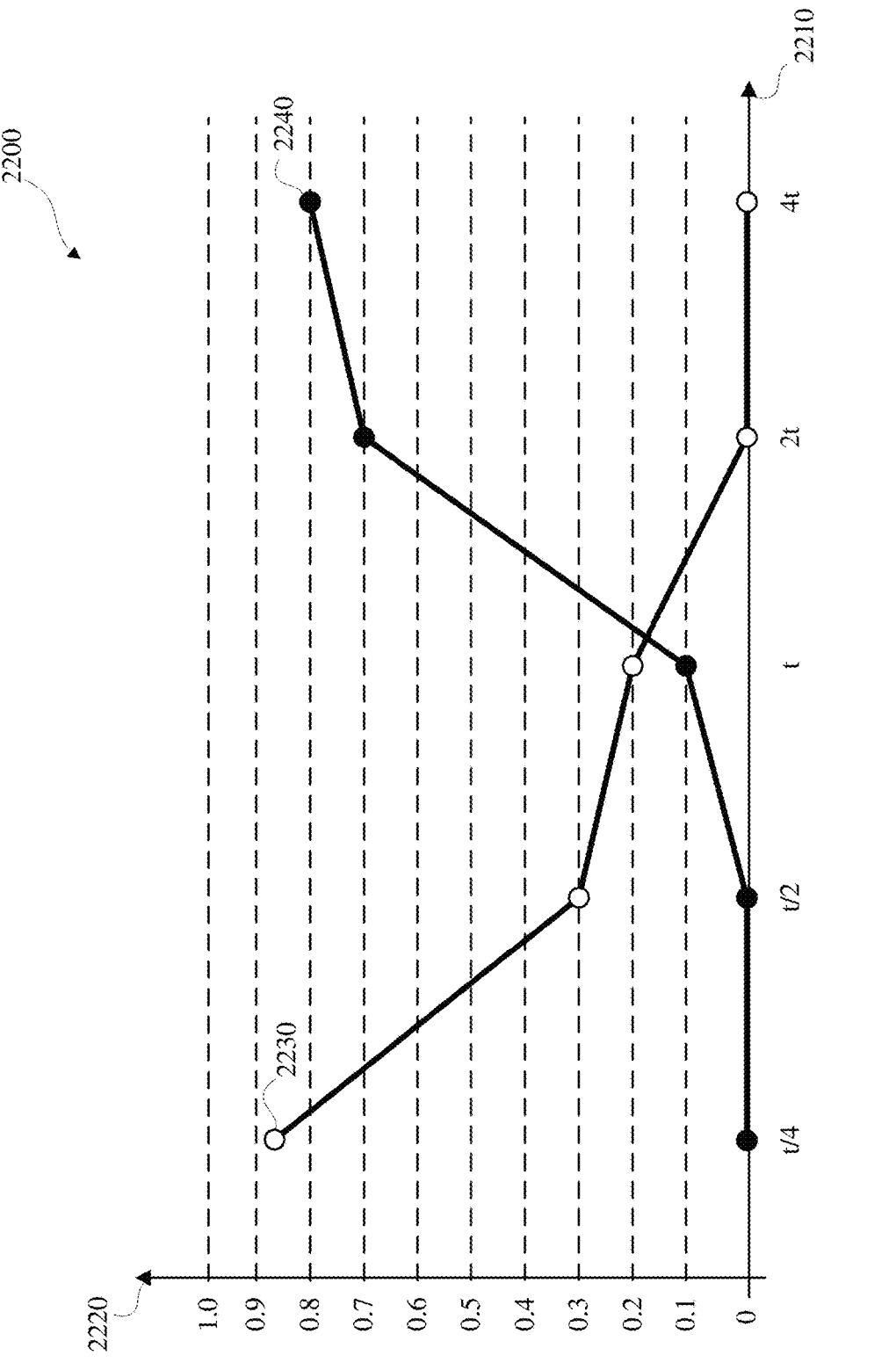
FIG. 22 is a diagram of an example of a parameter comparison graph.

FIG. 22 is a diagram of an example of a parameter comparison graph 2200.

As shown in FIG. 22, the parameter comparison graph 2200 includes a horizontal axis 2210 representing a range of exposure duration values, including a first exposure duration value (t) corresponding to the current exposure duration value, a second exposure duration value (t/2), corresponding to a candidate exposure duration value that is one half of the current exposure duration value, a third exposure duration value (t/4), corresponding to a candidate exposure duration value that is one quarter of the current exposure duration value, a fourth exposure duration value (2t), corresponding to a candidate exposure duration value that is two times the current exposure duration value, and a fifth exposure duration value (4t), corresponding to a candidate exposure duration value that is four times the current exposure duration value.

As shown in FIG. 22, the parameter comparison graph 2200 includes a vertical axis 2220 representing normalized parameter values.

As shown in FIG. 22, the parameter comparison graph 2200 includes a first plot of points 2230 (shown as white filled circles) for a first parameter and a second plot of points 2240 (shown as black filled circles) for a second parameter. For example, the first parameter may be simulated noise values, and the second parameter may be simulated blur values. In another example, the first parameter may be simulated black saturation values, and the second parameter may be simulated white saturation values. In another example, the first parameter may be simulated black saturation values, and the second parameter may be simulated blur values. In another example, the first parameter may be simulated white saturation values, and the second parameter may be simulated noise values.

Figure 23:
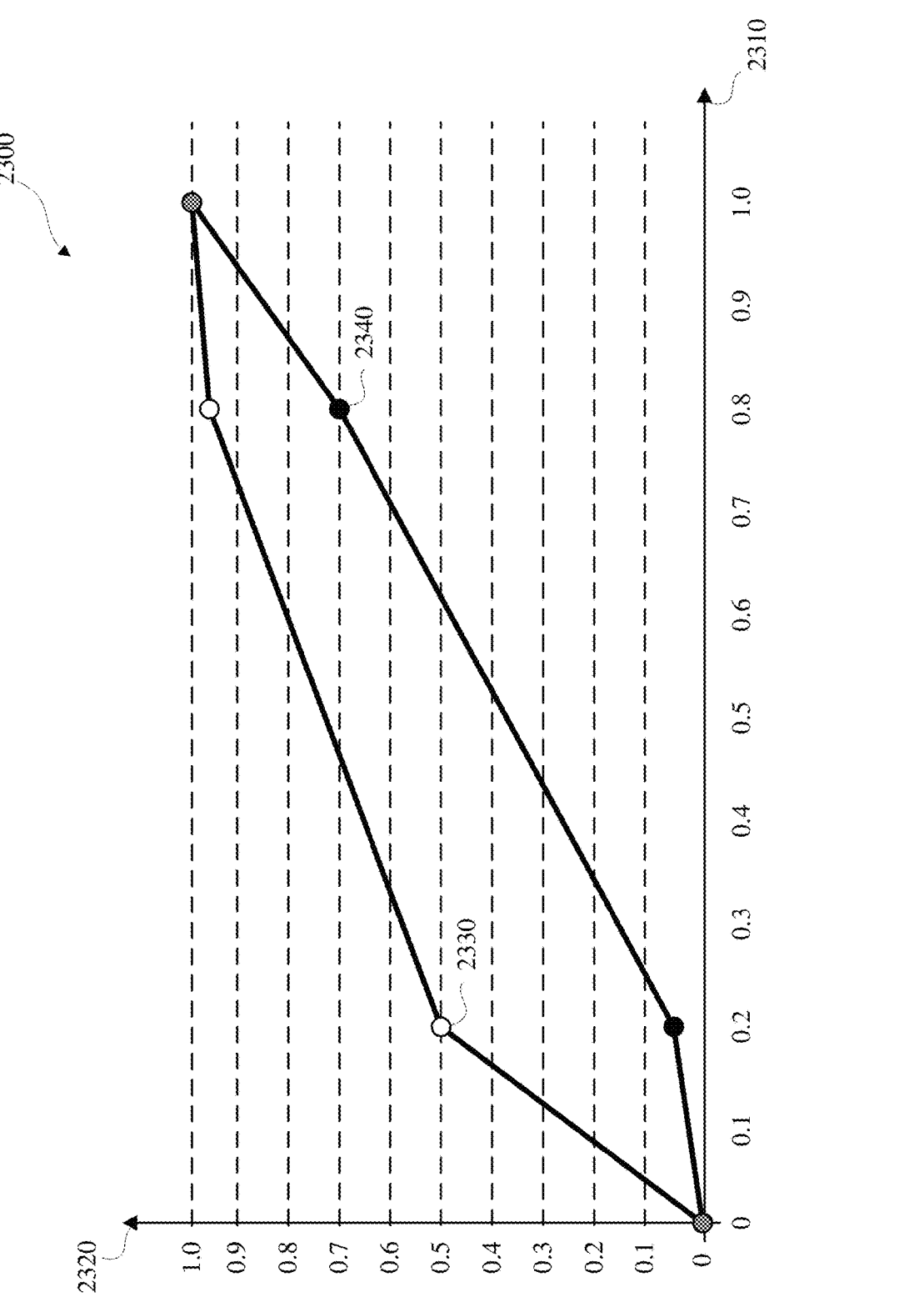
FIG. 23 is a diagram of an example of a parameter cost comparison graph.

FIG. 23 is a diagram of an example of a parameter cost comparison graph 2300.

As shown in FIG. 23, the parameter cost comparison graph 2300 includes a horizontal axis 2310 representing a range of normalized parameter values.

As shown in FIG. 23, the parameter cost comparison graph 2300 includes a vertical axis 2320 representing a range of parameter cost values.

As shown in FIG. 23, the parameter cost comparison graph 2300 includes a first plot of points 2330 (shown as white filled circles) for cost values for a first parameter and a second plot of points 2340 (shown as black filled circles) for cost values for a second parameter. Overlapping points are shown as grey filled circles for simplicity. For example, the first plot of points 2330 may represent simulated noise cost values and the second plot of points 2340 may represent simulated blur cost values. In another example, the first plot of points 2330 may represent simulated black saturation cost values and the second plot of points 2340 may represent simulated white saturation cost values. In another example, the first plot of points 2330 may represent simulated black saturation cost values and the second plot of points 2340 may represent simulated blur cost values. In another example, the first plot of points 2330 may represent simulated white saturation cost values and the second plot of points 2340 may represent simulated noise cost values.

Figures 24, 25, 26, 27:
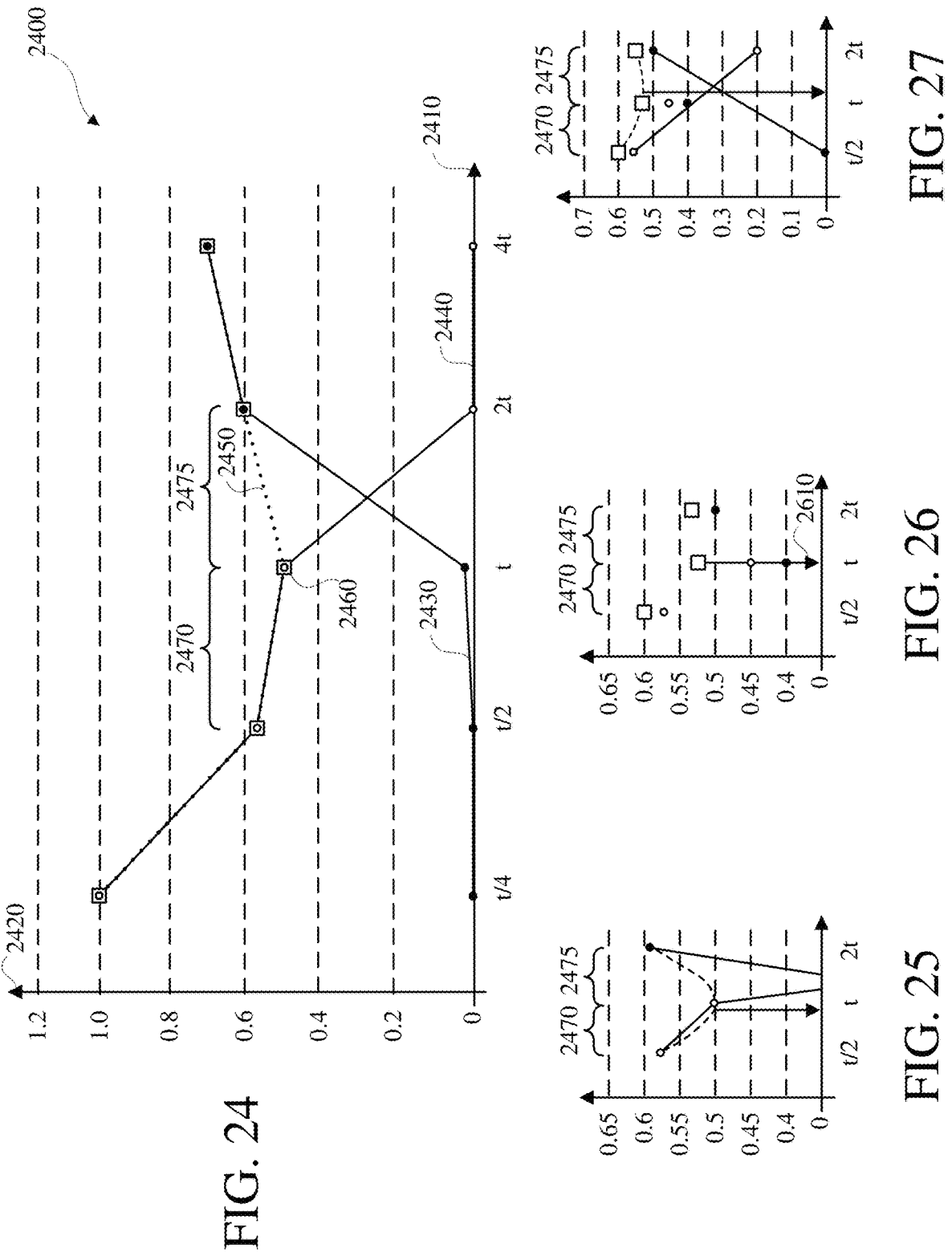
FIG. 24 is a diagram of an example of a cost exposure comparison graph.
FIG. 25 is a diagram of an example of a portion of a cost exposure comparison graph.
FIG. 26 is a diagram of an example of a portion of a cost exposure comparison graph.
FIG. 27 is a diagram of an example of a portion of a cost exposure comparison graph.

FIG. 24 is a diagram of an example of a cost exposure comparison graph 2400.

As shown in FIG. 24, the cost exposure comparison graph 2400 includes a horizontal axis 2410 representing the candidate exposure duration values.

As shown in FIG. 24, the parameter cost comparison graph 2400 includes a vertical axis 2420 representing a range of parameter cost values.

As shown in FIG. 24, the cost exposure comparison graph 2400 includes a first plot of points 2430 (shown as white filled circles) for cost values for a first parameter, a second plot of points 2440 (shown as black filled circles) for cost values for a second parameter, and a third plot of points 2450 (comparative cost values, shown as white filled squares), shown with a dotted line, for the Euclidian distance between respective cost values for the first parameter and corresponding cost values for the second parameter.

For example, the first plot of points 2430 may represent simulated noise cost values, the second plot of points 2440 may represent simulated blur cost values, and the third plot of points 2450 may represent simulated noise-blur cost values, wherein the simulated noise-blur cost values are comparative cost values. In another example, the first plot of points 2430 may represent simulated black saturation cost values, the second plot of points 2440 may represent simulated white saturation cost values, and the third plot of points 2450 may represent simulated saturation cost values, wherein the simulated saturation cost values are comparative cost values. In another example, the first plot of points 2430 may represent simulated black saturation cost values, the second plot of points 2440 may represent simulated blur cost values, and the third plot of points 2450 may represent simulated blur-saturation cost values, wherein the simulated blur-saturation cost values are comparative cost values. In another example, the first plot of points 2430 may represent simulated white saturation cost values, the second plot of points 2440 may represent simulated noise cost values, and the third plot of points 2450 may represent simulated noise-saturation cost values, wherein the simulated noise-saturation cost values are comparative cost values.

A minimal comparative cost value is shown at 2460. In some implementations, a first candidate refined minimal comparative cost value may be obtained by linear interpolation in accordance with a first range of values 2470 between the minimal comparative cost value 2460 and the preceding cost value, a second candidate refined minimal comparative cost value may be obtained by linear interpolation in accordance with a second range values 2475 between the minimal comparative cost value 2460 and the subsequent cost value, and a refined minimal comparative cost value may be obtained as the minimal value among the first candidate refined minimal comparative cost value and the second candidate refined minimal comparative cost value.

FIG. 25 is a diagram of an example of a portion of a cost exposure comparison graph. In FIG. 25, cost values for a first parameter are shown as white filled circles. Cost values for a second parameter are shown as black filled circles. Comparative cost values are shown as white filled squares.

FIG. 26 is a diagram of an example of a portion of a cost exposure comparison graph. FIG. 26 shows an example of obtaining an optimized exposure duration value in the discrete domain in accordance with a minimal comparative cost value.

In FIG. 26, cost values for a first parameter are shown as white filled circles. Cost values for a second parameter are shown as black filled circles. Comparative cost values are shown as white filled squares.

Obtaining the comparative cost values ($comp_{cost}$) with respect to the candidate exposure duration values (times), a first cost function (cost1) for a first parameter, and a second cost function (cost2) for a second parameter, may be expressed as the following:

$$comp_{cost} : \begin{cases} t \in \text{times} \\ t \rightarrow comp_{cost(t)} = \sqrt{\text{cost1}(t)^2 + \text{cost2}(t)^2} \end{cases} .$$

The minimal comparative cost value may be indicated with respect to the candidate exposure duration values (times) using an index value for the minimal comparative cost value (minCostIdx), as times[minCostIdx].

In some implementations, flickering may be detected, and the minimal comparative cost value be used.

FIG. 27 is a diagram of an example of a portion of a cost exposure comparison graph. FIG. 25 shows an example of obtaining an optimized exposure duration value in the continuous domain in accordance with a minimal comparative cost value.

In FIG. 27, cost values for a first parameter are shown as white filled circles. Cost values for a second parameter are shown as black filled circles. Comparative cost values are shown as white filled squares.

In some implementations, in the absence of flickering a refined minimal comparative cost value may be used.

FIGS. 24-27 show examples of cost exposure comparison graphs with respect to refining, optimizing, or precision improvement, to obtain the optimal, refined, exposure duration value with respect to the first parameter, or the cost values thereof, and the second parameter, or the cost values thereof, that minimizes the aggregate cost on the continuous domain, which may differ from the candidate exposure duration values (timeList). The parameters, or cost values, may be included in a data structure (abList), such as a list or array, which may be indexed in increasing exposure duration order (left to right).

The refined minimal comparative cost value may be obtained in the first range, or interval, of values 2470 (left), between the minimal comparative cost value 2460, having a first cost index value (minCostIdx), and the preceding cost value, having a second cost index value that is one less than the first cost index value (minCostIdx−1), which may be expressed as the following:

$$\text{left} = [abList[\text{min}CostIdx - 1]; abList[\text{min}CostIdx]].$$

The refined minimal comparative cost value may be obtained in the second range, or interval, of values 2475 (right), between the minimal comparative cost value 2460, having the first cost index value (minCostIdx), and the subsequent cost value, having a third cost index value that is one greater than the first cost index value (minCostIdx+1), which may be expressed as the following:

$$\text{right} = [abList[\text{min}CostIdx]; abList[\text{min}CostIdx + 1]].$$

In some implementations, the refined minimal comparative cost value may be obtained in the first range and the second range.

An interval, such as the first interval 2470 or the second interval 2475, has a left, lower, or minimal, bound $(x_a)$, a right, upper, or maximal, bound $(x_b)$. The interval includes cost values corresponding to the left, lower, or minimal, bound $(x_a)$, including a first cost value with respect to the first parameter $(\text{cost1}(x_a)$ or $y1_a)$ and a second cost value with respect to the second parameter $(\text{cost2}(x_a)$ or $y2_a)$. The interval includes cost values corresponding to the right, upper, or maximal, bound $(x_b)$, including a third cost value with respect to the first parameter $(\text{cost1}(x_b)$ or $y1_b)$ and a fourth cost value with respect to the second parameter $(\text{cost2}(x_b)$ or $y2_b)$. The cost values may be approximated by linear functions passing respectively through a first set of points $((x_a, y1_a); (x_b, y1_b))$ and a second set of points $((x_a, y2_a); (x_b, y2_b))$.

A result of dividing a result of subtracting the first cost value $(y1_a)$ from the third cost value $(y1_b)$ by a result of subtracting the left bound $(x_a)$ from the right bound $(x_b)$ may be obtained as a first alpha value $(\alpha_1)$, which may be expressed as the following:

$$\alpha_1 = \frac{y1_b - y1_a}{x_b - x_a}.$$

A result of multiplying the left bound $(x_a)$ by a result of subtracting the first alpha value $(\alpha_1)$ from the first cost value $(y1_a)$ may be obtained as a first beta value $(\beta_1)$, which may be expressed as the following:

$$\beta_1 = y1_a - \alpha_1 * x_a.$$

A first linear function $(y_1)$, for obtaining a refined minimal comparative cost value (x) for the interval, with respect to the first alpha value $(\alpha_1)$ and the first beta value $(\beta_1)$, may be expressed as the following:

$$y_1 : \begin{cases} x \in [x_a, x_b] \\ x \mapsto \alpha_1 * x + \beta_1 \end{cases}.$$

A result of dividing a result of subtracting the second cost value $(y2_a)$ from the fourth cost value $(y2_b)$ by the result of subtracting the left bound $(x_a)$ from the right bound $(x_b)$ may be obtained as a second alpha value $(\alpha_2)$, which may be expressed as the following:

$$\alpha_2 = \frac{y2_b - y2_a}{x_b - x_a}.$$

A result of multiplying the left bound $(x_a)$ by a result of subtracting the second alpha value $(\alpha_2)$ from the second cost value $(y2_a)$ may be obtained as a second beta parameter $(\beta_2)$, which may be expressed as the following:

$$\beta_2 = y2_a - \alpha_2 * x_a.$$

A second linear function $(y_2)$, for obtaining a refined minimal comparative cost value (x) for the interval, with respect to the second alpha value $(\alpha_2)$ and the second beta value $(\beta_2)$, may be expressed as the following:

$$y_2 : \begin{cases} x \in [x_a, x_b] \\ x \mapsto \alpha_2 * x + \beta_2 \end{cases}.$$

A third function (g), for obtaining a refined minimal comparative cost value (x) for the interval, with respect to the first linear function $(y_1)$ and second linear function $(y_2)$, may be expressed as the following:

$$g : \begin{cases} x \in [x_a, x_b] \\ x \mapsto g(x) = \sqrt{y_1(x)^2 + y_2(x)^2} \end{cases}.$$

The cost function (g(x)) may be expressed as the following:

$$g(x) = \sqrt{y_1(x)^2 + y_2(x)^2},$$

$$g(x) = \sqrt{(\alpha_1 * x + \beta_1)^2 + (\alpha_2 * x + \beta_2)^2},$$

$$g(x) = \sqrt{(\alpha_1^2 + \alpha_2^2)x^2 + 2(\alpha_1 * \beta_1 + \alpha_2 * \beta_2)x + \beta_1^2 + \beta_2^2}.$$

A fourth function (p) may be expressed as the following:

$$p(x) = (\alpha_1^2 + \alpha_2^2)x^2 + 2(\alpha_1 * \beta_1 + \alpha_2 * \beta_2)x + \beta_1^2 + \beta_2^2.$$

The cost function (g(x)) may be expressed as the following:

$$g(x) = \sqrt{p(x)},$$

The square root keeps order and the fourth function (p) may be directly minimized, which is a degree-2 polynomial with a positive quadratic coefficient, such that the function reaches minimum wherein the derivative is zero. Strict positivity of the quadratic coefficient may be verified to avoid division by zero, which may be expressed as the following:

$$p'(x) = 0, \iff 2(\alpha_1^2 + \alpha_2^2)x + 2(\alpha_1 * \beta_1 + \alpha_2 * \beta_2) =$$

$$0, \iff (\alpha_1^2 + \alpha_2^2)x = -(\alpha_1 * \beta_1 + \alpha_2 * \beta_2), \iff x = -\frac{\alpha_1 * \beta_1 + \alpha_2 * \beta_2}{\alpha_1^2 + \alpha_2^2}.$$

In some implementations, the image capture apparatus, or a component thereof, such as the exposure control component, determines that the refined minimal comparative cost value (x) for the interval is outside the range from the left bound ($x_a$) to the right bound ($x_b$) ($x \notin [x_a, x_b]$) and the exposure duration value from the candidate exposure duration values (timeList) corresponding to the first cost index value from the (minCostIdx) may be used as the refined minimal comparative cost value (x), which may be expressed as the following x=timeList[minCostIdx].

A left refined minimal comparative cost value ($x_{left}$) may be obtained for the first range, or interval, of values 2470. A right refined minimal comparative cost value ($x_{right}$) may be obtained for the second range, or interval, of values 2475. The exposure duration corresponding to the minimal refined minimal comparative cost value among the left refined minimal comparative cost value ($x_{left}$) and the right refined minimal comparative cost value ($x_{right}$) may be used as the refined minimal comparative cost value.

The methods and techniques of automatic exposure with simulated histogram data described herein, or aspects thereof, may be implemented by an image capture apparatus, or one or more components thereof, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or the image capture apparatus 500 shown in FIG. 5. The methods and techniques of automatic exposure with simulated histogram data described herein, or aspects thereof, may be implemented by an image capture device, such as the image capture device 104 shown in FIGS. 1A-1B, one or more of the image capture devices 204, 206 shown in FIGS. 2A-2B, one or more of the image capture devices 304, 306 shown in FIG. 3, the image capture device 404 shown in FIGS. 4A-4B, or an image capture device of the image capture apparatus 500 shown in FIG. 5. The methods and techniques of automatic exposure with simulated histogram data described herein, or aspects thereof, may be implemented by an image processing pipeline, or one or more components thereof, such as the image processing pipeline 600 shown in FIG. 6.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for use in automatic exposure processing, the method comprising:
   accessing current input image data including a current input image;
   obtaining adaptive acquisition control output data by:
      obtaining a noise-blur exposure duration value in accordance with a minimal simulated noise-blur cost value from simulated noise-blur cost data obtained in accordance with simulated noise data and simulated blur data obtained in accordance with the current input image data and candidate exposure data;
      obtaining a saturation exposure value in accordance with a minimal simulated saturation cost value from simulated saturation cost data obtained in accordance with simulated black saturation data and simulated white saturation data obtained in accordance with the current input image data and the candidate exposure data;
      determining that the noise-blur exposure duration value is less than a result of dividing the saturation exposure value by a maximum gain value; and
      in response to determining that the noise-blur exposure duration value is less than the result of dividing the saturation exposure value by the maximum gain value:
         obtaining the maximum gain value as a target gain value; and
         obtaining a target exposure duration value in accordance with a minimal simulated blur-saturation cost value from simulated blur-saturation cost data obtained in accordance with the simulated blur data and the simulated black saturation data; and
   outputting the adaptive acquisition control output data for subsequent image acquisition.

2. The method of claim 1, wherein:
   obtaining the adaptive acquisition control output data includes obtaining the adaptive acquisition control output data by an exposure control component of an image capture apparatus; and
   the image capture apparatus captured the current input image in accordance with current adaptive acquisition control data, wherein the current adaptive acquisition control data includes current exposure data that includes a current exposure value that indicates a current exposure duration value and a current gain value.

3. The method of claim 2, wherein obtaining the adaptive acquisition control output data includes:
   accessing the candidate exposure data, wherein the candidate exposure data indicates a defined cardinality of candidate exposure duration values, including at least one candidate exposure duration value that differs from the current exposure duration value.

4. The method of claim 3, wherein:
   accessing the candidate exposure data includes obtaining the candidate exposure duration values in a range from a defined minimum exposure duration value to a maximum exposure duration value in accordance with a distribution type;
   the distribution type is linear distribution or logarithmic distribution; and
   obtaining the candidate exposure duration values includes obtaining the candidate exposure duration values in accordance with a defined flicker frequency.

5. The method of claim 3, wherein:
   accessing the current input image includes accessing current input image data including the current input image, wherein the current input image data includes current histogram data corresponding to the current input image; and obtaining the adaptive acquisition control output data includes obtaining, on a per-candidate basis with respect to the candidate exposure duration values, simulated quality data in accordance with the current input image data and the candidate exposure data, wherein obtaining the simulated quality data includes:

accessing current candidate exposure data from the candidate exposure data, wherein the current candidate exposure data indicates a current candidate exposure duration value from the candidate exposure duration values.

6. The method of claim 5, wherein obtaining the simulated quality data includes:

obtaining simulated histogram data in accordance with the current input image data and the current candidate exposure data.

7. The method of claim 6, wherein obtaining the simulated histogram data includes:

obtaining, as an exposure ratio value, a result of dividing the current candidate exposure duration value by the current exposure duration value;

in response to a determination that the current candidate exposure duration value is greater than the current exposure duration value, obtaining the simulated histogram data by performing histogram dilation in accordance with the current histogram data and the exposure ratio value; and in response to a determination that the current candidate exposure duration value is less than or equal to the current exposure duration value, obtaining the simulated histogram data by performing histogram compression in accordance with the current histogram data and the exposure ratio value.

8. The method of claim 7, wherein histogram dilation includes:

for a control value in a range from zero to one less than a maximum bin index value from the current histogram data:

obtaining, as a first value, an integer portion of a result of dividing the control value by the exposure ratio value;

obtaining, as a second value, a minimal value among one and a result of multiplying a sum of the first value and one by a result of subtracting the control value from the exposure ratio value;

obtaining, as a bin cardinality value for a simulated bin of the simulated histogram data at an index value matching the control value, an integer portion of a result of dividing, by the exposure ratio value, a result of multiplying the second value, a sum of a bin cardinality value from a bin from the current histogram data having an index value that matches the first value and a result of subtracting the second value from one, and a bin cardinality value from a bin from the current histogram data having an index value that matches a result of subtracting one from the first value; and obtaining, as a bin cardinality value for a simulated bin of the simulated histogram data at an index value that matches the maximum bin index value, a result of subtracting a sum of bin cardinality values from the simulated histogram data from a sum of bin cardinality values from the current histogram data.

9. The method of claim 7, wherein histogram compression includes:

for a first control value in a range from zero to an integer portion of a result of dividing a maximum bin index value from the current histogram data by the exposure ratio value:

obtaining, as a first value, a result of multiplying the first control value by the exposure ratio value;

obtaining, as a second value, a minimal integer value greater than or equal to the first value;

in response to a determination that the first value matches the second value, obtaining, as a third value, zero;

in response to a determination that the first value differs from the second value, obtaining, as the third value, a result of adding the second value to a result of subtracting the first value from one;

obtaining, as a fourth value, a result of subtracting one from an integer portion of a result of multiplying the exposure ratio value by a sum of one and the first control value;

obtaining, as a fifth value, a result of multiplying the sum of one and the first control value by a result of subtracting, from the exposure ratio value, a sum of the fourth value and one; and obtaining, as a bin cardinality value for a simulated bin of the simulated histogram data at an index value that matches the first control value, a result of multiplying:

the third value;

a sum of:

a bin cardinality value for a bin from the current histogram data at an index value that matches one less than the second value;

a sum of bin cardinality values from bins from the current histogram data at bin index values that are greater than or equal to the second value and are less than or equal to the fourth value; and the fifth value; and a bin cardinality value for a bin from the current histogram data at an index value that matches a sum of the fourth value and one;

obtaining, as a saturated pixels value, a bin cardinality value for a bin from the current histogram data at an index value that matches the maximum bin index value;

for a second control value in a range from a sum of one and the integer portion of the result of dividing the maximum bin index value by the exposure ratio value to one less than the maximum bin index value:

obtaining, as a bin cardinality value for a simulated bin of the simulated histogram data at an index value that matches the second control value, an integer portion of a result of multiplying a defined desaturation value by the saturated pixels value; and obtaining, as the saturated pixels value, a result of subtracting, from the saturated pixels value, the bin cardinality value for the simulated bin of the simulated histogram data at the index value that matches the second control value; and obtaining, as a bin cardinality value for a simulated bin of the simulated histogram data at an index value that matches the maximum bin index value, the saturated pixels value.

10. The method of claim 6, wherein obtaining the simulated quality data includes:

obtaining the simulated noise data, wherein obtaining the simulated noise data includes:

obtaining a simulated noise value in accordance with the simulated histogram data;

obtaining a simulated noise cost value in accordance with the simulated noise value and a defined noise cost function; and including the simulated noise cost value in the simulated noise data.

11. The method of claim 10, wherein obtaining the simulated noise value includes:

obtaining, as the simulated noise value, a signal to noise ratio value with respect to bins from the simulated histogram data that represent values that are less than a defined dark threshold.

12. The method of claim 10, wherein obtaining the simulated quality data includes:

obtaining the simulated blur data, wherein obtaining the simulated blur data includes:

obtaining a simulated motion blur length value in accordance with motion data obtained in accordance with capturing the current input image;

obtaining a simulated blur cost value in accordance with the simulated motion blur length value and a defined blur cost function; and including the simulated blur cost value in the simulated blur data.

13. The method of claim 12, wherein obtaining the simulated motion blur length value includes:

obtaining a motion blur speed value indicating, as a percentage of a diagonal size of the current input image, motion of the image capture apparatus with respect to a temporal span that is a reciprocal of a current frame rate, corresponding to capturing the current input image; and obtaining, as a simulated motion blur length value, a result of multiplying the motion blur speed value by the current candidate exposure duration value.

14. The method of claim 12, wherein obtaining the simulated blur cost value includes:

obtaining the simulated blur cost value in accordance with the simulated motion blur length value and the defined blur cost function.

15. The method of claim 6, wherein obtaining the noise-blur exposure duration value includes:

obtaining the simulated noise-blur cost data, on a per-candidate basis with respect to the candidate exposure duration values, wherein, for a respective candidate exposure duration value from the candidate exposure duration values, obtaining the simulated noise-blur cost data includes:

obtaining, as a simulated noise-blur cost value, a Euclidean distance between a respective simulated noise cost value for the respective candidate exposure duration value from the simulated noise data and a corresponding simulated blur cost value from the simulated blur data; and including the simulated noise-blur cost value in the simulated noise-blur cost data.

16. The method of claim 6, wherein obtaining the simulated quality data includes:

obtaining the simulated black saturation data, wherein obtaining the simulated black saturation data includes:

obtaining a simulated black saturation value in accordance with the simulated histogram data, wherein the candidate exposure data includes candidate exposure values, wherein the current candidate exposure data indicates a current candidate exposure value from the candidate exposure values, wherein the current candidate exposure value indicates the current candidate exposure duration value;

obtaining a simulated black saturation cost value in accordance with the simulated black saturation value and a defined black saturation cost function; and including the simulated black saturation cost value in the simulated black saturation data.

17. The method of claim 16, wherein obtaining the simulated black saturation value includes:

obtaining, as the simulated black saturation value, a bin cardinality of a minimum index bin from the simulated histogram data.

18. The method of claim 16, wherein obtaining the simulated quality data includes:

obtaining the simulated white saturation data, wherein obtaining the simulated white saturation data includes:

obtaining a simulated white saturation value in accordance with the simulated histogram data;

obtaining a simulated white saturation cost value in accordance with the simulated white saturation value and a defined white saturation cost function; and including the simulated white saturation cost value in the simulated white saturation data.

19. The method of claim 18, wherein obtaining the simulated white saturation value includes:

obtaining, as the simulated white saturation value, a cumulative bin cardinality of at least one bin from the simulated histogram data corresponding to pixel values greater than a result of dividing a maximum bin index of the simulated histogram data by a white balance scale value.

20. The method of claim 18, wherein obtaining the saturation exposure value includes:

obtaining the simulated saturation cost data, on a per-candidate basis with respect to the candidate exposure duration values, wherein, for a respective candidate exposure value from the candidate exposure values, obtaining the simulated saturation cost data includes:

obtaining, as a simulated saturation cost value, a Euclidean distance between a respective simulated black saturation cost value for the respective candidate exposure value from the simulated black saturation data and a corresponding simulated white saturation cost value from the simulated white saturation data; and including the simulated saturation cost value in the simulated saturation cost data.

21. The method of claim 18, wherein obtaining the target exposure duration value includes:

obtaining the simulated blur-saturation cost data, on a per-candidate exposure duration value basis with respect to the candidate exposure duration values, wherein, for a respective candidate exposure duration value from the candidate exposure duration values, obtaining the simulated blur-saturation cost data includes:

obtaining, as a simulated blur-saturation cost value, a Euclidean distance between a respective simulated blur cost value for a respective candidate exposure value from the simulated blur data and a corresponding simulated black saturation cost value from the simulated black saturation data; and including the simulated blur-saturation cost value in the simulated blur-saturation cost data.

22. The method of claim 1, wherein obtaining the adaptive acquisition control output data includes:

obtaining a smoothed target exposure duration value by smoothing the target exposure duration value;

using the smoothed target exposure duration value as the target exposure duration value;

obtaining a smoothed target exposure value by smoothing a target exposure value; and using the smoothed target exposure value as the target exposure value.

23. A method for use in automatic exposure processing, the method comprising:

accessing current input image data including a current input image;

obtaining adaptive acquisition control output data by:

obtaining a noise-blur exposure duration value in accordance with a minimal simulated noise-blur cost value from simulated noise-blur cost data obtained in accordance with simulated noise data and simulated blur data obtained in accordance with the current input image data and candidate exposure data;

obtaining a saturation exposure value in accordance with a minimal simulated saturation cost value from simulated saturation cost data obtained in accordance with simulated black saturation data and simulated white saturation data obtained in accordance with the current input image data and the candidate exposure data;

determining that the noise-blur exposure duration value is greater than or equal to a result of dividing the saturation exposure value by a maximum gain value;

determining that the noise-blur exposure duration value is less than or equal to a result of dividing the saturation exposure value by a minimum gain value; and in response to determining that the noise-blur exposure duration value is greater than or equal to the result of dividing the saturation exposure value by the maximum gain value and determining that the noise-blur exposure duration value is less than or equal to the result of dividing the saturation exposure value by the minimum gain value:

obtaining the noise-blur exposure duration value as a target exposure duration value; and obtaining, as a target gain value, a result of dividing the saturation exposure value by the noise-blur exposure duration value; and outputting the adaptive acquisition control output data for subsequent image acquisition.

24. A method for use in automatic exposure processing, the method comprising:

accessing current input image data including a current input image;

obtaining adaptive acquisition control output data by:

obtaining a noise-blur exposure duration value in accordance with a minimal simulated noise-blur cost value from simulated noise-blur cost data obtained in accordance with simulated noise data and simulated blur data obtained in accordance with the current input image data and candidate exposure data;

obtaining a saturation exposure value in accordance with a minimal simulated saturation cost value from simulated saturation cost data obtained in accordance with simulated black saturation data and simulated white saturation data obtained in accordance with the current input image data and the candidate exposure data;

determining that the noise-blur exposure duration value is greater than a result of dividing the saturation exposure value by a minimum gain value; and in response to determining that the noise-blur exposure duration value is greater than the result of dividing the saturation exposure value by the minimum gain value:

obtaining the minimum gain value as a target gain value; and obtaining a target exposure duration value in accordance with a minimal simulated noise-saturation cost value from simulated noise-saturation cost data obtained in accordance with the simulated noise data and the simulated white saturation data; and outputting the adaptive acquisition control output data for subsequent image acquisition.

25. The method of claim 24, wherein:

obtaining the adaptive acquisition control output data includes obtaining the adaptive acquisition control output data by an exposure control component of an image capture apparatus; and the image capture apparatus captured the current input image in accordance with current adaptive acquisition control data, wherein the current adaptive acquisition control data includes current exposure data that includes a current exposure value that indicates a current exposure duration value and a current gain value.

26. The method of claim 25, wherein obtaining the adaptive acquisition control output data includes:

accessing the candidate exposure data, wherein the candidate exposure data indicates a defined cardinality of candidate exposure duration values, including at least one candidate exposure duration value that differs from the current exposure duration value.

27. The method of claim 26, wherein:

accessing the current input image includes accessing current input image data including the current input image, wherein the current input image data includes current histogram data corresponding to the current input image.

28. The method of claim 27, wherein obtaining the adaptive acquisition control output data includes:

obtaining, on a per-candidate basis with respect to the candidate exposure duration values, simulated quality data in accordance with the current input image data and the candidate exposure data, wherein obtaining the simulated quality data includes:

accessing current candidate exposure data from the candidate exposure data, wherein the current candidate exposure data indicates a current candidate exposure duration value from the candidate exposure duration values.

29. The method of claim 28, wherein obtaining the simulated quality data includes:

obtaining simulated histogram data in accordance with the current input image data and the current candidate exposure data.

30. The method of claim 29, wherein obtaining the simulated quality data includes:

obtaining the simulated black saturation data, wherein obtaining the simulated black saturation data includes:

obtaining a simulated black saturation value in accordance with the simulated histogram data, wherein the candidate exposure data includes candidate exposure values, wherein the current candidate exposure data indicates a current candidate exposure value from the candidate exposure values, wherein the current candidate exposure value indicates the current candidate exposure duration value;

obtaining a simulated black saturation cost value in accordance with the simulated black saturation value and a defined black saturation cost function; and including the simulated black saturation cost value in the simulated black saturation data.

31. The method of claim 30, wherein obtaining the simulated quality data includes:

obtaining the simulated white saturation data, wherein obtaining the simulated white saturation data includes:

obtaining a simulated white saturation value in accordance with the simulated histogram data;

obtaining a simulated white saturation cost value in accordance with the simulated white saturation value and a defined white saturation cost function; and including the simulated white saturation cost value in the simulated white saturation data.

32. The method of claim 31, wherein obtaining the target exposure duration value includes:

obtaining the simulated noise-saturation cost data, on a per-candidate exposure duration value basis with respect to the candidate exposure duration values, wherein, for a respective candidate exposure duration value from the candidate exposure duration values, obtaining the simulated noise-saturation cost data includes:

obtaining, as a simulated noise-saturation cost value, a Euclidean distance between a respective simulated noise cost value for a respective candidate exposure value from the simulated noise data and a corresponding simulated white saturation cost value from the simulated white saturation data; and including the simulated noise-saturation cost value in the simulated noise-saturation cost data.

\* \* \* \* \*